United States Patent
Alshayeb et al.

(10) Patent No.: US 9,558,098 B1
(45) Date of Patent: Jan. 31, 2017

(54) METHOD, APPARATUS, AND NON-TRANSITORY COMPUTER READABLE MEDIA FOR THE ASSESSMENT OF SOFTWARE PRODUCTS

(71) Applicant: KING FAHD UNIVERSITY OF PETROLEUM AND MINERALS, Dhahran (SA)

(72) Inventors: Mohammad Rabah Alshayeb, Dhahran (SA); Ahmad Abdullatif, Dhahran (SA); Sami Zahran, Iver (GB); Mahmood Niazi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/058,193

(22) Filed: Mar. 2, 2016

(51) Int. Cl.
G06F 9/44 (2006.01)
G06F 11/36 (2006.01)

(52) U.S. Cl.
CPC ....... *G06F 11/3608* (2013.01); *G06F 11/3616* (2013.01)

(58) Field of Classification Search
CPC ...... G06F 11/3608; G06F 11/3604; G06F 8/77
USPC .............. 717/100–101, 107–109, 123–129
See application file for complete search history.

(56) References Cited

U.S. PATENT DOCUMENTS

| | | | | |
|---|---|---|---|---|
| 6,662,357 B1 * | 12/2003 | Bowman-Amuah | ..... | G06F 8/20 717/120 |
| 6,715,130 B1 * | 3/2004 | Eiche | ........................ | G06F 8/10 705/7.38 |
| 7,568,183 B1 * | 7/2009 | Hardy | ................. | G06F 11/3684 717/121 |
| 7,596,778 B2 * | 9/2009 | Kolawa | ............... | G06F 11/3688 714/38.14 |
| 8,019,631 B2 * | 9/2011 | Bredin | .................... | G06Q 10/00 705/7.11 |
| 8,271,949 B2 * | 9/2012 | Bernardini | ............ | G06F 11/366 717/101 |

(Continued)

OTHER PUBLICATIONS

Scotto et al, "A relational approach to software metrics", ACM, pp. 1536-1540, 2004.*

(Continued)

*Primary Examiner* — Anil Khatri
(74) *Attorney, Agent, or Firm* — Oblon, McClelland, Maier & Neustadt, L.L.P.

(57) ABSTRACT

A method, apparatus, and non-transitory computer-readable storage medium to objectively assess the quality of software products. The method, apparatus, and non-transitory computer-readable storage medium relate to determining a product maturity level of one or more software products. The disclosure describes a method for acquiring product quality attributes of a software product. Each product quality attribute is assessed by one or more metric parameters which test the software product by mathematical or logical test methodologies. Once evaluated, the one or more metric parameters and the one or more product quality attributes may each be mapped to a capability level based on a capability scale. A maturity level may be mapped from the capability level of the capability level of the one or more product quality attributes to the software product to provide a quality assessment of the software product.

13 Claims, 43 Drawing Sheets

(56) References Cited

U.S. PATENT DOCUMENTS

| | | | | |
|---|---|---|---|---|
| 8,387,018 | B2* | 2/2013 | Artzi | G06F 11/3684 |
| | | | | 714/38.1 |
| 8,499,278 | B2* | 7/2013 | Hughes | G06F 8/20 |
| | | | | 705/14.1 |
| 8,539,438 | B2* | 9/2013 | Bassin | G06Q 10/00 |
| | | | | 717/101 |
| 8,799,868 | B2* | 8/2014 | Ndem | G06F 11/3676 |
| | | | | 717/124 |
| 8,869,116 | B2* | 10/2014 | Fliek | G06F 11/3672 |
| | | | | 714/31 |
| 8,990,763 | B2* | 3/2015 | Sakhardande | G06Q 30/00 |
| | | | | 345/440 |
| 2008/0115110 | A1 | 5/2008 | Fliek et al. | |
| 2014/0122182 | A1 | 5/2014 | Cherusseri et al. | |
| 2014/0201714 | A1 | 7/2014 | Vaidyan et al. | |

OTHER PUBLICATIONS

Jermakovics et al, "Lagrein: Tracking the Software Development Process", ACM, pp. 882-883, 2007.*

Dabrowski, et al, "Improving Software Quality by Improving Architecture Management", ACM, pp. 208-215, 2012.*

Singh, "Metrics for Measuring the Quality of Object-Oriented Software", ACM SIGSOFT Software Engineering Notes, vol. 38 No. 5, pp. 1-5, 2013.*

Sillitti et al, "Deploying, Updating, and Managing Tools for Collecting Software Metrics", ACM, pp. 1-4, 2004.*

Frakes et al, "Software Reuse: Metrics and Models", ACM Computing Surveys, vol. 28, No. 2 pp. 415-435, 1996.*

Desharnais et al, "Software Maintenance Productivity and Maturity", ACM, pp. 121-125, 2010.*

Gill, "Factors Affecting Effective Software Quality Management Revisited", ACM SIGSOFT Software Engineering Notes vol. 30, No. 2, pp. 1-4, 2005.*

Hampp, A Cost-Benefit Model for Software Quality Assurance Activities, ACM, pp. 99-108, 2012.*

Bernardi et al, 'A Metric Model for Aspects' Coupling, ACM, pp. 59-66, 2010.*

Rafa E. Al-Qutaish, et al., "A Maturity Model of Software Product Quality", Journal of Research and Practice in Information Technology, vol. 43, No. 4, Nov. 2011, pp. 307-327.

Allan Baktoft Jakobsen, et al., "Towards a Maturity Model for Software Product Evaluations", Proceedings of $10^{th}$ European Conference on Software Cost Estimation (ESCOM), 1999, 6 pages.

Alain April, et al., "Software Maintenance Maturity Model ($SM^{mm}$): the software maintenance process model", Journal of Software Maintenance and Evolution: Research and Practice, vol. 17, 2005, pp. 197-223.

Alexandre Alvaro, et al., "A Software Component Maturity Model (SCMM)", $33^{rd}$ Euromicro Conference on Software Engineering and Advanced Applications (SEAA), 2007, 8 pages.

* cited by examiner

Fig. 17

|  | | Duplication | Test quality | Unit complexity | Unit size | Volume |
|---|---|---|---|---|---|---|
| ISO 9126 maintainability | Analyzability | × | | | × | × |
| | Changeability | × | | × | | |
| | Stability | | × | | | |
| | Testability | | × | × | × | × |

Properties

Fig. 19

| TQP Score (q) | Certification Level | Description |
|---|---|---|
| 90<= q <=100 | Excellent | Software satisfies all quality criteria and achieves quality level of excellent. |
| 75<= q < 90 | Good | Software satisfies and achieves the quality level of good. |
| 50< =q < 75 | Basic | Software satisfies and achieves the quality level of basic which also means average and acceptable. |
| 0 <= q< 50 | Poor | Software attains quality level of poor and unsatisfactory. |

| Quality Attribute | Definition |
|---|---|
| Consistency | "Code possesses characteristic internal consistency to the extent that it contains uniform notation, terminology and symbology within itself, and external consistency to the extent that the content is traceable to the requirements. Internal consistency implies that coding standards are homogeneously adhered to; e.g., comments should not be unnecessarily extensive or wordy in one place or insufficiently informative in another. The number of arguments in subroutine calls match with subroutine header, etc. External consistency implies that variable names and definitions, including physical units, are consistent with a glossary; or there is a one-to-one relationship between functional flow chart entities and coded routines or modules, etc." |
| Efficiency | "The capability of the software product to provide appropriate performance, relative to the amount of resources used, under stated conditions." |
| Maintainability | "Effort required to locate and fix an error in an operational program". Maintainability contains correction, prevention, and adaptive maintenance." |
| Reliability | "Code possesses the characteristic reliability to the extent that it can be expected to perform its intended functions satisfactorily. This implies that the program will compile, load, and execute, producing answers of the requisite accuracy; and that the program will continue to operate correctly, except for a tolerably small number of instances, while in operational use. It also implies that it is complete and externally consistent, etc." |
| Testability | "The capability of the software product to enable modified software to be validated." |
| Understandability | "Code possesses the characteristic understandability to the extent that its purpose is clear to the inspector. This implies that variable names or symbols are used consistently, modules of code are self-descriptive, and the control structure is simple or in accordance with a prescribed standard, etc." |
| Usability | "The capability of the software product to be understood, learned, used and found to be attractive by the user, when used under specified conditions." |
| Security | "The capability of the software product to protect information and data so that unauthorized persons or systems cannot read or modify them and authorized persons or systems are not denied access to them." |
| Extensibility | "Is related to flexibility and describes the ease with which a system can be extended [9]. This includes functional as well as non-functional extensions. A functional extension would be to extend an iPhone App so that it makes use of Google Maps API and thus brings new functions to the user. A non-functional extension is, e.g., to add shadows around buttons (no new functionality to the user)". |
| Safety | "The capability of the software product to achieve acceptable levels of risk of harm to people, business, software, property or the environment in a specified context of use". |
| Completeness | "Code possesses the characteristic completeness to the extent that all its parts are present and each part is fully developed. This implies that external references are available and required functions are coded and present as designed, etc". |
| Conciseness | "Code possesses the characteristic conciseness to the extent that excessive information is not present. This implies that programs are not excessively fragmented into modules, overlays, functions and subroutines, nor that the same sequence of code is repeated in numerous places, rather than defining a subroutine or macro; etc". |
| Legibility | "Code possesses the characteristic legibility to the extent that its function is easily discerned by reading the code. (Example: complex expressions have mnemonic variable names and parentheses even if unnecessary.) Legibility is necessary for understandability". |
| Reusability | "Extent to which a program can be used in other applications - related to the packaging and scope of the functions that programs perform". |
| Modularity | "Those attributes of the software that provide a structure of highly independent modules". |
| Complexity | "This attribute indicates the effort necessary to develop software in a specified environment". |

*FIG. 24*

| | Consistency | |
|---|---|---|
| coherence coefficient (c coeff) [66] | "Extract words contained in the comment and compare it to the words contained in the method name." | Ratio |
| Distinct Argument Ratio (DAR) [67] | $DAR = \dfrac{DAC}{n_a}$<br><br>"where na is the Argument Count of the interface" | Ratio |
| | EFFICIENCY | |
| Efficiency [68] | Efficiency = (Code Area / Execution Time) * Qr where "Qr = Quality Quotient (on a scale of 1 to 10 given by user)." | Ratio |
| Response Time [69] | Ri = Wi + Si<br>Si: Average server time of resource i, when one transaction process access resource i every time.<br>Wi: Average wait time of queue i, when one transaction process access queue i every time.<br>Ri: Average response time of queue i, when one transaction process in queue i. | Absolute |
| the number of transactions [69] | Ni = Niw + Nis, it measures (throughput) | Absolute |
| resource utilizations [69] | Ui=Xi x Si<br><br>"Example: In 120s, one resource executes 45 transaction processes. Each transaction process cost 19.0ms. During this time, what is this resource utilization?<br>Ui = Xi x Si = 45 x 0.019 = 0.855 =85.5%" | Ratio |
| Function call efficiency [70] | "The ratio between FUNCTION CALLS and STATEMENTS" | Ratio |

FIG. 25A

| Level Number | Capability Level Name | Recommended Thresholds |
|---|---|---|
| 1 | Not Compliant (NC) | Less than 20% compliant |
| 2 | Partially Compliant (PC) | Between 20% - 60% compliant |
| 3 | Largely Compliant (LC) | Between 60% - 90% compliant |
| 4 | Fully Compliant (FC) | Over 90% compliant |

*FIG. 27A*

| Product Quality Attribute | Metric Number | Metric Name | Threshold | PQAM Value | Comparison | Capability Level |
|---|---|---|---|---|---|---|
| Maintainability | Metric 1 | Class Stability Metric (CSM) | 0.97 | 0.88 | 90% | 3 |
| | Metric 2 | Number of Components | 842 | 690 | 82% | 3 |
| Usability | Metric 1 | System Usability Scale (SUS) | 8 | 8 | 100% | 4 |
| | Metric 2 | Usability Metric for User Experience (UMUX) | 4 | 4 | 100% | 4 |
| Reliability | Metric 1 | Mean Time Between Failure (MTBF) | 450 | 378 hours | 84% | 3 |

*FIG. 27B*

| Quality Attribute | Metric 1 Capability Level | Metric 2 Capability Level | Average PQA Capability Level | PQA Capability Level | PQA Weight | Average Capability Level |
|---|---|---|---|---|---|---|
| Maintainability | 3 | 3 | 3 | 3 | 30% | 0.9 |
| Usability | 4 | 4 | 4 | 4 | 50% | 2 |
| Reliability | 3 | NA | 3 | 3 | 20% | 0.6 |
| | | | | | TOTAL | 3.5 |
| | | | | Software product Maturity Level | | 3 |

*FIG. 27C*

METHOD, APPARATUS, AND NON-TRANSITORY COMPUTER READABLE MEDIA FOR THE ASSESSMENT OF SOFTWARE PRODUCTS

BACKGROUND OF THE DISCLOSURE

Technical Field

The present disclosure relates to a method, apparatus, and non-transitory computer readable medium to objectively measure the quality of software products.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Software quality has gained a lot of attention from academia and industry due to its important role in modern-day business success. See E. van Veenendaal and J. McMullan, *Achieving software product quality*: UTN Publishers, 1997, incorporated herein in its entirety. The quality of software is critical and especially important in real-time systems that may lead to loss of human life if a failure occurs in the system. A lot of research in software engineering is done to assess the quality of software. See M. O. D. a. T. P. Allan Baktoft Jakobsen, "Towards a maturity model for software product evaluations," in Proceedings of 10th European conference on software cost estimation (ESCOM'99), 1999; R. E. A. Al-Qutaish, Alain, "A maturity model of software product quality," Journal of Research and Practice in Information Technology, vol. 43, pp. 307-327, 2011; A. Alvaro, E. S. d. Almeida, and S. L. Meira, "Towards a Software Component Certification Framework," presented at the Proceedings of the Seventh International Conference on Quality Software, 2007; A. April and Coallier, "*Trillium*: a model for the assessment of telecom software system development and maintenance capability," in Software Engineering Standards Symposium, 1995. (ISESS'95) 'Experience and Practice', Proceedings, Second IEEE International, 1995, pp. 175-183, incorporated herein in their entirety. Capability Maturity Model Integration (CMMI) is a process improvement framework that was defined by the Software Engineering Institute (SEI) of Carnegie Mellon University (CMU). SEI philosophy in their concentration on the process is that the produced product quality is highly affected by the quality of the process that is used to develop the software product. In other words, CMMI focus is to improve the development process in an organization based on the following premise "the quality of a system or product is highly influenced by the quality of the process used to develop and maintain it". See F. B. Abreu, M. Goulão, and R. Esteves, "Toward the design quality evaluation of object-oriented software systems," in *Proceedings of the 5th International conference on Software Quality*, Austin, Tex., USA, 1995, pp. 44-57, incorporated herein in its entirety. However, previous research has been convincing that dealing with "process quality" is not sufficient to ensure the product quality, hence the assessment of "software product quality" is also needed. See T. Maibaum and A. Wassyng, "A product-focused approach to software certification," *Computer*, vol. 41, pp. 91-93, 2008, incorporated herein in its entirety. Moreover CMMI requires processes used by software development organizations such as project planning, resolving issues in the project, and other measures that are used in the project to be documented. The documents are required to assess the maturity level of the organization's processes or to describe the organization's overall performance. See C. P. Team, "CMMI® for Development, Version 1.3," CMU/SEI-2010-TR-0332010, incorporated herein in its entirety. This leads to the proposal of a framework that enables the assessment of the final software product (code) without depending on the development process of the software. The proposed framework can evaluate the software product quality without requiring a documented process or a software development methodology thereby making the assessment of the software product much easier.

The term quality is non-specific and there is no general consensus on a definition of the word quality. Gillies defines quality as how successfully a product can satisfy people who use it and how successfully it enables them to realize the benefits of using it. See A. C. Gillies. (1997) "Software Quality" (2nd), incorporated herein in its entirety. Pressman stated that quality is "conformance to explicitly stated functional and performance requirements, explicitly documented development standards, and implicit characteristics that are expected of all professionally developed software." See R. S. Pressman. (2004), "Software engineering: A practitioner's approach," incorporated herein in its entirety.

ISO defines quality as "the totality of characteristics of an entity that bear on its ability to satisfy stated and implied needs". See I.I.I. technology. (1999) "Software product evaluation—Part 1," incorporated herein in its entirety. On the hand IEEE defines quality as "the degree to which a system, component, or process meets specified requirements and customer (user) needs (expectations)". See IEEE, "Standard Glossary of Software Engineering Terminology. New York, N.Y., USA, Institute of Electrical and Electronics Engineers," 1990, incorporated herein in its entirety.

Hence, there are many definitions of quality in terms of both technical and non-technical properties from the user perspective like availability, usability, and maintainability, (i.e. whether the user requirements and needs satisfied). Generally, quality can be assessed from two main points of view: the first is technical and the other is user-oriented. Process and product assessments focus on technical aspects. These days rigor has increased in the development process to produce a reusable, maintainable and robust final product this being the software engineers' view. On the other hand a user oriented perspective concentrates on user satisfaction with the product.

Garvin provided a more complex definition of quality. Garvin defines quality from five perspectives in different domains and categorizes them in two groups as outlined below. See D. A. Garvin, What Does "Product Quality" Really Mean?: Sloan Management Review, 4, 1984, incorporated herein in its entirety.

A. Technical Views
   1. Transcendent approach: there is no specific definition for quality. In other words, the term quality can be gained thorough experience not through specific definition.
   2. Product-based approach defines quality as a quantitative variable that can be measured through a certain set of attributes that are possessed by the product.
   3. Manufacturing-based approach: define quality as how the final product is conformed to the requirements. This approach is concerned on the engineering and manufacturing side.

B. People-Oriented View
1. User-based approach defines the quality as how the product can satisfy the of the consumers? This approach is the most approach that has a subjective definition of the quality than other approaches.
2. Value-based approach: they define quality in terms of prices and cost of the performance of the product that the customer can afford.

The manufacturing-based view is the approach that is most popular with software engineers and lies under waterfall development methodology. The two approaches of the people-oriented category are more common than other approaches.

These days academia and industry pay much attention to software quality because they play important roles in modern-day business, and to some extent modern-day living. In the last decade software quality has improved significantly because new techniques and technologies have been adopted to improve software product quality.

Software development companies are recognizing that managing the development process will lead to the production of better quality software. See I. Sommerville, Software Engineering. UK: Addison-Wesley, 2007; M. S. a. M. Niazi, "Systematic review of organizational motivations for adopting CMM-based SPT," Information and Software Technology Journal, vol. 50, pp. 605-620, 2008; B. Pitterman, "Telcordia Technologies: The journey to high maturity," IEEE Software, vol. 17, pp. 89-96, 2000; G. Yamamura, "Software process satisfied employees," IEEE Software, pp. 83-85, 1999, incorporated herein in their entirety. Software process improvement (SPI) approach is widely used to address the effective management of the development process. Research has shown that organizations using SPI in their software development process will lead to production of high quality products, decrease development time and cost, and increase the development productivity. See N. Ashrafi, "The impact of software process improvement on quality: in theory and practice," Information & Management, vol. 40, pp. 677-690, 2003; G. K. James J. Jianga, Hsin-Ginn Hwang. Jack Huang, and Shin-Yuan Hung, "An exploration of the relationship between software development process maturity and project performance," Information & Management, pp. 279-288, 2004, incorporated herein in their entirety. The following studies describe the impact of using SPI on software quality. Staples and Niazi performed a systematic literature review in order to investigate the reasons organizations had for adopting CMM-based SPI approaches. The results showed that 70% of the organizations had adopted CMM-based SPI approaches to improve the quality of their products. Yamamura made a survey of an organization that had been assessed as SW-CMM level 5 before and after applying the process improvement. The result showed that there is a correlation between process improvement and satisfaction of employees. Employee satisfaction increased by 26% and average satisfaction moved from "neutral" to "very satisfied" rating. Diaz and Sligo showed that the defect rate decreased by half as the CMM level increased, also defect injection in projects at level 2 was eight times higher than projects at level 5. J. Herbsleb and D. Goldenson showed that increases in the maturity level led to greater success in meeting schedule and budget goals, increased staff morale and customer satisfaction. See M. D. a. J. Sligo. (1997), How Software Process Improvement Helped Motorola. 14, 75-81; J. H. a. D. Goldenson, "A systematic survey of CMM experience and results," presented at the 18th international conference on software engineering (ICSE-18), Berlin, Germany, 1996, incorporated herein in their entirety. For example the ability to meet schedules and the budgets increased from 40% for companies at CMMI level 1 to 80% and 78% for companies at CMMI level 3. Customer satisfaction increased from 80% for companies at CMMI level 1 to 100% for companies at CMMI level 3.

Nowadays software quality plays an important role in developing different types of software applications. The quality of software is critical and important, especially in real-time systems that may lead to loss of human life when a failure occurs in the system. There is no general consensus on the definition of software quality. A model can be defined as an abstract view of the reality that eliminates the details. There are different types of models such as the cost estimation model, maturity model, quality model, etc. Quality models help software engineers, developers, project managers, software customer, etc. in assessing the quality of the software product to decide whether it meets their requirements or not. Also software organizations use quality models to evaluate their final product to decide if the product is ready for deployment. Software metrics are used to assess the desired related quality attributes in the quality models. Usually software quality models are organized in multi-levels. The highest level contains the software quality attributes (called quality characteristics or factors) like: maintainability, testability, etc. External quality attributes comprise a set of internal quality attributes (called sub-characteristics) which depend on them such as: coupling, cohesion, etc.

There are several quality models in the literature for different types of applications such as desktop, mobile, components, web-services and web applications. The focus here will be on popular software quality models.

McCall et al defined the software product quality model to guide acquisition managers in U.S. Air Force Electronic Systems Divisions and Rome Air Development Centers. See J. A. McCall, P. K. Richards, and G. F. Walters, "Factors in software quality. Volume I. Concepts and Definitions of Software Quality," DTIC Document 1977, incorporated herein in its entirety. McCall's model is one of the most well-known quality models in software engineering. It consists of a hierarchy of three levels which are: factors, criteria, and metrics; 11 quality factors (external quality attributes) which reflect the user's view; and 23 quality criteria (internal quality attributes) which reflect the developer's view as shown in Table 1.1.

TABLE 1.1

McCall's Quality Model Factors and Criteria

| Factors | Criteria |
| --- | --- |
| Correctness | Traceability |
|  | Consistency |
|  | Completeness |
| Reliability | Error tolerance |
|  | Simplicity |
|  | Consistency |
|  | Accuracy |
| Efficiency | Execution efficiency |
|  | Storage efficiency |
| Integrity | Access control |
|  | Access audit |
| Usability | Operability |
|  | Communicativeness |
|  | Training |

TABLE 1.1-continued

McCall's Quality Model Factors and Criteria

| Factors | Criteria |
|---|---|
| Maintainability | Simplicity |
| | Conciseness |
| | Consistency |
| | Self-descriptiveness |
| | Modularity |
| Flexibility | Self-descriptiveness |
| | Expandability |
| | Generality |

Each Factor in McCall's quality model can be defined as follows:
1. Correctness: The extent that the program can fulfill the user requirements.
2. Reliability: The ability to perform the job preciously as required.
3. Efficiency: The amount of resources required to perform a task.
4. Integrity: The extent to which the program can protect itself from unauthorized activities.
5. Usability: The required effort from the user in order to use the program without difficulties.
6. Maintainability: The ease of finding and fixing bugs in the program.
7. Flexibility: The required effort needed to modify the program.
8. Testability: The ease of testing the program to make sure it meets the requirements.
9. Portability: The effort required to move the program from one environment to another.
10. Reusability: The ease of using the software in other applications.
11. Interoperability: The required effort to link two systems.

Bohem et al. developed his quality model in 1971 to automate and quantitate the evaluation of the software product. See B. W. Boehm, J. R. Brown, and M. Lipow, "Quantitative evaluation of software quality," in Proceedings of the 2nd international conference on Software engineering, 1976, pp. 592-605, incorporated herein in its entirety. Bohem's model consists of 3 levels: high-level characteristics, intermediate level characteristics, and primitive characteristics. Intermediate level characteristics are an essential element for high-level characteristics, and primitive characteristics are a necessary condition for intermediate level characteristics from the author's point of view. Bohem's model is considered to be one of the first proposed quality models in software engineering. The higher levels and their lower associated levels are shown in Table 2.

TABLE 2

Bohem's Quality Model

| High-level characteristics | Intermediate-level characteristics | Primitive Characteristics |
|---|---|---|
| Portability | | Device-Independence |
| | | Self-Containedness |
| As-Is-Utility | Reliability | Accuracy |
| | | Self-Containedness |
| | | Completeness |
| | | Robustness/Integrity |
| | | Consistency |
| | Efficiency | Accountability |
| | | Device Efficiency |
| | | Accessibility |
| | Human Engineering | Robustness/Integrity |
| | | Accessibility |
| | | Communicativeness |
| Maintainability | Testability | Accountability |
| | | Accessibility |
| | | Communicativeness |
| | | Self-Descriptiveness |
| | | Structuredness |
| | Understandability | Consistency |
| | | Self-Descriptiveness |
| | | Structuredness |
| | | Conciseness |
| | | Legibility |
| | Modifiability | Structuredness |
| | | Augmentability |

The quality attributes in the intermediate-level characteristics of Bohem's quality model can be defined as follows:
1. Reliability: The extent to which the program can perform its intended job accurately.
2. Efficiency: The extent to which the program can operate without wasting resources.
3. Human Engineering: The extent to which the program can be used easily by the user.
4. Testability: The extent to which the program meets the requirements.
5. Understandability: The ease of reading the code and clearly comprehending its purpose.

Dromey developed a software product quality model. Dromey's model recognizes that the quality evaluation of each product is different. See R. G. Dromey, "A model for software product quality," Software Engineering, IEEE Transactions on, vol. 21, pp. 146-162, 1995, incorporated herein in its entirety. Dromey linked the product properties with the quality attributes in standard ISO-9126. As shown FIG. 1, there are four categories of product properties and seven quality attributes.

The International Organization for Standardization and International Electrotechnical Commission published the first version of ISO/IEC 9126 standard in 1991 which is an international standard for evaluation of software product quality. After that, ISO and IEC expanded ISO/IEC 9126 into the following parts:
1. ISO/IEC IS 9126-1: quality model
2. ISO/IEC TR 9126-2: external metrics
3. ISO/IEC TR 9126-3: internal metrics
4. ISO/IEC TR 9126-4: quality in use metrics This quality model contains 6 characteristics which are divided into 27 sub-characteristics for internal and external quality attributes and 4 quality-In-Use characteristics as shown in FIG. 2 and FIG. 3 respectively.

We can measure the characteristic by using the metrics of the sub-characteristics and using an appropriate aggregation method to combine the values of the measurements into a single value. The developer, evaluator, or the quality manager can modify the metrics or add metrics which are not listed in the quality models.

The external/internal quality attributes can be defined as the following:
1. Functionality: The extent to which the software functionality meets the requirements under the specified conditions.

2. Reliability: The ability of the software to operate under the specified conditions.
3. Usability: The ease of learning and using the system.
4. Efficiency: The extent to which the software can operate with performance that is relative to the resources that are used.
5. Maintainability: The ease of modifying the software, fixing bugs, and adding additional features.
6. Portability: The ability of the software to be moved from one environment to another.

The quality-in-use quality attributes can be defined as the following:
1. Effectiveness: "The capability of the software product to enable users to achieve specified goals with accuracy and completeness in a specified context of use."
2. Productivity: "The capability of the software product to enable users to expend appropriate amounts of resources in relation to the effectiveness achieved in a specified context of use."
3. Safety: "The capability of the software product to achieve acceptable levels of risk of harm to people, business, software, property or the environment in a specified context of use."
4. Satisfaction: "The capability of the software product to satisfy users in a specified context of use."

Samoladas et al. defined a quality model to evaluate open source systems. The new quality model called Software Quality Observatory for Open Source Software (SQO-OSS). The SQO-OSS model is constructed using GQM approach and ISO-9126 model. The authors provide metrics to measure the quality attributes of the model based on its definition on ISO-9126. SQO-OSS model is shown in FIG. 4. See I. O. f S. (ISO), "ISO/IEC IS 9126: Software Product Evaluation—Quality Characteristics and Guidelines for their Use," 1991; I Samoladas, G. Gousios, D. Spinellis, and I. Stamelos, "The SQO-OSS quality model: measurement based open source software evaluation," in Open source development, communities and quality, ed: Springer, 2008, pp. 237-248; V. R. Basili, G. Caldiera, and H. D. Rombach, "The Goal Question Metric Approach, Chapter in Encyclopedia of Software Engineering," ed: Wiley, 1994, incorporated herein in their entirety.

Olsina et al reused and extended ISO 9126-1 quality model to develop a quality model for web application. See L. Olsina, R. Sassano, and L. Mich, "Towards the Quality of Web 2.0 Applications," in 8th International Workshop on Web Oriented Software Technology (IWWOST2009), 2009, incorporated herein in its entirety. The author added a "Quality Content" characteristic to ensure the quality of information (text) in the website. "Quality Content" can be defined as "the capability of a Web product to deliver information which meets stated and implied needs when used under specified conditions". The new characteristic is divided into 4 sub-characteristics. The extended model is shown in FIG. 5.

Franke et al. proposed a software quality model for mobile application. See D. Franke, S. Kowalewski, and C. Weise, "A mobile software quality model," in Quality Software (ASIC), 2012 12th International Conference on, 2012, pp. 154-157, incorporated herein in its entirety. The author used McCall's, Bohem's, and ISO-9126 quality models in developing his model. The authors included only the most important quality attributes for mobile software so it would be easier for the developers to focus on these quality attributes. The proposed model can be easily extended for a specific application. The proposed model contains 7 characteristics as shown in FIG. 6.

The quality attributes of Franke's model can be defined as the following:
1. Flexibility: The effort required to modify the software so as to be able to work on it in another environment.
2. Extensibility: The effort required to extend the software.
3. Adaptability: The extent to which the software can be adapted to changes.
4. Portability: The effort required to make the software runs on a different platform.
5. Usability: The ease of using the software for an end user.
6. Efficiency: The amount of resources used by the software to do the work.
7. Data Persistence: The capability of the software to save its state.

Zahra et al. proposed a quality model for mobile application. See S. Zahra, A. Khalid, and A. Javed, "An Efficient and Effective New Generation Objective Quality Model for Mobile Applications," International Journal of Modern Education and Computer Science (IJMECS), vol. 5, p. 36, 2013, incorporated herein in its entirety. The proposed model is derived from ISO-9126 characteristics and sub-characteristics that can be applied to mobile applications. Zahra's quality model is a general model where the developers can tailor the model for a specific application. The model contains 6 characteristics and 4 sub-characteristics as shown in FIG. 7.

The characteristics of Zahra's model can be defined as follows:
1. Functionality: The extent to which the software meets the requirements and the specification of the user.
2. Usability: The ease of using the software and having an interactive interface.
3. Efficiency: The amount of resources that the software uses as well as the time it takes to do a specific task.
4. Maintainability: The effort required to add extra functionality to the software and the ability of the software to adapt to environment changes.
5. Data Integrity: The ability of the software to save the information in case of crash or pausing the software.
6. Portability: The extent to which the software can run on different platforms.

Efforts have been made for several decades to improve the quality of software. Software organizations have long been concerned about the quality of their products. See M. Lepmets, "Which Process Model Practices Support Project Success?," presented at the 17th European Conference, EuroSPI 2010, 2010; M. N. Mark Staples, Ross Jeffery, Alan Abrahams, and a. R. M. Paul Byatt, "An exploratory study of why organizations do not adopt CMMI," The Journal of Systems and Software, vol. 80, pp. 883-895, 2007; S. Zahran. (1999), incorporated herein in their entirety. Software process improvement: practical guidelines for business success. Many software organizations place customer satisfaction as their highest priority in order to compete with other quality software. See C. V. W. Mark C. Paulk, Bill Curtis, and Mary Beth Chrissis. (1994). The Capability Maturity Model: Guidelines for Improving the Software Process. California, US, incorporated herein in its entirety. Software quality becomes more important as it is increasingly depended upon to run our day-to-day lives. Software process improvement is the approach that is most commonly used of several approaches that have been developed to address software quality issues. See SEI. (2008). *Process Maturity Profiles*, incorporated herein in its entirety.

SPI offers a powerful way for software organizations to measure their capabilities to develop systems and for them to discover their strong and weak points. Organizations, after identifying their strengths and weaknesses, are able to start process improvement programs and to clearly define achievable goals. SPI helps software organizations understand their development process. These organizations can then identify areas that can be controlled in order to achieve a specific product outcome. See W. S. Humphrey. (1995). *A Discipline for Software Engineering*, incorporated herein in its entirety.

Rico defined the SPI as "the discipline of characterizing, defining, measuring, and improving software management and engineering processes, leading to successful software engineering management, higher product quality, greater product innovation, faster cycle times, and lower development costs, simultaneously." See D. F. Rico. (1997, 6-10-2014). Software Process Improvement (Impacting the Bottom Line by using Powerful "Solutions"), incorporated herein in its entirety. O'Regan defined SPI as "A program of activities designed to improve the performance and maturity of the organization's software processes and the results of such a program." See G. O'Regan. (2010). Introduction to software process improvement, incorporated herein in its entirety. Sommerville stated that "SPI involves understanding existing processes and changing these processes to improve product quality and/or reduce costs and development time". Process improvement does not mean to apply a specific method or tool that is used by others, rather process improvement should be adopted as an activity peculiar to the organization. Rico and Sommerville focus on the SPI definition to increase the quality of software while decreasing development time and cost. Approaches to Software Process Improvement There are many studies in software process improvement. We will present the most popular software process improvement approaches in the literature which their focus on the quality of the software.

Capability Maturity Model of Integration (CMMI) is a process improvement framework that was defined by the Software Engineering Institute (SET) of a Carnegie Mellon University (CMU).

CMMI improves the processes performance through providing a set of practices to organizations. CMMI process improvement identifies the strengths and weaknesses in an organization's processes, then it converts weaknesses into strengths by bringing about process changes. See C. Institute. (14-10-2014). *CMMI Overview*, incorporated herein in its entirety. CMMI has been adopted by over 5000 organizations all over the world. CMMI has a set of best practices that help to improve quality, efficiency, and effectiveness in organizations. The complete list of practices and process area can be found in and respectively. See C. Institute. (14-10-2014). CMMI Overview; C. Institute, "What is CMMI?"; C. Institute. (14-10-2014). CMMI Process Areas, incorporated herein in its entirety CMMI defines three constellations that can be defined as a collection of best practices and process improvement goals that are used to build models, appraise related documents, and develop training material for an organization's interest area. These goals and practices are grouped into different process areas. The constellations are:

1. CMMI for Development (CMMI-DEV): model is used in process improvement and developing the quality of the services and products in the organizations
2. CMMI for Acquisition (CMMI-ACQ): process model that provides guidance to the organizations for managing the acquisition of services and products that meet customer needs
3. CMMI for Services (CMMI-SVC): model that guides organizations in initiating, managing and deploying the services that meet the customers and end-users requirements CMMI for development (CMMI-Dev) v 1.3 is the latest model from the Software Engineering Institute (SEI) that was released in 2010. CMMI is an integration of three source models—Capability Maturity Model for Software (SW-CMM), Electronic Industries Alliance standard 731 (EIA 2002a), and Integrated Product Development Capability Maturity Model (IPD-CMM)—that were selected based on their successful adoption in processes improvement in organizations. CMMI was created to overcome the use of multiple CMMs. The CMMI framework can suit multiple disciplines: software engineering, systems engineering, hardware engineering and Integrated Process and Product Development. See J. Persse, *Project Management Success with Seven CMMI Process Areas*: Prentice Hall, 2007, incorporated herein in its entirety. It also gives flexibility by supporting two different representations (staged and continuous representations).

CMMI was built using information from well-known models, software development practices of organizations which have a high CMM maturity level and have practiced these models for a long time, and the knowledge of the best systems. FIG. 8 shows the models that were used over time that led to CMMI v 1.3.

The main objective of the CMMI is to measure the degree to which processes are well-defined and managed in organizations, in other words it measures an organization's capability. CMMI describes an evolutionary path to develop and improve the organizations' processes from immature and chaotic processes to mature and optimized processes. The CMMI consists of five maturity levels. These levels are: Initial, Managed, Defined, Quantitatively Managed, and Optimizing (shown in FIG. 9). Maturity level 1 represents the lowest state and the starting point in the staged representation whereas maturity level 5 represents the highest state of maturity that the organization can achieve in the staged representation.

CMMI-Dev contains several process areas (PAs). There are twenty-two PAs in CMMI-Dev that are split as the following: sixteen core PAs that are common to all CMMI models, one shared PA that is shared between at least two CMMI models, and five specific PAs. Each maturity level contains several PAs that should be satisfied to achieve that maturity level, and for each PA there are different goals (both generic and specific) that are described and must be presented to satisfy the PA. For each goal several practices are identified and described in order to help organizations understand how to achieve the goals and the expected results of adopting these practices. For a particular maturity level to be achieved by an organization, all the goals that are associated with the PAs for that level and the lower levels must be satisfied. Applying the practices of higher level maturity without completing all the practices in the lower levels will put at risk their success because the basis of the higher level maturity practices will be incomplete (lower level maturity practices not having been put into practice first).

There are two representations in staged and continuous. In the staged representation, the maturity levels offer an ordered and recommended way of improving the organization processes in stages as shown in FIG. 10. There are PAs within each maturity level and within each PA there are generic and specific goals which contain generic and specific practices. All of these goals and practices in a particular level and lower levels should be maintained to achieve a particular level. There are five maturity levels in the staged representation with the description of each level shown in Table 4.

TABLE 4

Maturity Levels of CMMI in Staged Representation

| Level | Maturity Level | Description |
|---|---|---|
| 1 | Initial | The processes are chaotic, there is no defined plan. Success mainly depends on employee experience. |
| 2 | Managed | The processes are managed, monitored, and controlled according to a defined plan and involve experienced people and stakeholders to produce the desired output. |
| 3 | Defined | The processes are well-defined in standards, methods, and tools. These standards are used to maintain consistency across all projects by tailoring standards. |
| 4 | Quantitatively Managed | The methods used to quantify the quality and performance of processes to manage projects in order to satisfy end-users have been established. |
| 5 | Optimizing | The processes have been continuously improved based on quantitative objectives. |

In continuous representation, shown in FIG. 11, specific goals organize specific practices and generic goals organize generic practices and each practice is associated with a capability level. Continuous representation is used by software organizations that are interested in improving a specific process area in the company. There are four capability levels in continuous representation as shown in Table 5 with the description of each level.

TABLE 5

Capability Levels of CMMI in Continuous Representation.

| Level | Capability Level | Description |
|---|---|---|
| 0 | Incomplete | The process is not performed or not fully performed (chaotic process). |
| 1 | Performed | All the work required to produce the product of that process area is fulfilled. In other words the specific goals associated with that process area are satisfied. |
| 2 | Managed | The process is managed according to a well-defined plan that specifies policies, how to execute the process, stakeholders, and howto monitor and control the process. |
| 3 | Defined | The process is tailored from the standardized processes of theorganization. |

CMMI is a useful improvement framework with defined levels, PAs, goals, and practices. CMM and its successor CMMI framework does not specify how to execute the practices or provide suggestion on how to implement them thus increasing the flexibility of organizations by allowing freedom to decide how to implement different practices for each process area.

Many organizations want to measure their process improvement progress against the CMMI for the following reasons:

1. To identify areas that can be improved by assessing their processes by CMMI processes
2. To inform clients how successfully they meet CMMI best practices
3. To satisfy customers who have asked them to follow certain CMMI practices before agreeing to establish a working relationship This measurement is done by CMMI appraisal. For organizations to use CMMI appraisal they must meet the requirements that can be found in the Appraisal Requirements for CMMI (ARC) document. Standard CMMI Appraisal Method for Process Improvement (SCAMPI) is used for organization appraisal. In other words it is used for conducting the Class A appraisal because it is the only official class. There are three types of appraisals described in the ARC document (Class A, Class B, and Class C). Depending on the requirements of the appraisal, the organization can decide which class is suitable. The appraisal classes with the definition of each class are shown as follows:

1. Class A: Used by the organization after implementing a significant process improvement. It is the only appraisal that utilizes an official method and provides the maturity level in the staged representation or the capability level in the continuous representation. This method is conducted by certified people from the Software Engineer Institute.
2. Class B: This appraisal requires less time and money when compared with the Class A. It is conducted to find the maturity level (unofficial) of the organization where it can be located.
3. Class C: This appraisal is the most flexible, takes less time, and is cheaper than Class A or Class B. It is done by people who are well-trained on CMMI and the organization processes. This method is conducted in order to address the needs that are output from gap analysis.

SPICE is a set International Standard for Software Process Assessment. See I. I. 15504, "Information technology—Software process assessment," Type 21998, incorporated herein in its entirety. SPICE provides a reference model that encourages self-assessment of software processes. The reference model describes software engineering processes that include best practices and activities. The purpose of this model is to provide a common basis of different software process assessment models, in such a way that it can help report the results of assessment in a common context even if different process assessment models are used, this will help in comparing between different software process assessment results. The architecture of the reference model has two dimensions: a process dimension and a process capability dimension. It also has nine parts:

Part 1: Concepts and introductory guide
Part 2: A reference model for processes and process capability
Part 3: Performing an assessment
Part 4: Guide to performing assessments
Part 5: An assessment model and indicator guidance
Part 6: Guide to competency of assessors
Part 7: Guide for use in process improvement
Part 8: Guide for use in determining supplier process capability
Part 9: Vocabulary The process dimension describes what has to be achieved in order to reach the defined process's purpose using measurements. The process capability dimension is characterized by process attributes which are grouped into six capability levels which have been assigned an ordinal scale. Each higher capability level represents an improvement to the management, performance, and control of the process. Table 6 shows the capability levels and the associated process attributes that can be measured as a percentage scale:

TABLE 6

SPICE Capability levels and Process Attributes

| Capability Level | Capability Level Name | Process Attributes |
|---|---|---|
| Level 0 | Incomplete process | — |
| Level 1 | Performed process | Process performance attribute |
| Level 2 | Managed process | Performance management attribute<br>Work product management attribute |
| Level 3 | Established process | Process definition attribute<br>Process resource attribute |
| Level 4 | Predictable process | Measurement attribute<br>Process control attribute |
| Level 5 | Optimizing process | Process change attribute<br>Continuous improvement attribute |

In order to achieve a specific capability level all the lower capability levels should be completed and all the process attributes of the desired level should be achieved to a certain rate specified by the model for each attribute in the desired level. The process assessment is done by a qualified assessor or by using certain tools for data collection which have been approved by an assessor.

SPICE harmonizes the existing approaches to process improvement but it does not specify how to achieve the process improvements or specify a way of achieving them. It leaves the determination of the method of specific improvement to the organization.

ISO 9000 is a family of quality system standards. See I. S. Organization. ISO-9000, incorporated herein in its entirety. The ISO 9000 contains a family of standards that are concerned with creating a common standard for quality management systems. ISO 9000 standards provide tools and methods to ensure that the product created by the organization regardless of its size or the complexity of the product meets the requirements defined by the customer.

ISO 9001: Quality systems—Is a standard in the ISO 9000 series of standards that can be applied to software development and maintenance. Model for quality assurance in design/development, production, installation and servicing ISO 9001 is a model used to ensure that suppliers confirm the specified requirements during design, development, production, installation and servicing. See D. Ince. (1994). ISO 9001 and software quality assurance, incorporated herein in its entirety. This model aims to achieve customer satisfaction during all stages from design to servicing, and it encourages organizations to inspect their internal quality management. In 1991 the International Standards Organization published ISO 9000-3, "Quality management and quality assurance standards—Part 3: Guidelines for the application of ISO 9001:1994 to the development, supply, installation and maintenance of computer software". See I. S. Organization. (11-10-2014). *ISO 9000-3:1991*, incorporated herein in its entirety.

ISO 9001:2000 has replaced 20 points from the previous version ISO 9001:1994 standard. ISO 9001:1994 and ISO 9003:1994 quality standards are obsolete.

Bell Northen Research and Northen Telecom developed the first version of TRILLIUM in 1991 which is an assessment model designed from the customer perspective. TRILLIUM is designed for embedded telecommunication systems and includes: hardware, software, documentation, and training and support services. This model is based on the SEI's CMM that it considers the product development and support processes as a part from the organization's processes. TRILLIUM has eight capability areas, and each capability area compromises a roadmap. Each roadmap contains a set of practices that were derived from benchmark exercises.

BOOTSTRAP is a methodology for process assessment and improvement of software developed by European industry and the ESPRIT project in 1992. See P. Kuvaja, "BOOTSTRAP 3.0—A SPICE Conformant Software Process Assessment Methodology," *Software Quality Control*, vol. 8, pp. 7-19, 1999, incorporated herein in its entirety. This methodology compatible with ISO/IEC 15504 contains three main phases which are: preparation, execution, and improvement planning phases. BOOTSTRAP contains five capability levels to assess an organization's processes capability for achieving their defined goals.

Al-Qutaish et al proposed the first product maturity model for assessing the quality of the software product. The proposed model was based on three models: ISO 9126, Six Sigma, and ISO 15026. The first step in determining the software product quality maturity level is to calculate the quality level using the characteristics, sub-characteristics, and measurements defined in ISO 9126, then combine the values into a single value of the quality level then covert the resulting value to six sigma. After that, find the integrity level of the software product using ISO 15026. Finally, the maturity level of the software product can be identified using FIG. 12. PMMI differs from SPQMM in having its own set of quality attributes that are collected from well-known quality models and having its own metrics that are collected from the literature which are easily applied while SPQMM is based on ISO/IEC 9126 standard's quality attributes and metrics. The limitation in SPQMM is that the assessors are forced to use the ISO 9126 quality attributes and metrics only.

The EuroScope consortium propose a maturity model of software products evaluation which is called SCOPE Maturity Model (SMM). The model has five maturity levels which are sorted from the lowest level to the highest level: initial, repeatable, defined, managed, and optimizing. The SMM model was inspired by the Capability Maturity Model (CMM). SMM levels 2, 3, and 4 use ISO 12119, ISO/IEC 9126, and ISO 14598 standards to achieve the evaluation of these levels. SMM does not focus in the final product quality (code) like PMMI. SMM is a measure of the quality in terms of matching stated specifications or requirements, and tests are executed to assess the degree to which a product meets the required specifications. SMM requires the process to be documented to ensure a product matches the specifications.

April et al. proposed the Software Maintenance Maturity Model (SMmm) that is a complement to the CMMI model. See A. April, J. Huffman Hayes, A. Abran, and R. Dumke, "Software Maintenance Maturity Model (SMmm): the software maintenance process model," *Journal of Software Maintenance and Evolution: Research and Practice*, vol. 17, pp. 197-223, 2005, incorporated herein in its entirety. SMmm addresses the unique activities that are not addressed in CMMI or other models. There are five maturity levels shown in Table 7. The steps of building this model is the same steps of building *Trillium*. SMmm focus only on maintainability but PMMI focus on different product quality attributes including maintainability. Also SMmm does not measure the product maturity level.

TABLE 7

SMmm Maturity Levels

| Level | Level name  | Risk      | Interpretation                         |
|-------|-------------|-----------|----------------------------------------|
| 1     | Performed   | Very High | Ad hoc maintenance process             |
| 2     | Managed     | High      | Basic request-based process            |
| 3     | Established | Medium    | State-of-the-art maintenance process   |
| 4     | Predictable | Low       | Generally difficult to achieve now     |
| 5     | Optimizing  | Very Low  | Technologically challenging to attain  |

Alvaro et al proposed a Software Component Maturity Model (SCMM). The model is based on ISO/IEC9126 and ISO/IEC 14598 standards. SCMM contains five levels, the lowest level is SCMM-I and the highest is SCMM-V. See A. Alvaro, E. S. de Almeida, and S. L. Meira, "A Software Component Maturity Model (SCMM)," in *Software Engineering and Advanced Applications*, 2007. 33*rd EUROMICRO Conference on*, 2007, pp. 83-92, incorporated herein in its entirety. SCMM depends mainly on the CQM (component quality model) model which has seven characteristics where each characteristic compromises a set of life-cycle and run time characteristics as show in Table 8. Each sub-characteristic has a set of attributes that represent the entity and a metric to measure these attributes as shown in Table 9. SCMM measures only the maturity of the components and it cannot assess different types of product such as enterprise applications, web-services . . . etc.

TABLE 8

A Software Component Quality model, With the Sub-Characteristics

| Characteristics  | Sub-Characteristics (Runtime)                  | Sub-Characteristics (Life cycle)                              |
|------------------|------------------------------------------------|---------------------------------------------------------------|
| Functionality    | Accuracy<br>Security                           | Suitability<br>Interoperability<br>Compliance<br>Self-contained |
| Reliability      | Fault Tolerance<br>Recoverability              | Maturity                                                      |
| Usability        | Configurability                                | Understandability<br>Learnability<br>Operability              |
| Efficiency       | Time Behavior<br>Resource Behavior<br>Scalability |                                                            |
| Maintainability  | Stability                                      | Changeability<br>Testability                                  |
| Portability      | Deployability                                  | Replaceability<br>Adaptability<br>Reusability                 |
| Marketability    | Development time<br>Cost<br>Time to market<br>Targeted market<br>Affordability | |

TABLE 2.9

Sample Of Component Quality Attributes For Runtime Sub-Charactcristics

| Sub-Characteristics (Runtime) | Attributes         | Metrics                         | Kind of Metrics |
|-------------------------------|--------------------|---------------------------------|-----------------|
| Accuracy                      | 1. Correctness     | Test results/precision          | R               |
| Security                      | 2. Data Encryption | Mechanism implemented           | P               |
|                               | 3. Controllability | N. of interfaces/kind of controllability | R   |
|                               | 4. Auditability    | Mechanism implemented           | P               |
| Recoverability                | 5. Error Handling  | Mechanism implemented           | P               |
| Fault Tolerance               | 6. Mechanism available | Mechanism identification    | P               |
|                               | 7. Mechanism efficiency | Ammount of errors tolerate/total errors found | R |
| Configurability               | 8. Effort for configure | Time spend to configure correctly | IV        |

Golden et al. proposed the Open Source Maturity Model (OSMM). See B. Golden. (2005). *Succeeding with open source*, incorporated herein in its entirety. OSMM which helps TT organizations assess and make comparisons between open source software products to identify which one is the best for a defined application. This assessment method requires three phases:

1. Assess element's maturity (define requirements, locate resources, assess element maturity, and assign element score).
2. Assign for each element weighting factors.
3. Calculate overall product maturity score.

Unfortunately, OSMM evaluates the maturity of open source products only without assessing the quality of these software products. OSMM is not primarily used to assess software product quality attributes or product maturity but to help organizations perform a comparison between open source systems.

Certifying software will increase confidence in software that passes certification. It will also make it easier to sell or purchase because there will be a reduced need for testing prior to purchase. Software certification can be granted for different types of software such as final software products and components. See P. Heck, M. Klabbers, and M. van Eekelen, "A software product certification model," Software Quality Journal, vol. 18, pp. 37-55, Mar. 1, 2010; P. M. Heck, "A Software Product Certification Model for Dependable Systems" Eindhoven: Technische Universiteit Eindhoven2006, incorporated herein in its entirety. Certification can be provided by independent agencies which function like other quality agencies such as: Software Engineering Institute which appraises CMMI Class A or ISO which grants ISO certification. Involving external agencies in providing the certificate will increase trust in the certification as Voas says that "completely independent product certification offers the only approach that consumers can trust". See J. Voas, "Developing a usage-based software certification process," Computer, vol. 33, pp. 32-37, 2000; J. Morris, G. Lee, K. Parker, G. A. Bundell, and C. P. Lam, "Software component certification," Computer, vol. 34, pp. 30-36, 2001, incorporated herein in its entirety. Most of the certification methods are process-based, from the process they can determine the quality of the final product. However, certifying the software development process only does not guarantee the quality of the final product.

Heck et al used the concept shown in FIG. 13 to propose a Software Product Certification Model for Dependable Systems. The proposed model consists of five certification levels and six product areas represented in FIG. 14 with their interrelation. Each product area is comprised of a set of elements and should achieve four generic goals (complete, uniform, correct, and consistent) as shown in Table 10. The generic goals contain a set of specific goals and properties that must be achieved to satisfy a certain level. Heck's model depends on the development process in its evaluation.

TABLE 10

Generic Goals and Generic properties of the Achievement Level

| GG1 | Complete |
|---|---|
| 0 | Some required elements are missing |
| 1 | All required elements are present |
| 2 | Semi-formal elements have been added |
| 3 | Formal elements have been added |
| GG2 | Uniform |
| 0 | No standardization |
| 1 | Within the product |
| 2 | Style complies to a company standard |
| 3 | Style complies to an industry standard |
| GG3 | Correct (within elements) |
| 0 | Faults are detected |
| 1 | Manual review/testing has not detected any faults |
| 2 | Automated testing has not detected any faults |
| 3 | Formal verification has not detected any faults |
| GG4 | (Consistent (between elements) |
| 0 | Faults are detected |
| 1 | Manual review/testing has not detected any faults |
| 2 | Automated testing has not detected any faults |
| 3 | Formal verification has not detected any faults |

Alvaro et al. propose a software component certification framework to evaluate the quality of components. The proposed framework depends on ISO/IEC 9126 and ISO/IEC 14598 and mainly on two quality models CQM and the SQuaRE (Software product quality requirements and evaluation) project. There are four steps to evaluate a component shown in FIG. 15. In the metrics framework the author uses the GQM approach to measure a component's quality attributes. Alavaro's certification model measures the components only and cannot be applied on different types of products.

Heck et al. proposed a software product certification model which is called LaQuSo (Laboratory for Quality Software) Software Product Certification Model (LSPCM) that is based on CMMI. See P. M. Heck, "A Software Product Certification Model for Dependable Systems" Eindhoven: Technische Universiteit Eindhoven2006, incorporated herein in its entirety. The proposed model has five certification levels that represent the maturity of the software products. LSPCM consist of six product areas which are the main deliverables of the development phase and each area is split into smaller parts which are called elements. The proposed model contains three certification criteria: completeness, uniformity, and conformance; and each of the certification criteria contain 4 levels as shown in Table 11. The model contains specific criteria that help achieve specific levels of certification criteria. The certification level of the final product can be computed through calculation of the certification criteria of each product area, then taking the minimum of these calculations. LSPCM's certification levels are shown in Table 12

TABLE 11

Certification Criteria Achievement Level

| CC1 | Completeness |
|---|---|
| 0 | Some required elements are missing |
| 1 | All required elements are present |
| 2 | Semiformal elements have been added |
| 3 | Formal elements have been added |
| CC2 | Uniformity |
| 0 | No standardization |
| 1 | Within the product |
| 2 | Style complies to a company standard |
| 3 | Style complies to an industry standard |
| CC3 | Conformance |
| 0 | Faults are detected |
| 1 | Manual review/testing has not detected any faults |
| 2 | Automated testing has not detected any faults |
| 3 | Formal verification has not detected any faults |

TABLE 12

LSPCM's Certification levels

1. Initial
   $CC1 \geq 1$ and $CC2 \geq 1$ and $CC3 = 0$
   Each of the required elements is present in the product, and the elements are uniform. This is the level that indicates that the required elements for certification are there, and analysis can start.
2. Manually verified
   $CC1 \geq 1$ and $CC2 \geq 1$ and $CC3 = 1$
   All elements, relationships, and properties have been manually verified.
3. Automated verified
   $CC1 \geq 2$ and $CC2 \geq 2$ and $CC3 = 2$
   All elements, relationships. and properties have been verified with tool support.
4. Model verified
   $CC1 = 3$ and $CC2 = 3$ and $CC3 = 3$
   All elements, relationships and properties have been verified with mathematically-based methods wherever passible, or the most rigorous method otherwise.
5. Formally verified
   $CC1 = 3$ and $CC2 = 3$ and $CC3 = 3$ and 'Model Input'
   Model verified where it is proven that the results of the mathematically-based methods are true for the actual input (and not only for an abstract model of it).

Heck's model evaluates the software quality based on specific criteria which do not represent all the software quality attributes; also it depends on the development process in its evaluation.

Correia et. al proposed a technical quality certification for software products that is based mainly on TSO-9126. See J. P. Correia and J. Visser, "Certification of technical quality of software products," in Proc. of the Int'l Workshop on Foundations and Techniques for Open Source Software Certification, 2008, pp. 35-51, incorporated herein in its entirety. The authors focus on technical quality instead of functional requirements due to limitations in this approach. The focus of the study was on "Maintainability" but it can be applied for other quality attributes such as reliability. The certification is based on the relationship between the system properties and the ISO-9126 standard which can be shown in FIG. 16. The raw value of the system properties are collected using metrics. After that these attributes are mapped to the sub-characteristics of maintainability as shown in FIG. 17.

In order to find a single value of maintainability, all the calculated values of sub-characteristics' that are found from the metrics are aggregated in one value that represents the characteristic which is maintainability.

Baggen et. al proposed a maintainability certificate for software products. The approach uses the maintainability definition in ISO 9126 standard. See R. Baggen, J. P. Correia, K. Schill, and J. Visser, "Standardized code quality benchmarking for improving software maintainability," Software Quality Journal, vol. 20, pp. 287-307, 2012; I. O. f. S. I. I. 9126-1, "Software engineering—product quality—part 1: Quality model," incorporated herein in its entirety. The Software Improvement Group (SIG) group identifies 6 system properties which are:

1. Volume: The size of the software.
2. Redundancy: The same code can be found in different places.
3. Unit size: The units should be small and responsible for a low number of functions, in other words the unit must be cohesive.
4. Complexity: The simplicity of the code
5. Unit interface size: The number of parameters that is needed for a particular interface.
6. Coupling: The coupling between components The above system properties are mapped with 4 sub-characteristics of the maintainability characteristic based on the impact of each system property on the maintainability's sub-characteristics which is decided by other studies and expert opinion as shown in FIG. 18. See J. P. Correia, Y. Kanellopoulos, and J. Visser, "A survey-based study of the mapping of system properties to iso/iec 9126 maintainability characteristics," in Software Maintenance, 2009. TCSM 2009. IEEE International Conference on, 2009, pp. 61-70, incorporated herein in its entirety.

After measuring each system property using metrics, the values of each quality attribute will be rated (each property has a separate rating table). After that the rated values will be aggregated to find a single maintainability value of the software, and certificate will be issued from TUV Informationstechnik GmbH (T"UViT) based on that value. The rating tables of the system properties are constructed using benchmark data (e.g. rating of duplication system property shown in Table 13). The quality level of the benchmark was based on the value of the calculated metrics, expert opinion, and consultants that evaluate the systems. The difference of this study from Correia et. al is the extra system properties (Unit Interface Sizing and Coupling) that are used in rating the software. See J. P. Correia and J. Visser, "Certification of technical quality of software products," in *Proc. of the Int'l Workshop on Foundations and Techniques for Open Source Software Certification,* 2008, pp. 35-51, incorporated herein in its entirety.

TABLE 13

Rating Table for Duplication Property

| rating | duplication |
| --- | --- |
| ★★★★★ | 3% |
| ★★★★ | 5% |
| ★★★ | 10% |
| ★★ | 20% |
| ★ | — |

Correia and Baggen certification models do not evaluate the maturity of the software product. They measure only a certain quality attribute each time. Also, they cannot measure the maturity of software product.

Yahaya et. al proposed a software product certification model. The assessment is conducted by a pre-defined interviewee answering questions (metric). See J. H. Yahaya, A. Deraman, and A. R. Hamdan, "SCfM_PROD: A software product certification model," in Information and Communication Technologies: From Theory to Applications, 2008. ICTTA 2008. 3rd International Conference on, 2008, pp. 1-6, incorporated herein in its entirety. The model uses the Likert scale (from 1 to 5), each answer on the questionnaire has a certain point on the Likert scale so at the end the interviewee can find a single value for the attribute. A weight has been assigned to each attribute, so the certification level is calculated by summing the values found for all attributes with each multiplied by its assigned weight. The certification level of this model is shown in FIG. 19. Yahaya's model depends on the requirements phase and the metrics that are used in the model are relevant to the requirements too.

Therefore, it is established that there is no maturity model that measures the quality of the final product; most of the models in the literature only focus on the quality of the development processes as does CMMI rather than the quality of the final product based on the following premise "the quality of a system or product is highly influenced by the quality of the process used to develop and maintain it". This work will fill this gap by developing a maturity model that will measure the quality of the final product. The proposed Product Maturity Model Integration (PMMI), will measure the different software quality attributes of the final product. Also PMMI looks at the quality of the software product not the quality of the software development processes like CMMI because the quality of the processes does not guarantee the quality of the final product. There has not been much work done on this area of software product assessment. Moreover PMMI is not restricted to certain software quality models or a set of metrics. PMMI gives flexibility to assessors to choose quality attributes that the stakeholders are interested in measuring. Furthermore PMMI can be applied to any software regardless of size and type which are developed by organizations of any size and using any software development methodologies. As a result, PMMI is a more flexible framework for the measurement of software product quality.

In view of the forgoing, the objective of the present disclosure is a framework to measure the quality of a product from multiple perspectives. The present disclosure proposes a method, apparatus, and non-transitory computer-readable storage medium that may help to objectively assess the quality of software products.

BRIEF SUMMARY OF THE INVENTION

The present disclosure provides a method of determining a product maturity level of one or more software products including acquiring, using circuitry, one or more parameters associated with one or more software products, the one or more parameters including one or more product quality attributes, acquiring one or more metric parameters associated with each product quality attribute, wherein the one or more metric parameters include a test methodology, evaluating one or more metric parameters to determine a metric value for each metric parameter, wherein the metric value is a numerical result, mapping a capability level to each metric parameter based on the metric values, wherein the capability level is a rating associated with a capability scale, mapping a capability level to each product quality attribute based on associated metric values, wherein the capability level is a rating associated with the capability scale, mapping a product maturity level to the one or more software products based on the capability level of one or more product quality attributes, wherein the product maturity level is a rating associated with a maturity scale, and transmitting the product maturity level of the one or more software products to an external device.

The present disclosure further provides a description of an apparatus for determining a product quality assessment of one or more software products, the apparatus having circuitry configured to carry out the method described above.

The present disclosure further provides a non-transitory computer-readable storage medium including computer executable instructions, wherein the instructions, when executed by a computer, cause the computer to perform a method for determining a software product maturity level of one or more software products as described above.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 17 is the Mapping system properties and maintainability sub-characteristics;
FIG. 19 is the Certification Level;
FIG. 24 is an exemplary table of product quality attributes 2401 and the associated definitions 2403;
FIG. 25A is an exemplary table of product quality attributes 2501 and associated product quality attribute metrics 2503;
FIG. 27A is a table of an exemplary capability scale and description;
FIG. 27B is a table of an exemplary mapping of the PQAMV to the PQAM capability level;
FIG. 27C is a table of an exemplary mapping of the PQA capability level to the focus area maturity level

DETAILED DESCRIPTION OF THE EMBODIMENTS

Figure 1:
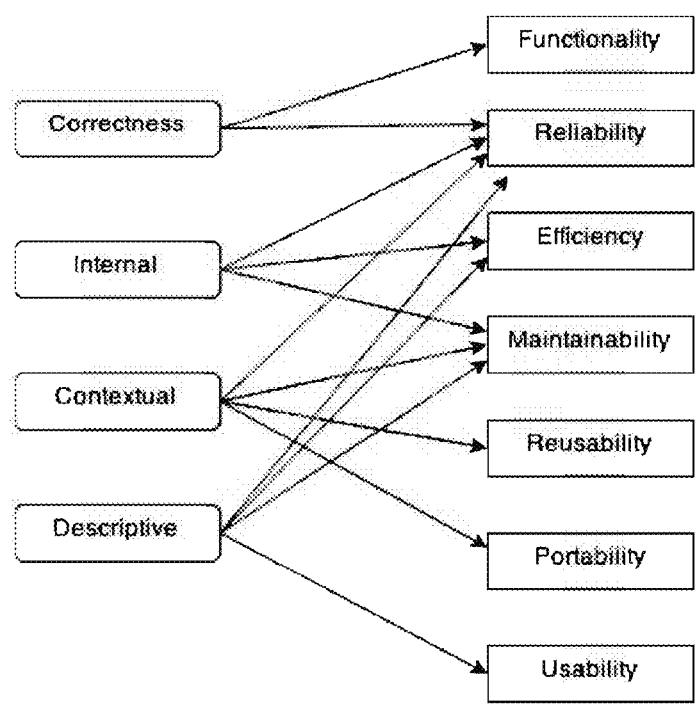
FIG. 1 is the Dromey's Quality Model.
Figure 2:
FIG. 2 is the ISO 9126 quality model for external and internal quality.

Referring now to the drawings, wherein like reference numerals designate identical or corresponding parts throughout the several views.

The present disclosure proposes a method, apparatus, and non-transitory computer-readable storage medium that can objectively assess the quality of software products. The method, apparatus, and non-transitory computer-readable storage medium relate to determining a software product maturity level of one or more software products.

The method is referred to as the Technical Capability Maturity Model (T-CMMI). The T-CMMI relies on two parts to achieve the final assessment of the quality of a software product. The two parts are referred to as the reference model or Product Maturity Model Integration (PMMI) and assessment method or Product Maturity Assessment Method (PMAM). FIG. 210 depicts a schematic of the structure of the T-CMMI 2000 including the PMMI 2001 and PMAM 2002. PMMI 2001 is the first part, which may include selecting a product to be assessed, acquiring information about the software product that is being assessed, and preparing an assessment rating scale. The second part, PMAM 2002, provides a guideline for the assessment of the acquired information relative to trends and data sources of previously collected product information.

The reference model for the T-CMMI 2000 or the PMMI 2001 includes a definition of the assessment scale which may be a capability scale and a maturity scale. The capability scale and maturity scale may have a plurality of levels which correlate to an ability of the software product to achieve a predefined threshold.

PMMI 2001 may contain a set of recommended quality attributes and metrics to measure these quality attributes. PMMI 2001 is comprised of two focus-areas which concentrate on the internal and external quality attributes of the product. The purpose of the Reference Model is to provide a platform and a focus for gathering evidence for product quality indicators that will be used to assess the product maturity level during the Product Maturity Assessment. The PMMI 2001 output is an input of the PMAM 2002.

The assessment method is called Product Maturity Assessment Method (PMAM) 2002. PMAM assess the final software product according to the reference model. PMAM 2002 may contain guidelines and checklists with an example to illustrate how a product assessor follows the guidelines in order to measure the capability level and product maturity level for both of PMMI's focus-areas. The purpose of the PMAM 2002 is to provide a standard method for assessing a product maturity/capability by assessing the degree to which the product conforms to one or more stakeholders' required quality attributes.

The product assessor, which may also be referred to as the assessor, is the processor within the apparatus executing the method described herein. The product assessor may implement the process described below and in FIG. 21. The method steps are described in FIG. 21 and divided into the T-CMMI 2000 parts of PMMI 2001, and PMAM 2002. The product assessor In some implementations, to develop the method of determining a maturity level to evaluate the quality of the software product the following methodology is used (FIG. 21).

1. List product quality models and corresponding classifications from the literature. Select a recommended list of product quality attributes with their definitions to be included in the framework from the identified list of the product quality models. The quality attributes list will be a base for a user or the assessor to select from.
2. Identify the general structure of the PMMI including a scope of each component in the framework.
3. Define, for each PMMI stage, the recommended list of product quality attributes based on the defined scope of that stage.
4. Define a recommended stakeholder, which may be a user, a developer, and/or a supplier for each PMMI instance based on the interest of the stakeholder in the present particular stage.
5. Conduct a review of data sources for the available software product metrics to identify, assess, and analyze the related metrics in the data source review to the identified quality attributes in step 1.
6. Evaluate and select the metrics to measure the product quality attributes (recommended list of metrics). These metrics will be used to determine the maturity of the software product.
7. Develop a maturity scale which includes capability and maturity levels with their thresholds. The maturity scale describes the quality of the software based on the maturity level it belongs to. So the users can determine from the maturity level of the product if it meets quality requirements or not
8. Develop the PMMI after its structure, stages, stages' scope, stakeholders, quality attributes, and metrics are available.
9. Develop product maturity assessment input phase into an output that includes the quality attributes to be measured, metrics to be used in measurement, and the desired capability and maturity level of software product.
10. Develop product maturity assessment process phase which includes steps on how to calculate capability and maturity level of software product.
11. Develop product maturity assessment output phase which focuses on outputting results to the users.
12. Develop product maturity assessment (PMAM) after all phases (product maturity assessment input, process, and output phases) are available.

Figure 21:
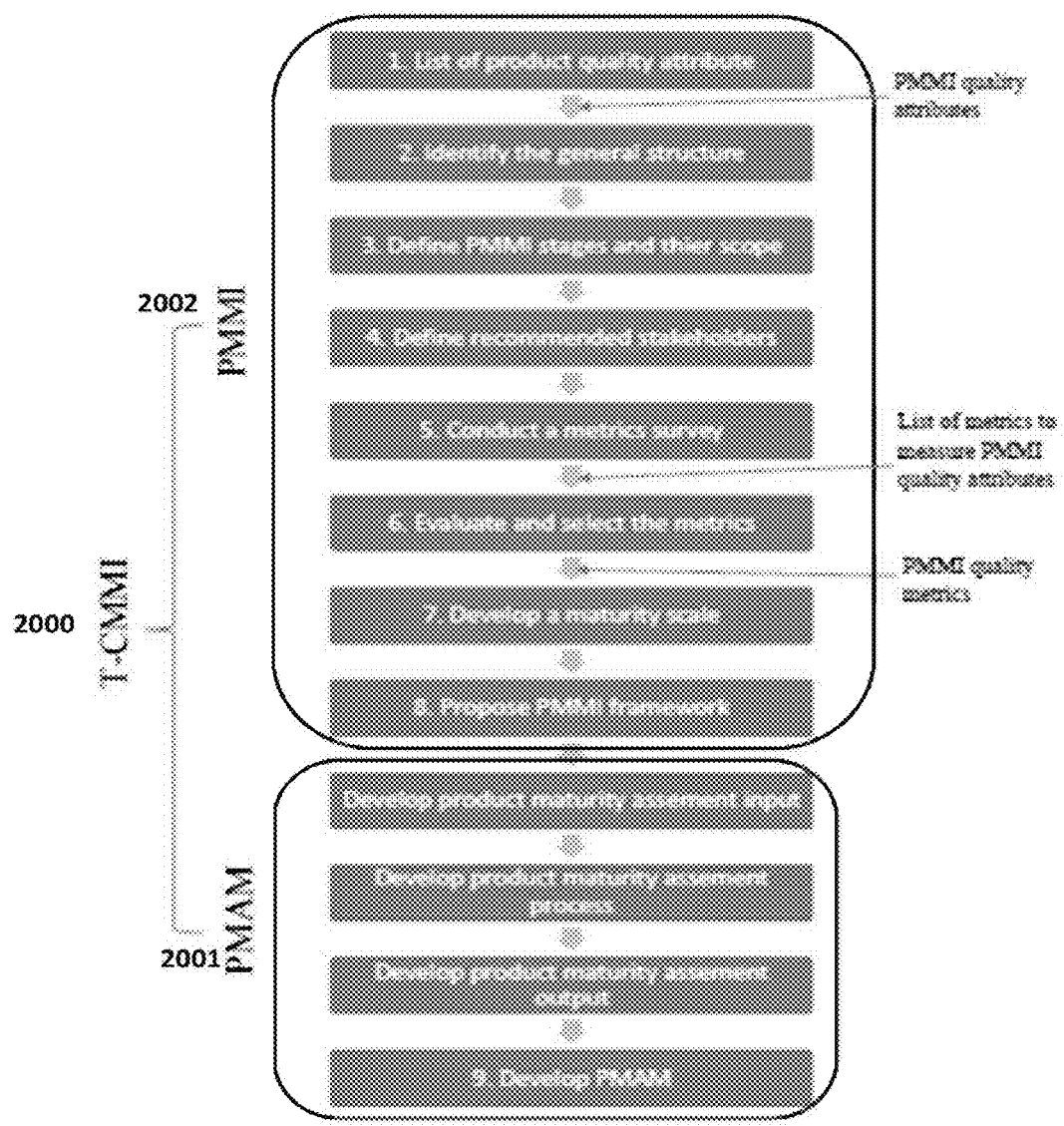
FIG. 21 is the Methodology used in developing T-CMMI.

FIG. 21 depicts the overall process in order to fully develop the T-CMMI. Described herein are embodiments that may execute the process steps described above and in FIG. 21.

Figure 22:
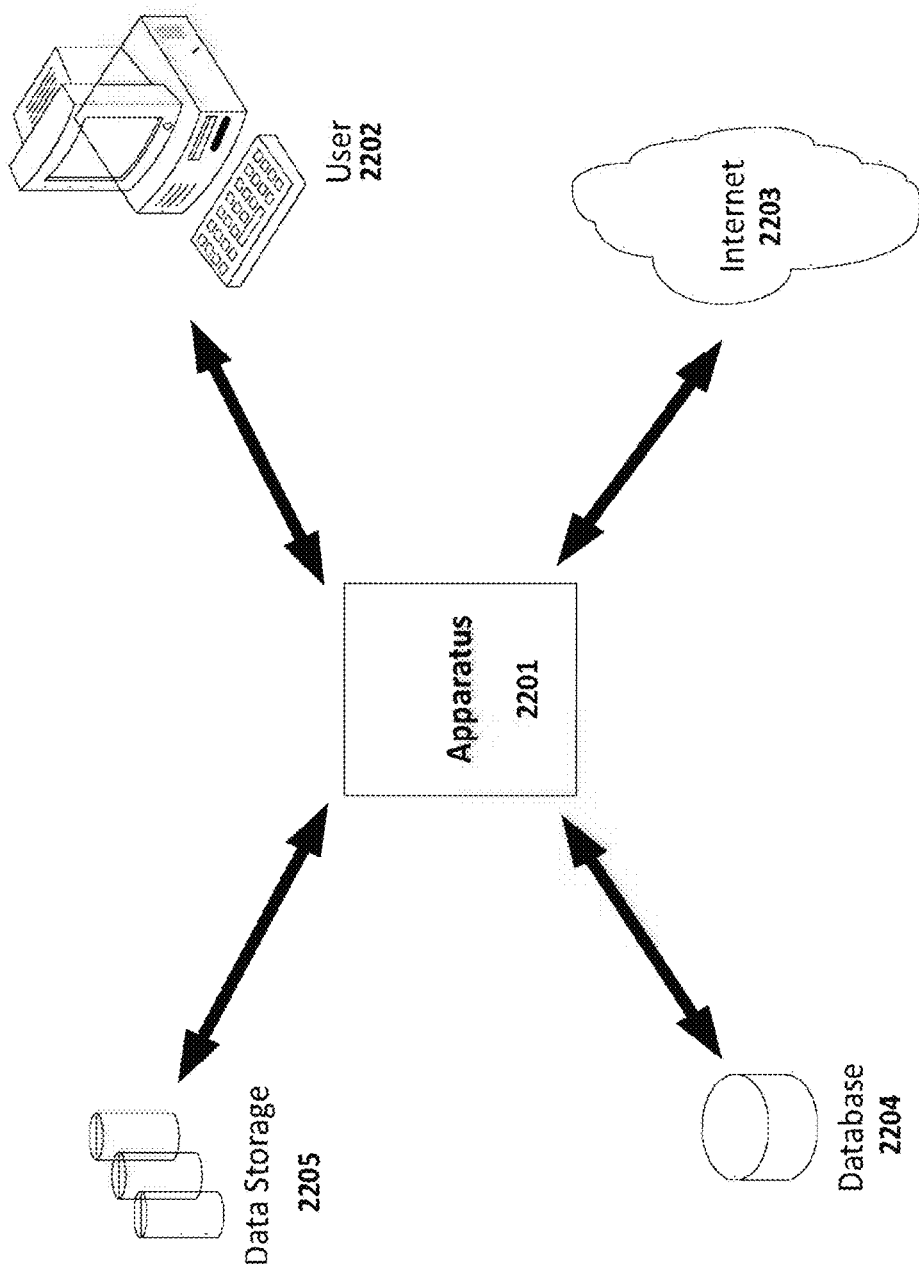
FIG. 22 is a model of the apparatus and a database with which the apparatus may communicate for the determining of the software product maturity level.

FIG. 22 depicts a schematic of data sources that may be accessible to the apparatus to determine the maturity level of a software product. The apparatus 2201 may receive by wireless or wired communication, information about a variety of software products from a user input 2202, the internet 2203, a database 2204, or data storage 2205. The apparatus may employ the information in generating the list of product quality attributes (PQA) or quality attributes, generating a capability scale, or a maturity scale, and metrics to assess the PQA. The embodiments described in FIG. 22 may be employed to generate a list of product quality attributes, the scope of each component or a focus are of the PMMI, or generate a list of stakeholders or responsible parties that may be interested in a software product evaluation. For example, the apparatus 2201 may employ search algorithms to gather data from the internet 2203, or a user 2202, to create a profile of software products and develop a searchable database stored in either the data storage 2205 and/or the database 2204, of the names and characteristics of groups that may be interested in a software product. Similarly, the apparatus 2201 may employ data gathered from users 2202 or the internet 2203 to store information about the metrics, maturity levels, or capability levels that are employed to characterize a software product, and store the information in the data storage 2205 or database 2204 to be utilized in determining a maturity level for a software product at a later time.

Figure 23:
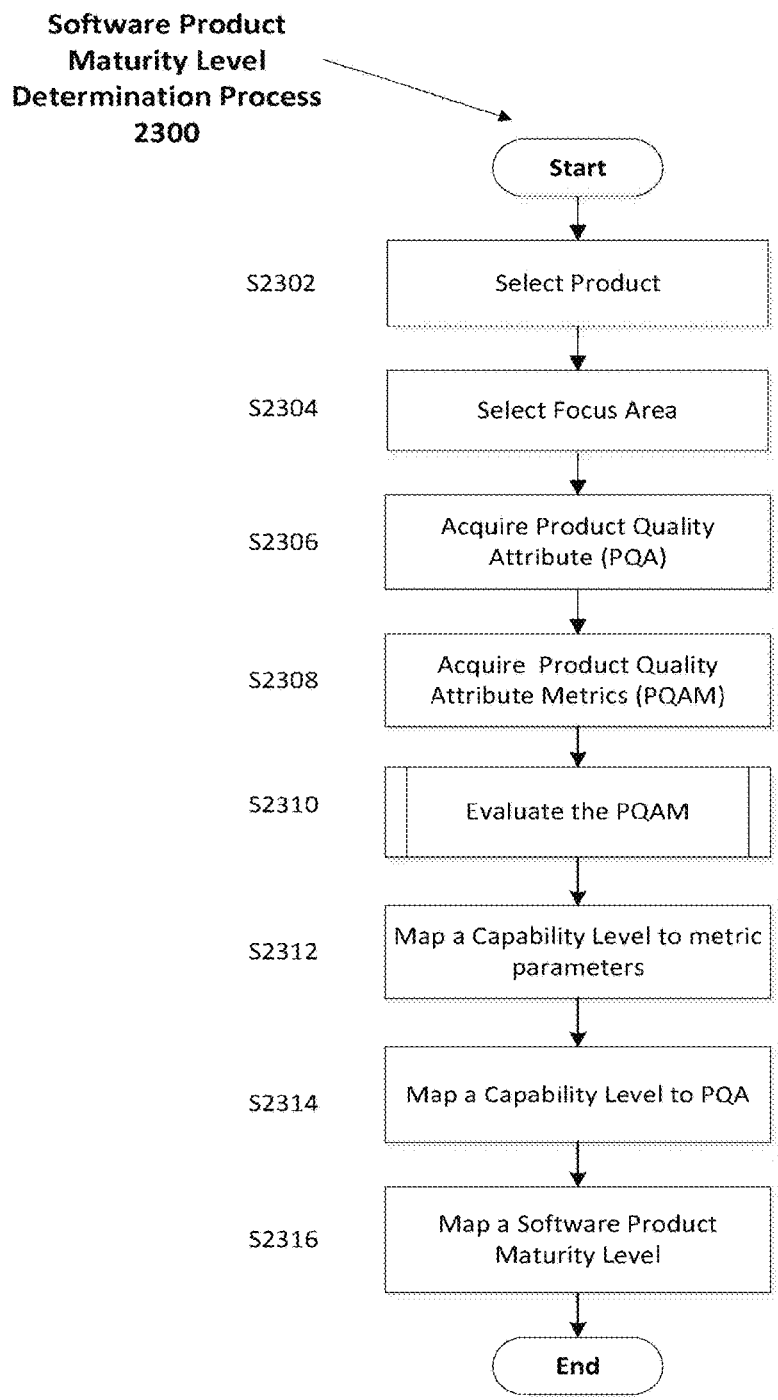
FIG. 23 is an exemplary flowchart of the Software Product Maturity Level Determination Process.

FIG. 23 illustrates an exemplary algorithmic flowchart for determining a product maturity level according to an aspect of the present disclosure. The algorithm described by FIG. 23 may be implemented by the apparatus 2201.

Figure 3:
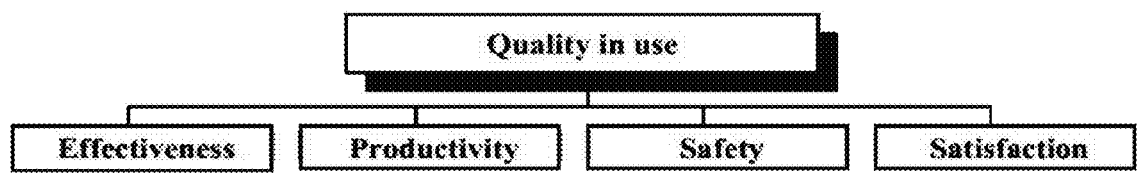
FIG. 3 is the ISO 9126 quality model for quality that are currently in use.
Figure 4:
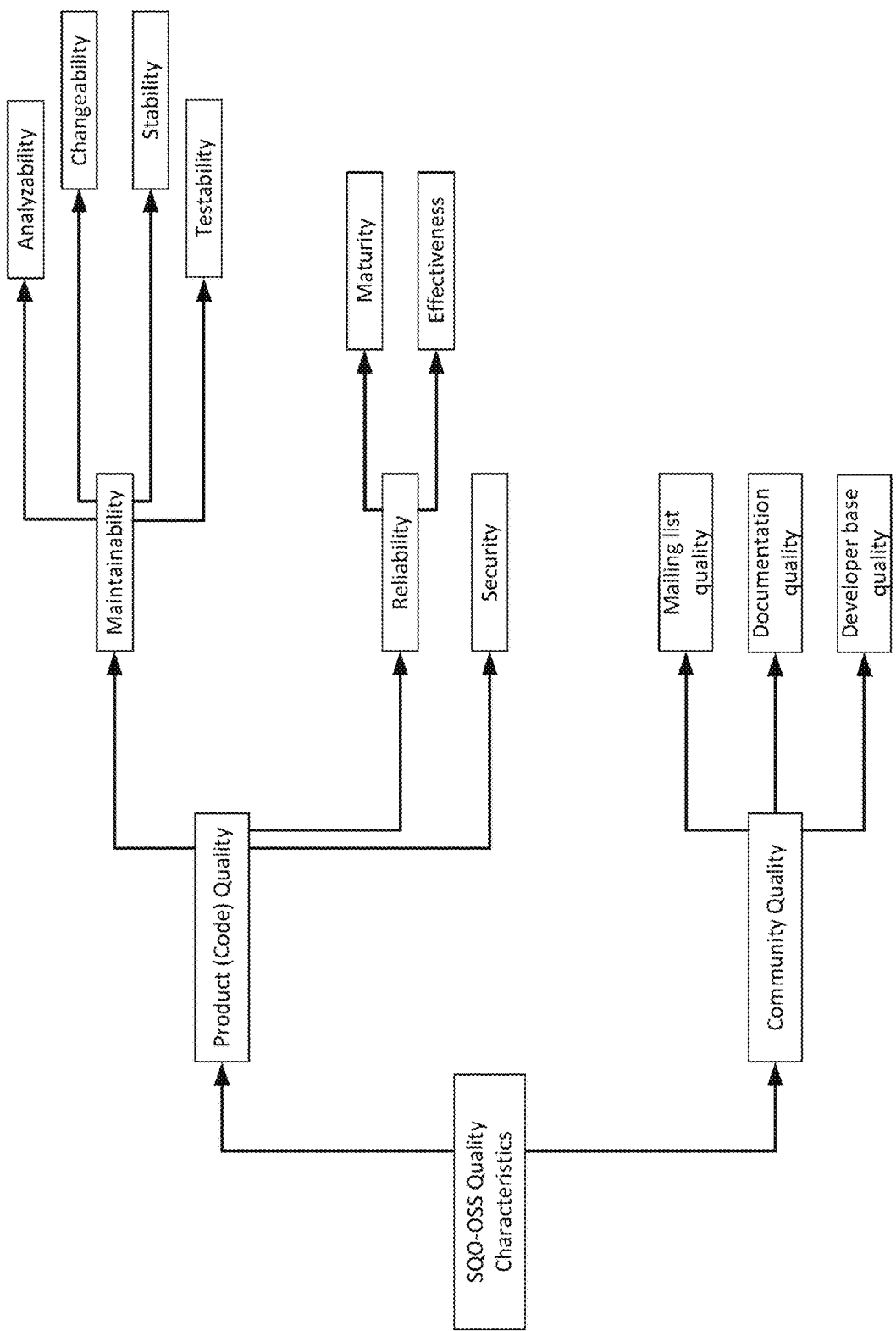
FIG. 4 is the SQO-OSS Quality Model.
Figure 5:
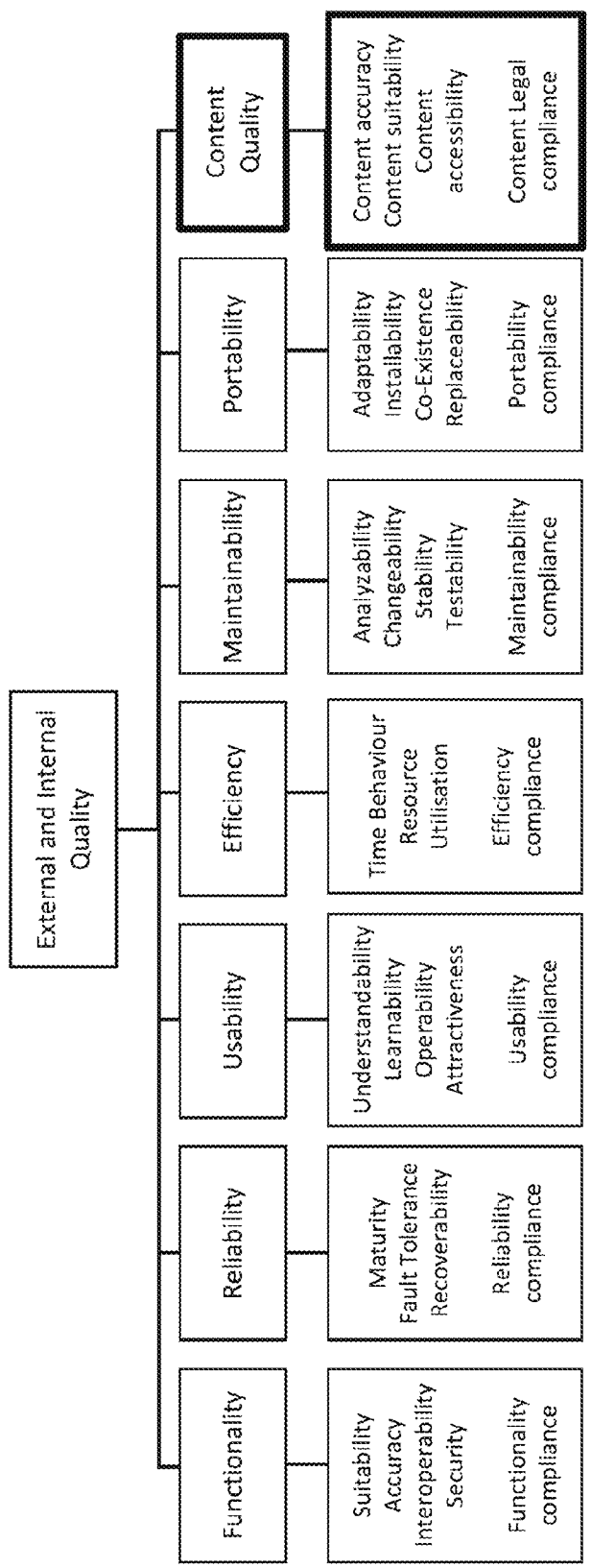
FIG. 5 is the ISO 9126 quality model with Olsina's extension.
Figure 6:
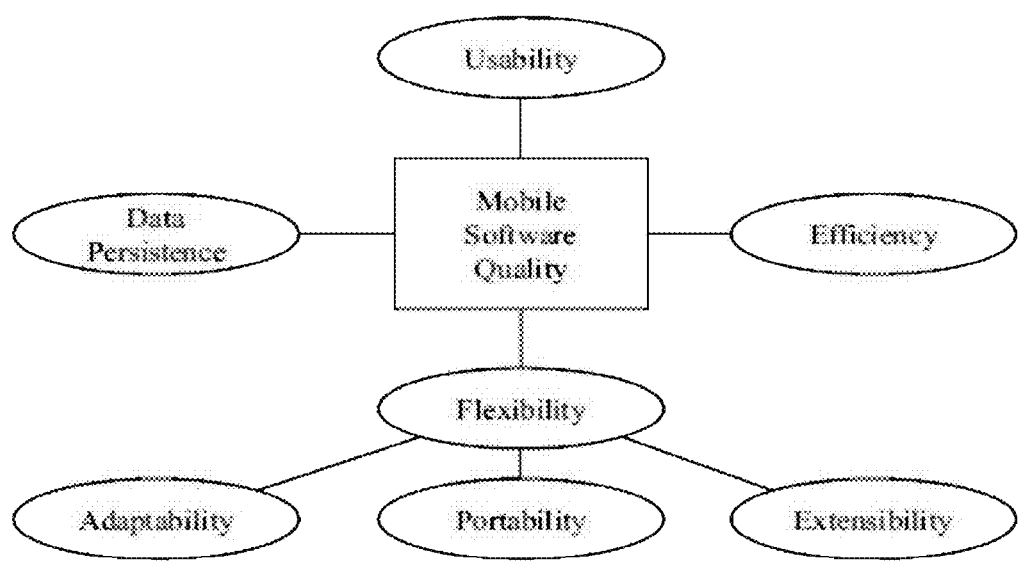
FIG. 6 is the FrankE's Mobile software Quality Model.
Figure 7:
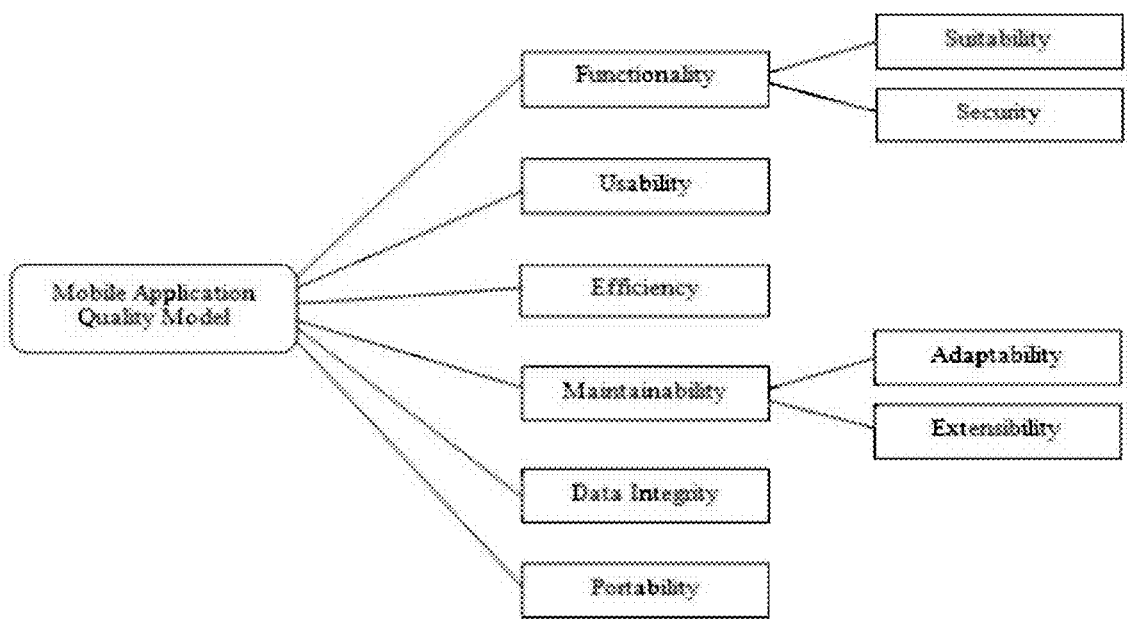
FIG. 7 is the Zahra's Mobile software Quality Model.
Figure 8:
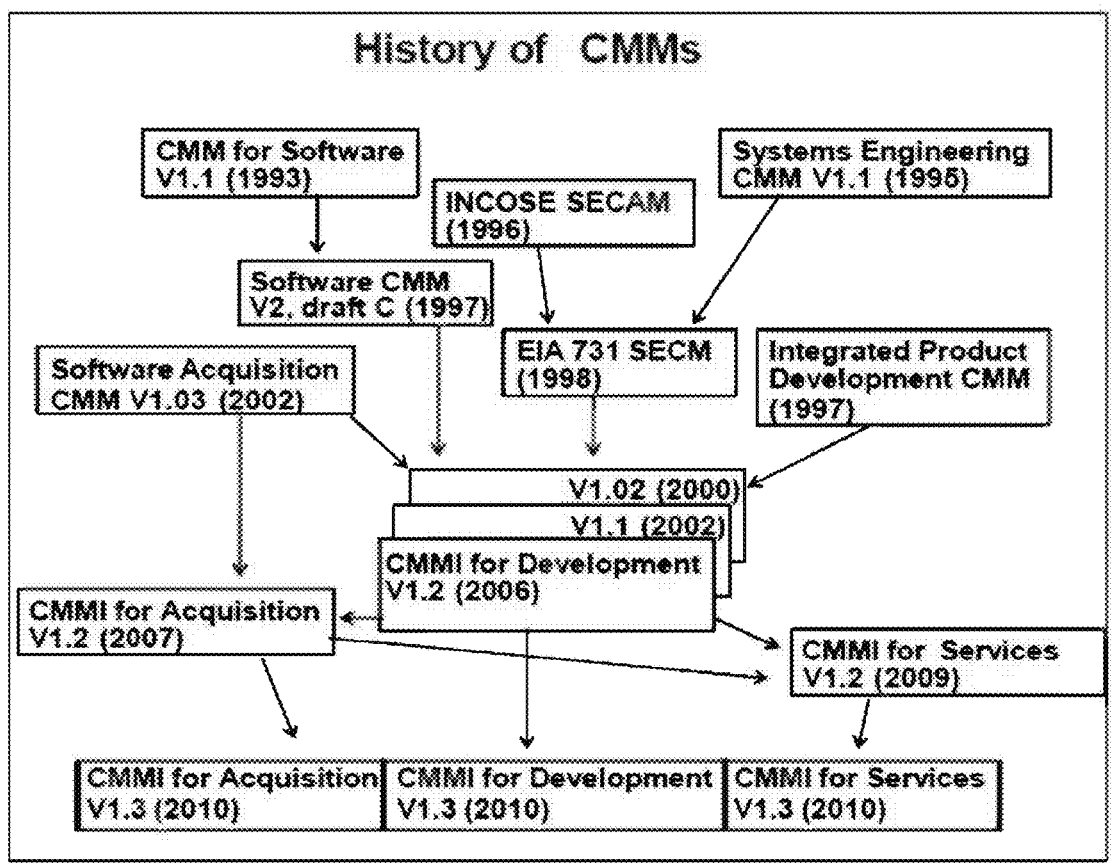
FIG. 8 is the History of CMMI.
Figure 9:
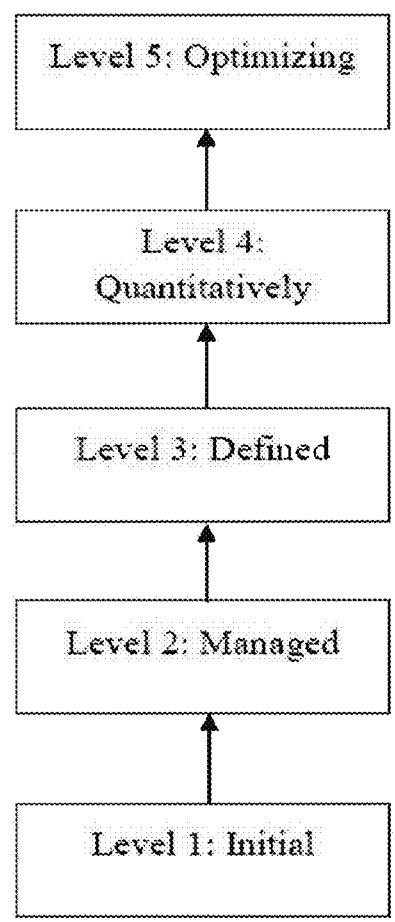
FIG. 9 is the CMMI Maturity Levels.
Figure 10:
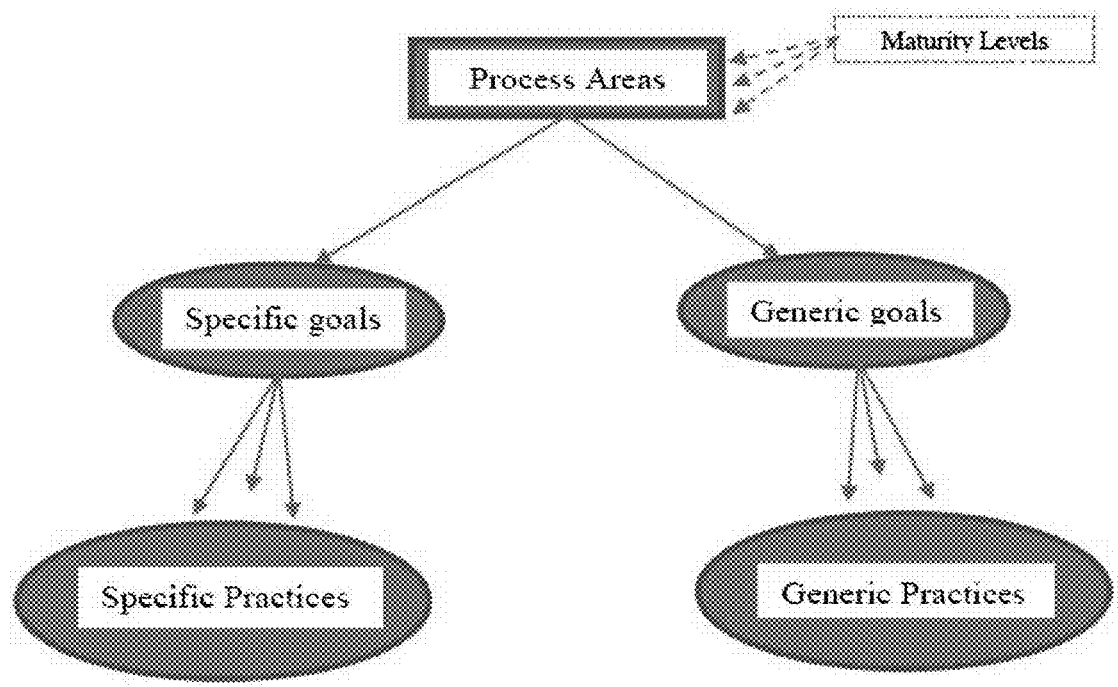
FIG. 10 is the CMMI Model with staged representation.
Figure 11:
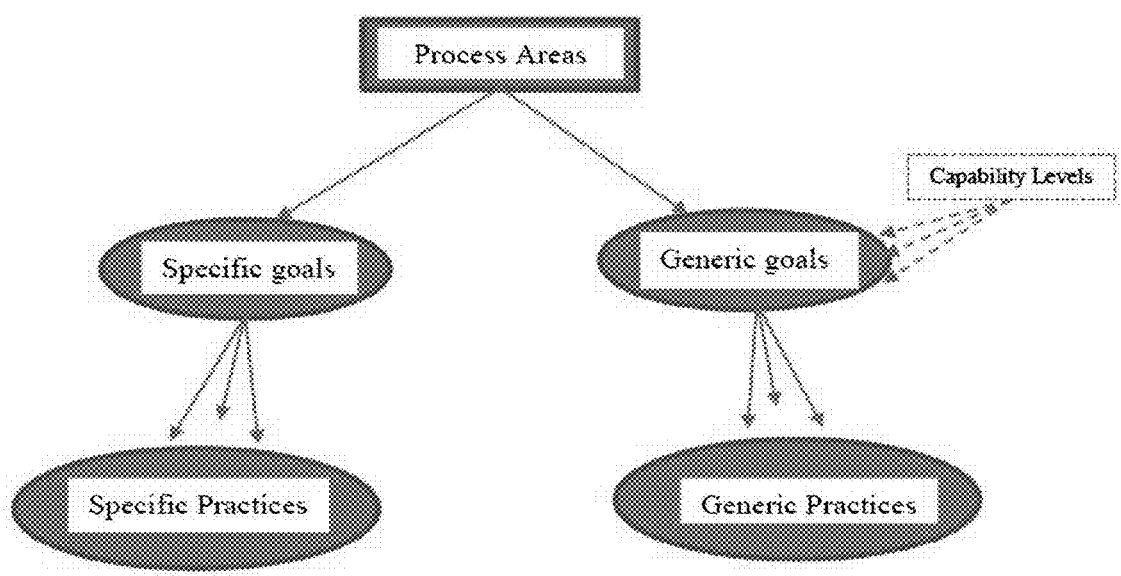
FIG. 11 is the CMMI model with continuous representation.
Figure 12:
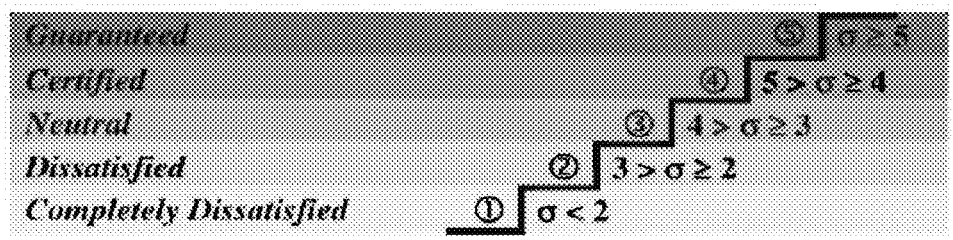
FIG. 12 is the SPQMM quality maturity levels.
Figure 13:
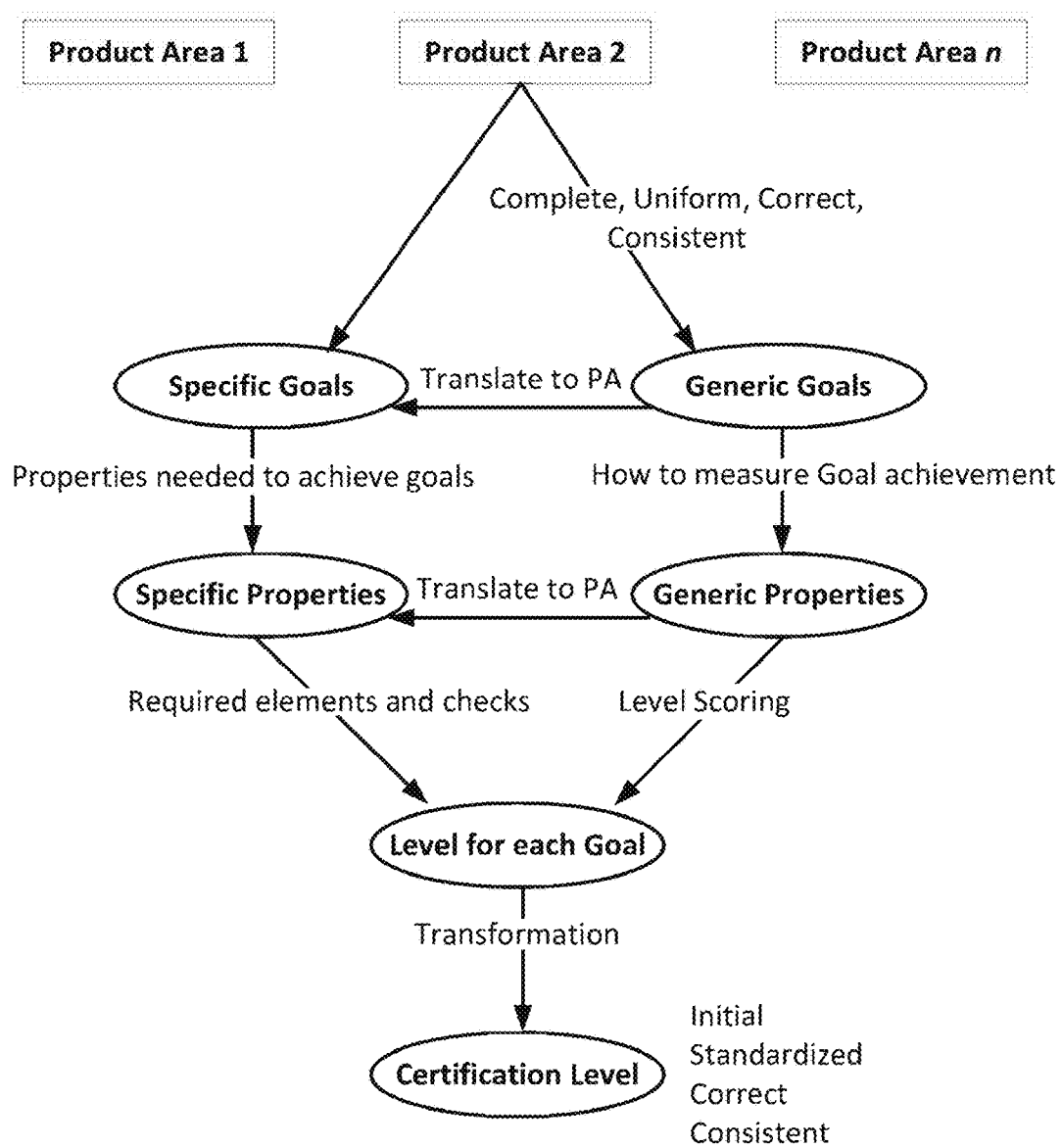
FIG. 13 is the Concepts of the Certification Model.
Figure 14:
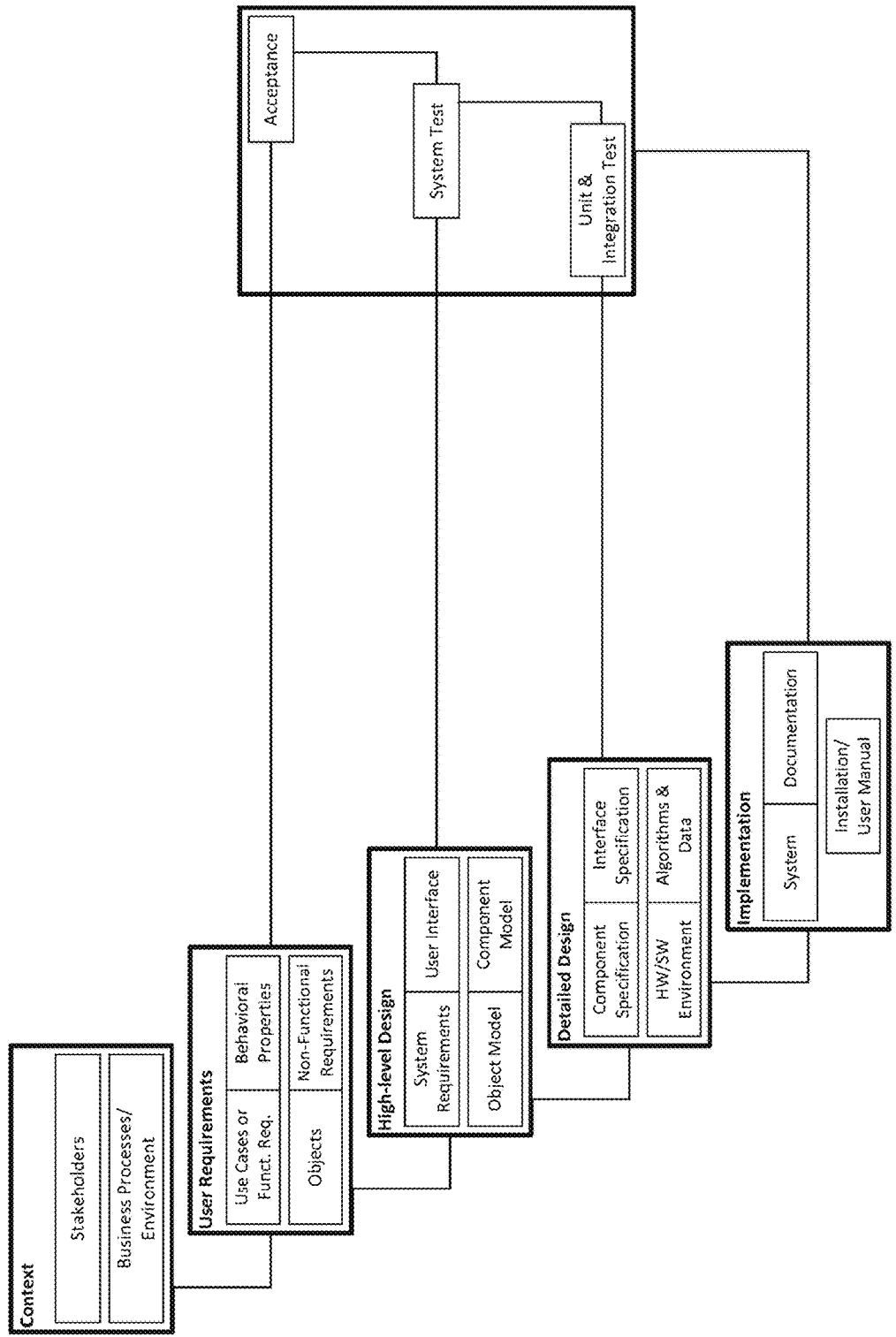
FIG. 14 is the Software product area with their elements.
Figure 15:
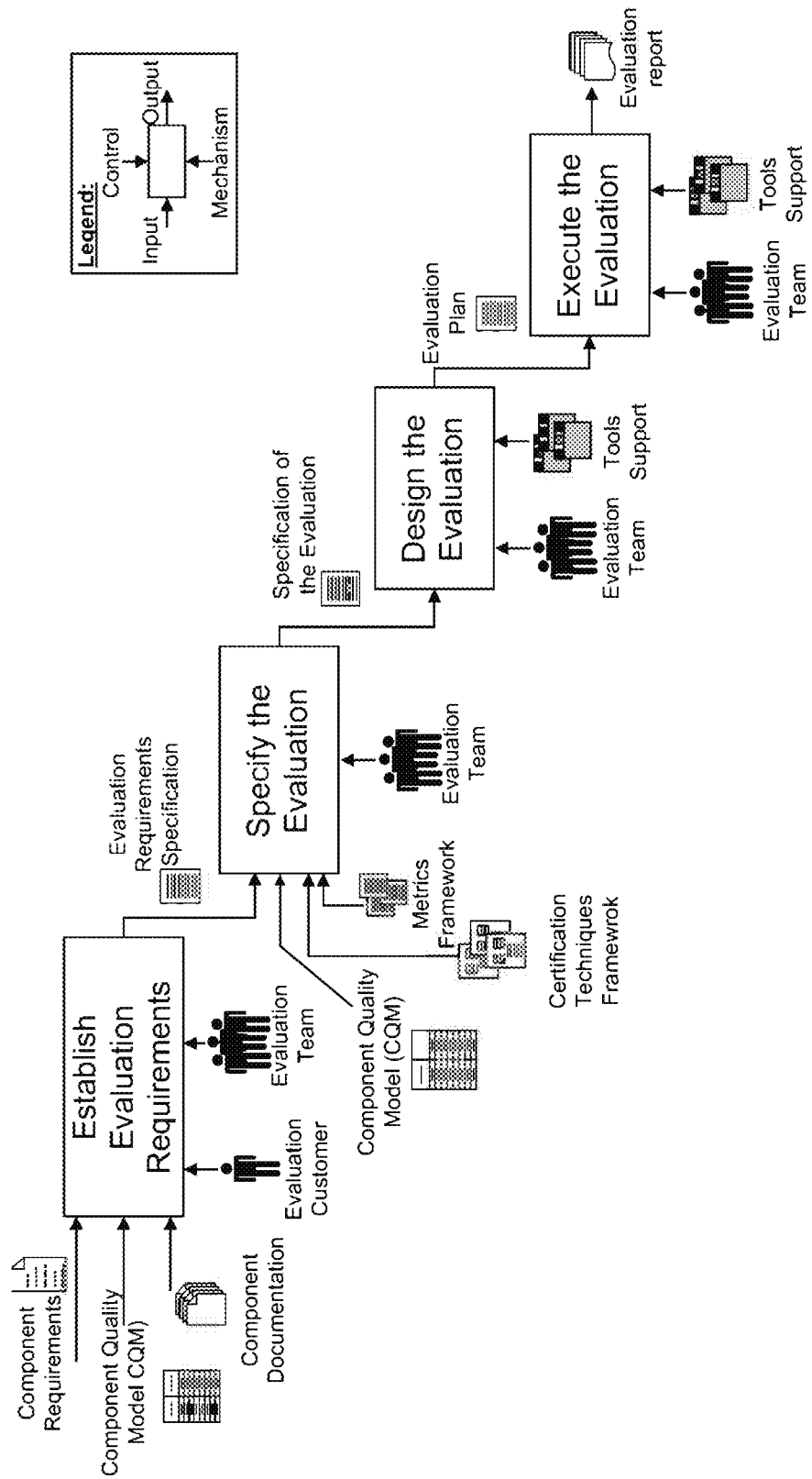
FIG. 15 is the Software Component Certification Process.
Figure 16:
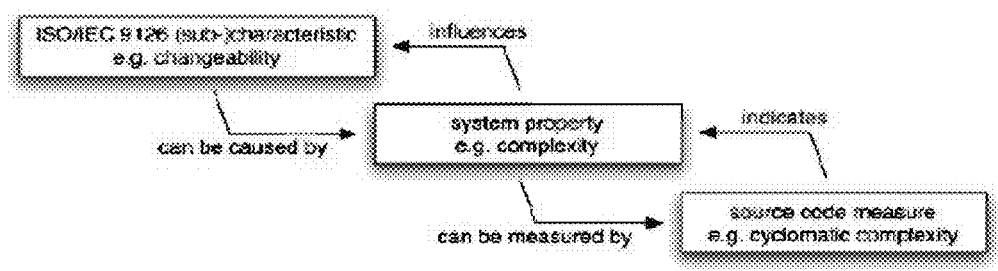
FIG. 16 is the Relationship system properties and sub-characteristics.
Figure 18:
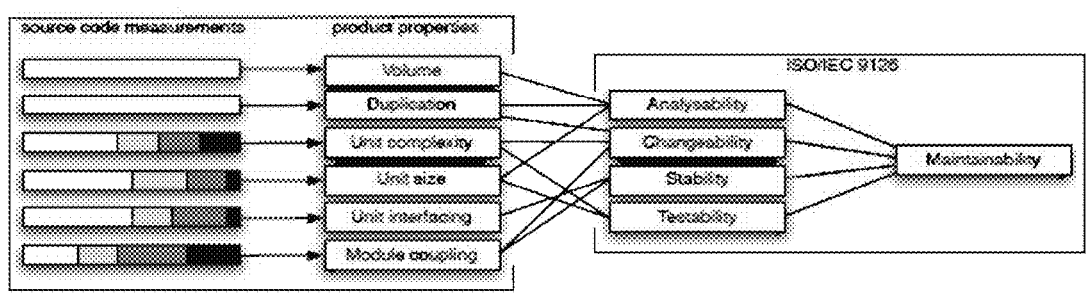
FIG. 18 is the Mapping system properties and maintainability sub-characteristics.
Figure 20:
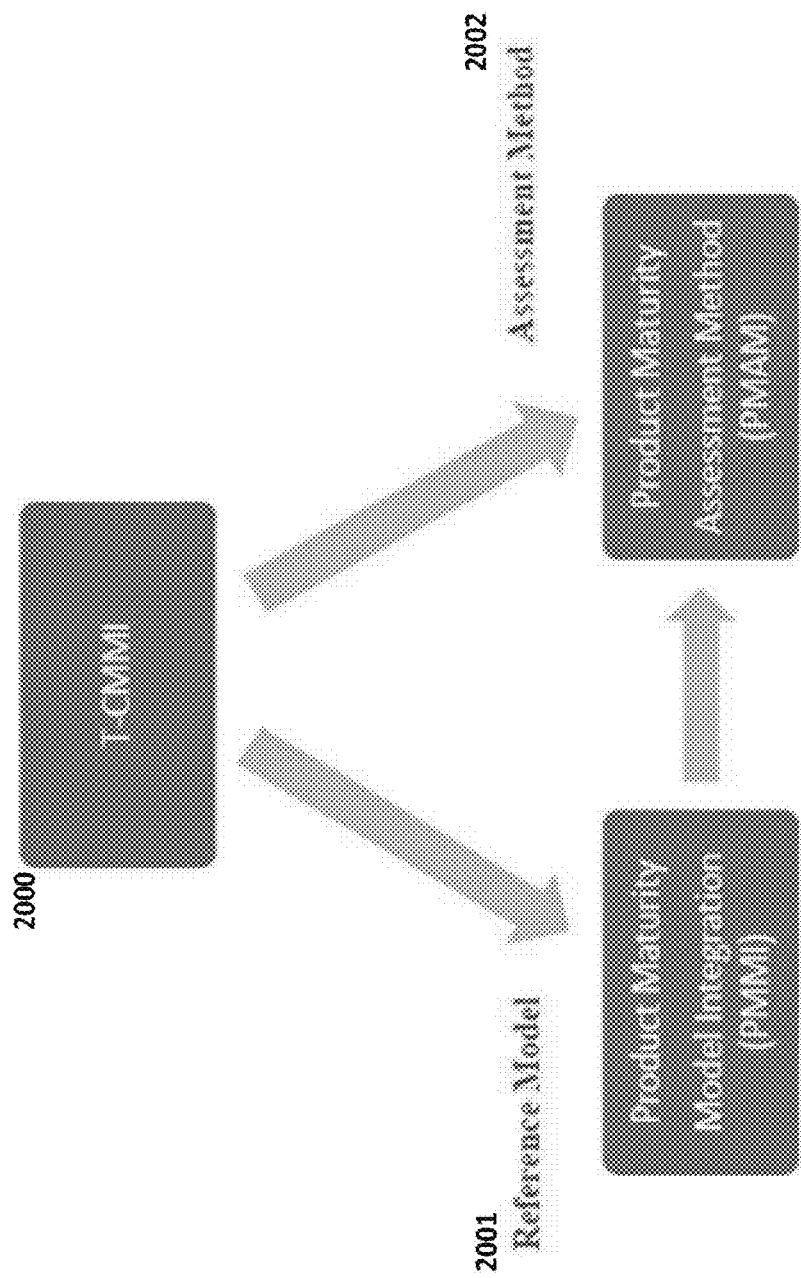
FIG. 20 is the T-CMMI Architecture.

The method of determining a software product maturity level of one or more software products includes acquiring one or more parameters associated with one or more software products. The parameters may include one or more product quality attributes, and in some implementations the parameters may include, but are not limited to a name of the product, the programming languages understood by the product, the maker of the software product. The one or more product quality attributes are selected from a focus area for a software product. In FIG. 23 the step S2302 is selecting a software product for which the method can determine a software product maturity level. The selection may be made from a pre-populated list of comparable software products with similar features. The pre-populated list may be generated from data collected by the apparatus 2201 from data sources such as the user defined input from the user 2202, data collected from the internet 2203, data collected from the data storage 2204, or a database 2205 of software. In one embodiment, the database 2205 and data storage 2204 may be generated by collected software product data throughout time by the data system of FIG. 3. For example, such data may include information such as software product name, software product features, software product compatibility, software product producer, or the like. A subset of the database or data storage may be used for validation of the determination process of the software product maturity model. Comparable software products may share similar features such as built-in security, software portability, performance, or the like. The step S2304 is selecting the focus area. The focus area is a category that correlates to a list of product quality attributes (PQA). For example, the focus area may include, but is not limited to operating systems, platforms (i.e. mobile, web-based, distributed networks, etc.), cross-software compatibility, and other categories familiar to persons having ordinary skill in the art. The focus area may also be selected from a pre-populated list of focus areas acquired from user input from the user 2202, the internet 2203, the database 2204, or data storage 2205. The database 2204 and the data storage may be may be generated by collected focus area data throughout time by the data system of FIG. 3.

In some implementations of the method, upon selecting a focus area, a weight may be assigned to the focus area. The weight may be a percentage, a fractional value, or score entered by the user or calculated from data sources based on data collected over time by the system depicted in FIG. 22. The weight may be a measurement of importance of the focus area to functionality of the software product, resiliency of the software product, or longevity of the software product as determined by previously collected data and/or ratings from data sources described herein.

Figure 25B:
FIG. 25B is an exemplary table of product quality attributes 2501 and associated product quality attribute metrics 2503.
Figure 25C:
FIG. 25C is an exemplary table of product quality attributes 2501 and associated product quality attribute metrics 2503.

In step S2306, one or more PQA is selected from the focus area. The highest level of the PQA contains the software quality attributes that may include: maintainability, testability, etc. FIG. 24 depicts a table of exemplary PQA 2401 and corresponding definition 2403 that may be selected for assessment during the software maturity level determination process 2300. The PQA relates directly to the quality of a source-code of the software product and the PQA can be measured in the source-code. In some implementations, multiple PQA may be connected with each other and may be assigned together to the software product. A connection between multiple PQA may be defined as a mathematical or logical dependence on one PQA result to assess another PQA. In some implementations of the method, a weight, as described herein, may be assigned to the PQA. In step S2308, one or more metric parameter or product quality attribute metrics (PQAM) is acquired which is associated with the product quality attribute. FIG. 25C, FIG. 25B, and FIG. 25C are table of exemplary PQAM that may be acquired. In FIG. 25C, FIG. 25B, and FIG. 25C, under each product quality attribute 2201, the name of the metrics 2503 and a description of usage 2505 of that metric are described. A measurement scale 2507 of each metric whether the PQAM is nominal, ordinal, interval, ratio, or absolute is listed in FIGS. 25A, 25B, and 25C. The PQAM or metric parameters include a test methodology that assesses the PAQ. A metric is a method of assessing or measuring a characteristic of the software product. The characteristic may be quantitatively observed or qualitatively observed. The PQAM of software products are described in FIG. 25C, FIG. 25B, and FIG. 25C. In some implementations, two or more PQAM may be mathematically or logically dependent on each other and so must be acquired together. In some implementations the PQAM employs a test methodology which may be a mathematical function or a logical assessment of the PQA of the software product. Some test methodologies of the PQAM may include, but are not limited to operating on input from a particular segment of the software product source-code, assessing a function of the software product, measuring the efficiency of the software product to conduct a task, or measuring accuracy of one or more results from the software product.

Figure 26:
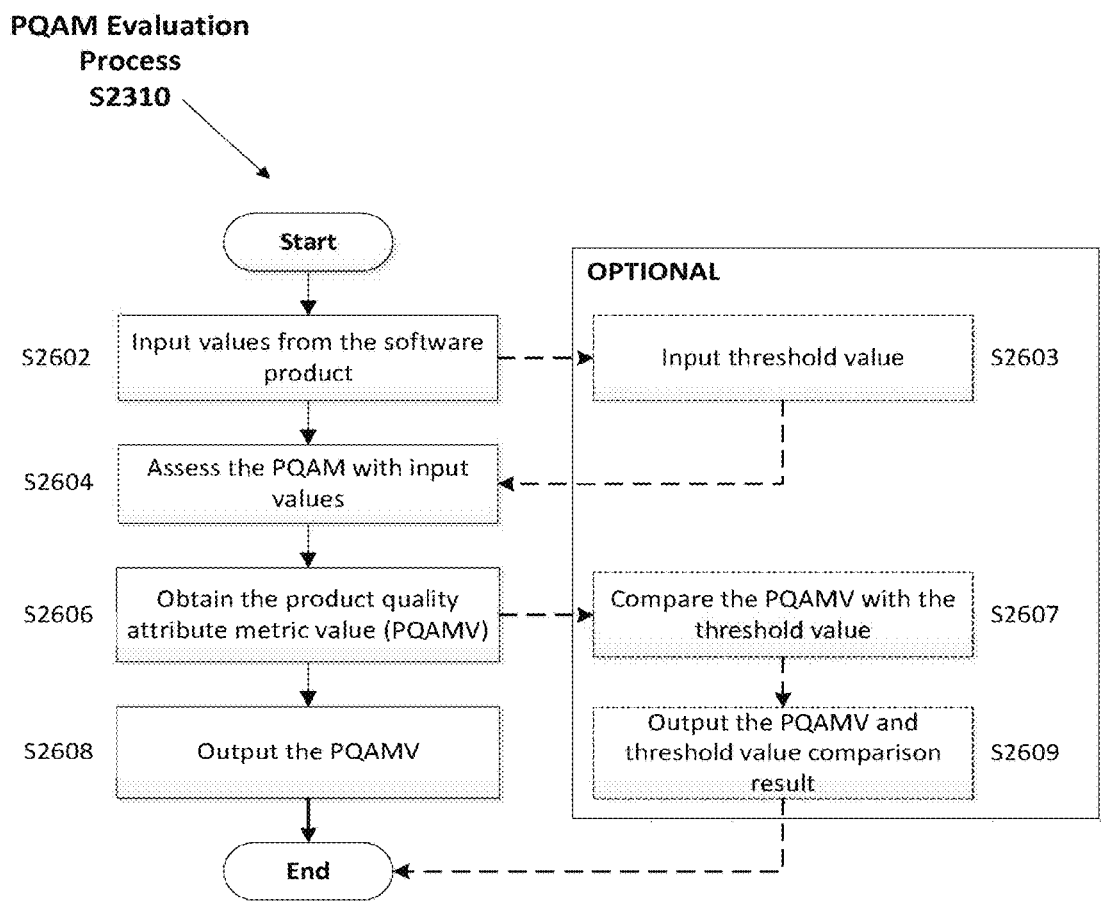
FIG. 26 is an exemplary flowchart of the PQAM Evaluation Process S2310.

In step S2310, one or more product quality attribute metrics is evaluated to determine a product quality attribute metric value PQAMV for each product quality attribute metric. The product quality attribute metric value may be a numerical result of the product quality attribute metric. The evaluation is a sub-process of the determination process 2300 and is depicted in FIG. 23. In the sub-process of the evaluation of the PQAM S2310, depicted in FIG. 26, step S2602 retrieves input values from the software product. The input values may include, but are not limited to a length of source-code, a number of parameters utilized in the source-code, a time required to compile or execute the source-code, or a quantitation of separate functions in the source-code.

An optional step after S2602 is to input a threshold value. In some implementations, there may be one or more threshold values for each PQAM. The threshold value is an expected result. The threshold value may be manually entered by a user input, a set default value, or determined by the apparatus 2201 by the trends in the data from the database 2204, the data storage 2205, or the internet 2203 for the PQAM. The threshold value may be a minimum and/or maximum. Once the threshold value is retained the evaluation of PQAM process continues to step S2604.

The PQAM is assessed with the input values of S2602 incorporated into the test methodologies of the PQAM (S2604). The assessment of the PQAM may include, but is not limited to verification of the input values as to non-real numbers (i.e. imaginary, infinity) or correctness of inputs (i.e. natural number, integer, negative value, zero, decimal, fraction, string, etc.). A product quality attribute metric value (PQAMV) results from completing step S2606.

Once the PQAMV is obtained in S2606, a comparison step S2607 may be executed if the optional step S2603 was also executed. In step S2607 a comparison is made between the PQAMV and the threshold value. Following step S2607 is the output step S2609 of both a result of the comparison and the PQAMV. If optional step S2603, S2607 and S2609 are not executed, then from step S2606 the evaluation of PQAM sub-process 5710 may immediately move to S2608, in which only the PQAMV is an output of the sub-process. Upon completion of S2608 or S2609 the sub-process S2310 ends and returns to the software product maturity level determination process 2300.

The PQAMV of the evaluation of the PQAM sub-process S2310 is employed in mapping a capability level to the metric parameters (PQAM) in step S2312 of the software product maturity level determination process 2300 and the next step S2314 maps the capability level of the metric parameters to the capability level of the PQA. The capability level is a rating employed to assess quality of the software product. The capability level is based on a capability scale. In general, higher quality of a software product leads to a higher capability level. An exemplary depiction of a capability scale is in FIG. 27A. The capability scale has at least four capability levels 2701 and each level correlates to an ability of the software product to achieve a predefined threshold 2705. In FIG. 27A, exemplary thresholds 2705 are shown which are sorted in ascending order by name 2703 where "NC" is the lowest and "FC" is the highest level. The four capability levels have four threshold levels defined as compliance thresholds. The compliance thresholds are described in FIG. 27A as fully compliant (FC), largely compliant (LC), partially compliant (PC), and not compliant (NC). Any PQA that is assigned "NC" is at poor capability level in the software product, but PQA that are assigned "FC" are at an excellent capability level in the product. FIG. 27B provides an exemplary mapping of the capability level for several PQA. To determine the capability level a map may be created with each PQAM 2706 that is used to measure PQA 2707 with the capability levels 2703 based on the comparison 2709 of the PQAMV 2710 of the metric with the threshold value 2711 that may be defined in the evaluation of the PQAM sub-process S2310. FIG. 27C depicts an exemplary table that depicts a calculation of a capability level of the PQA described in FIG. 27B. To map the capability level to the PQA 2715, an average value 2714 of the capability levels is calculated from the PQAM that are used to measure the PQA, which in turn becomes the capability level of the PQA. In some implementations, one or more product quality attributes is weighted in the mapping of the capability level. FIG. 27C depicts the PQA weights 2717 employed in the exemplary calculation.

Figure 28:
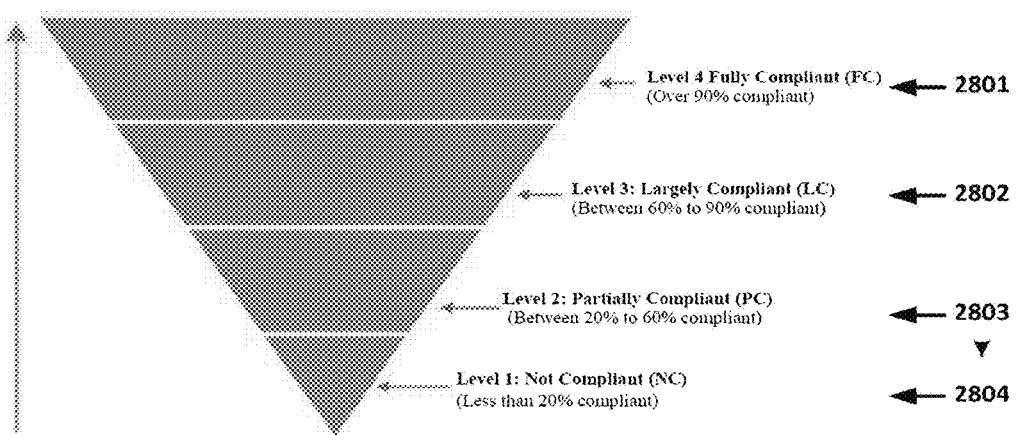
FIG. 28 is an exemplary diagram of a maturity scale and description.

Returning again to the software product maturity level determination process 2300 at step S2314 in which the maturity level of the software product is mapped. The software product is assigned the maturity level based on the capability level of each PQA. There may be at least four maturity levels. The four maturity levels may have four threshold levels which may also be defined as compliance thresholds. For example, the compliance thresholds may be described as shown in FIG. 28 as fully compliant (FC) 2801, largely compliant (LC) 2802, partially compliant (PC) 2803, and not compliant (NC) 2804. The maturity level is a rating based on the maturity scale as described above, and each level correlates to a quality measurement of the software product. The exemplary maturity scale of FIG. 28 is in ascending order from the lowest level (NC) to the highest level (FC) as depicted in FIG. 28. To further describe the example, Fully Compliant 2801 will render the software product maturity level at the highest maturity level 4, or highest quality measurement, while deviation from full compliance will render the software product maturity level at a lower level (with a decreasing scale as the deviation increases). In the presented example, NC maturity level is the lowest level and the default level for any software product. In the present example, software product that are mapped to the NC maturity level are poorly developed in relative PQA. However, in the example, software product assigned the FC maturity level are of excellent quality. To assign the software product maturity level 2720, the weights of the PQA may be used to calculate an average capability level 2716 of each PQA, then the average capability level 2716 may be summed to generate a software product maturity level. In some implementations, the calculation of the average capability level 2716 may include multiplying the average of capability levels of each quality attribute 2714 with the weight of each PQA 2717. In some implementations of the method, assigning the maturity level to each software product may include calculating an integer value of the sum of the average capability level 2716 of each product quality attribute. Once the software product maturity level is ascertained, the next step of the software product maturity level determination process may proceed to provide the maturity level of the software product as an output to compare with other software products to generate a recommendation on the quality of the software product, or to generate a recommendation on whether to purchase the software product.

Figure 29:
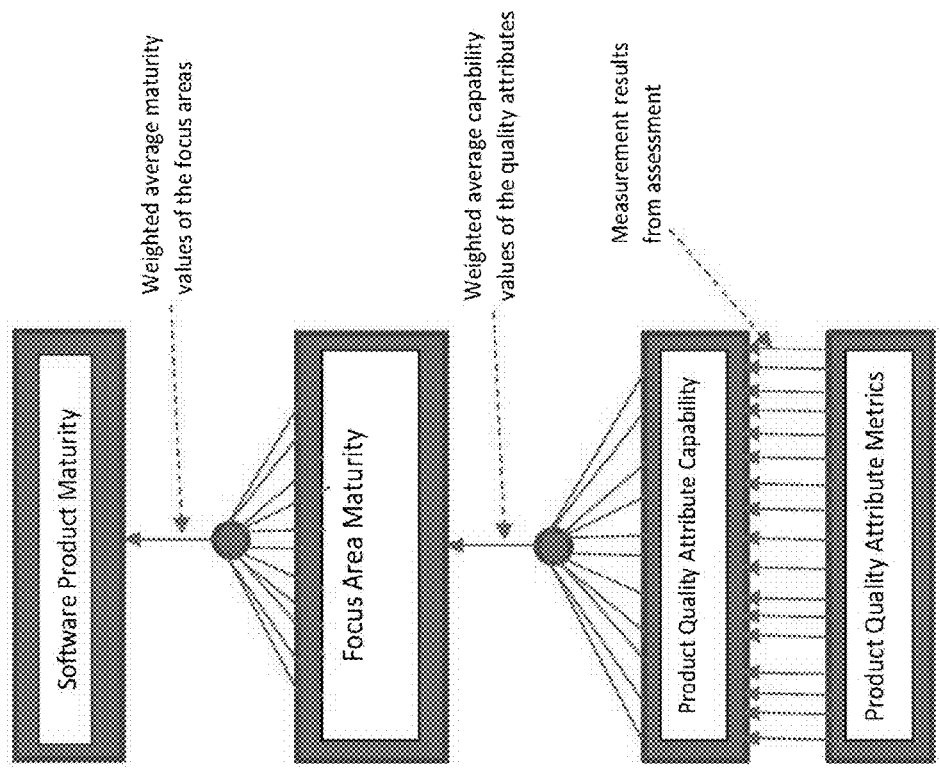
FIG. 29 is a schematic of the data gathered in determining the software product maturity model.

In some implementations, a focus area may also be mapped to a maturity level to determine a software product maturity level. FIG. 29 schematically depicts how the software product maturity level may be based on one or more focus areas, the PQA capability level, and the PQAM capability level. The focus area maturity level is a rating based on a software product maturity scale. The software product maturity level may be obtained by an average of one or more focus area maturity levels. In some implementations, assigning the software product maturity level may include calculating an integer value of an average of the focus area maturity level of each focus area. In some implementations, assigning the software product maturity level may employ weighting the focus areas in the calculation.

An aspect of the present disclosure relates to an apparatus for determining a software product maturity level of one or more software products. The apparatus includes circuitry configured to execute the method for determining a software product maturity level of one or more software products described above.

An aspect of the present disclosure relates to a non-transitory computer readable medium with instructions understandable by the apparatus described herein or by distributed networks as described herein.

Figure 30:
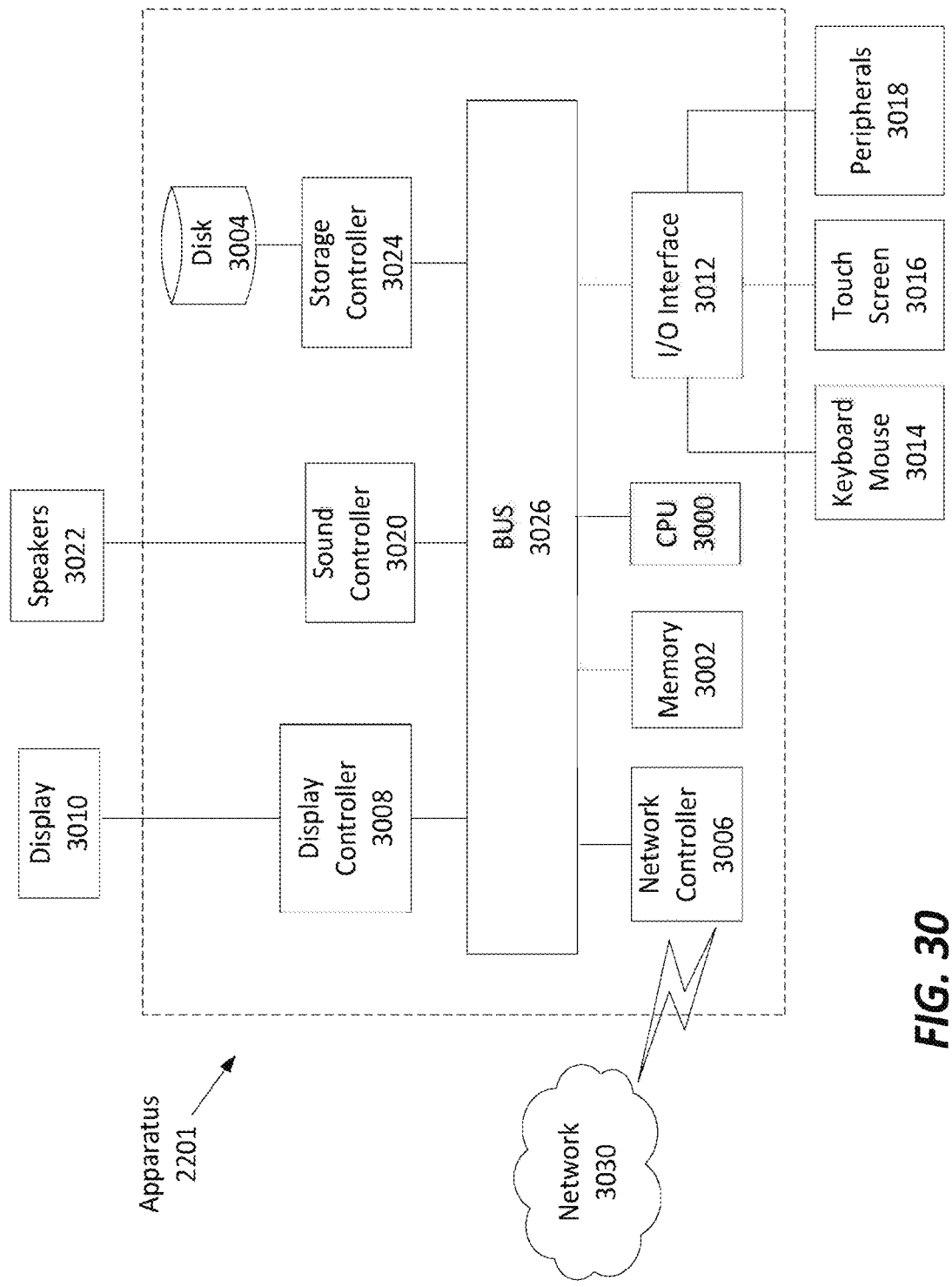
FIG. 30 is an exemplary diagram of the apparatus with circuitry configured to determine the software maturity model level.

FIG. 30 illustrates an example of the apparatus 2201 that may be employed to carry out the method of the present disclosure. The circuitry of the apparatus 2201 may be configured to employ data sources such as the user interface 2202, the internet. 2203, the database 2204, and/or the data storage 2205 in the method described. The database 2204 or data storage 2205 may include information about a plurality of software products, product quality attributes and associated product quality attribute metrics that may be employed by the circuitry to carry out the method for determining a software product maturity level of one or more software products described herein. The database may be configured to communicate with the apparatus through wired or wireless network 3030. Further details of the hardware that may be employed by the apparatus are described herein.

A hardware description of the apparatus according to exemplary embodiments is described with reference to FIG. 30. In FIG. 30, the apparatus includes a CPU 3000 which performs the method for determining a software product maturity level of one or more software products as described above. The CPU may also perform the calculations necessary to map the maturity level and capability level for the focus area, the PQA and/or the software products. The process data and instructions to determine the maturity level of the software product may be stored in memory 3002. These processes and instructions may also be stored on a storage medium disk 3004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the apparatus communicates, such as a server or computer.

Further, the claimed advancements may be provided as a utility application, background daemon, or component of an operating system, or combination thereof, executing in conjunction with CPU 3000 and an operating system such as Microsoft Windows 7, UNIX, Solaris, LINUX, Apple MAC-OS and other systems known to those skilled in the art.

The hardware elements in order to achieve the apparatus 2201 may be realized by various circuitry elements, known to those skilled in the art. For example, CPU 3000 may be a Xenon or Core processor from Intel of America or an Opteron processor from AMD of America, or may be other processor types that would be recognized by one of ordinary skill in the art. Alternatively, the CPU 3000 may be implemented on an FPGA, ASIC, PLD or using discrete logic circuits, as one of ordinary skill in the art would recognize. Further, CPU 3000 may be implemented as multiple processors cooperatively working in parallel to perform the instructions of the inventive processes described above.

The apparatus 2201 in FIG. 30 also includes a network controller 3006, such as an Intel Ethernet PRO network interface card from Intel Corporation of America, for interfacing with network 3030. As can be appreciated, the network 3030 can be a public network, such as the Internet, or a private network such as an LAN or WAN network, or any combination thereof and can also include PSTN or ISDN sub-networks. The network 3030 can also be wired, such as an Ethernet network, or can be wireless such as a cellular network including EDGE, 3G and 4G wireless cellular systems. The wireless network can also be WiFi, Bluetooth, or any other wireless form of communication that is known. The network may be employed to communicate with the database employed in the method of the present disclosure as described herein and depicted in FIG. 22.

The apparatus 2201 further includes a display controller 3008, such as a NVIDIA GeForce GTX or Quadro graphics adaptor from NVIDIA Corporation of America for interfacing with display 3010, such as a Hewlett Packard HPL2445w LCD monitor. A general purpose I/O interface 3012 interfaces with a keyboard and/or mouse 3014 as well as a touch screen panel 3016 on or separate from display 3010. General purpose I/O interface also connects to a variety of peripherals 3018 including printers and scanners, such as an OfficeJet or DeskJet from Hewlett Packard. The interfaces described herein may be employed in gathering data from a user 2202.

A sound controller 3020 is also provided in the apparatus, such as Sound Blaster X-Fi Titanium from Creative, to interface with speakers/microphone 3022 thereby providing sounds and/or music.

The general purpose storage controller 3024 connects the storage medium disk 3004 with communication bus 3026, which may be an ISA, EISA, VESA, PCI, or similar, for interconnecting all of the components of the apparatus. A description of the general features and functionality of the display 3010, keyboard and/or mouse 3014, as well as the display controller 3008, storage controller 3024, network controller 3006, sound controller 3020, and general purpose I/O interface 3012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 30.

Figure 31:
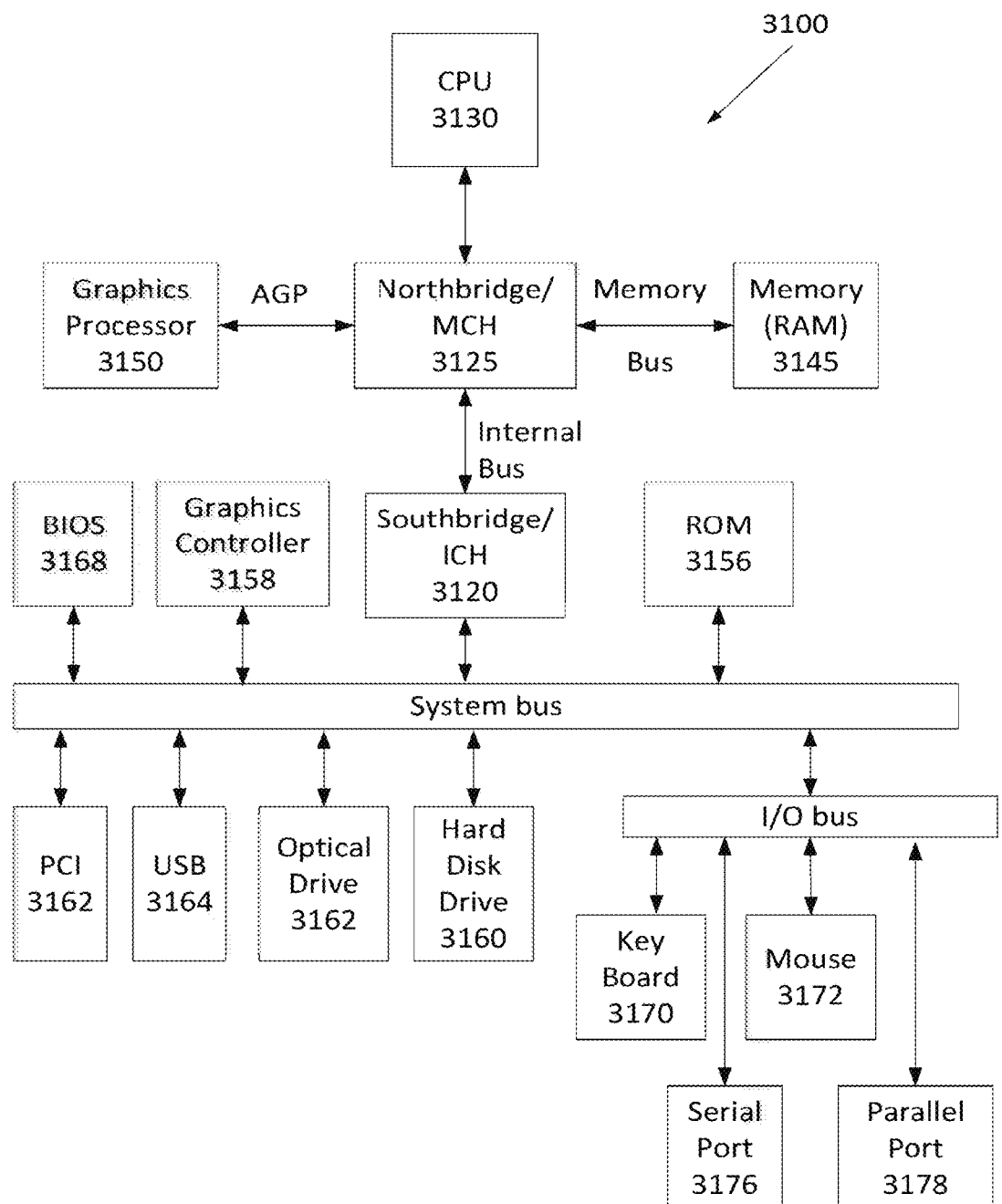
FIG. 31 is a schematic diagram of a data processing system, according to certain embodiments, for performing the method for determining a software product maturity level of one or more software products.

FIG. 31 shows a schematic diagram of a data processing system, according to certain embodiments, for performing the method for determining a software product maturity level of one or more software products. The data processing system is an example of a computer in which code or instructions implementing the determination process of the illustrative embodiments may be located.

In FIG. 31, data processing system 3100 employs a hub architecture including a north bridge and memory controller hub (NB/MCH) 3125 and a south bridge and input/output (I/O) controller hub (SB/ICH) 3120. The central processing unit (CPU) 3130 is connected to NB/MCH 3125. The NB/MCH 3125 also connects to the memory 3145 via a memory bus, and connects to the graphics processor 3150 via an accelerated graphics port (AGP). The NB/MCH 3125 also connects to the SB/ICH 3120 via an internal bus (e.g., a unified media interface or a direct media interface). The CPU Processing unit 3130 may contain one or more processors and even may be implemented using one or more heterogeneous processor systems.

Figure 32:
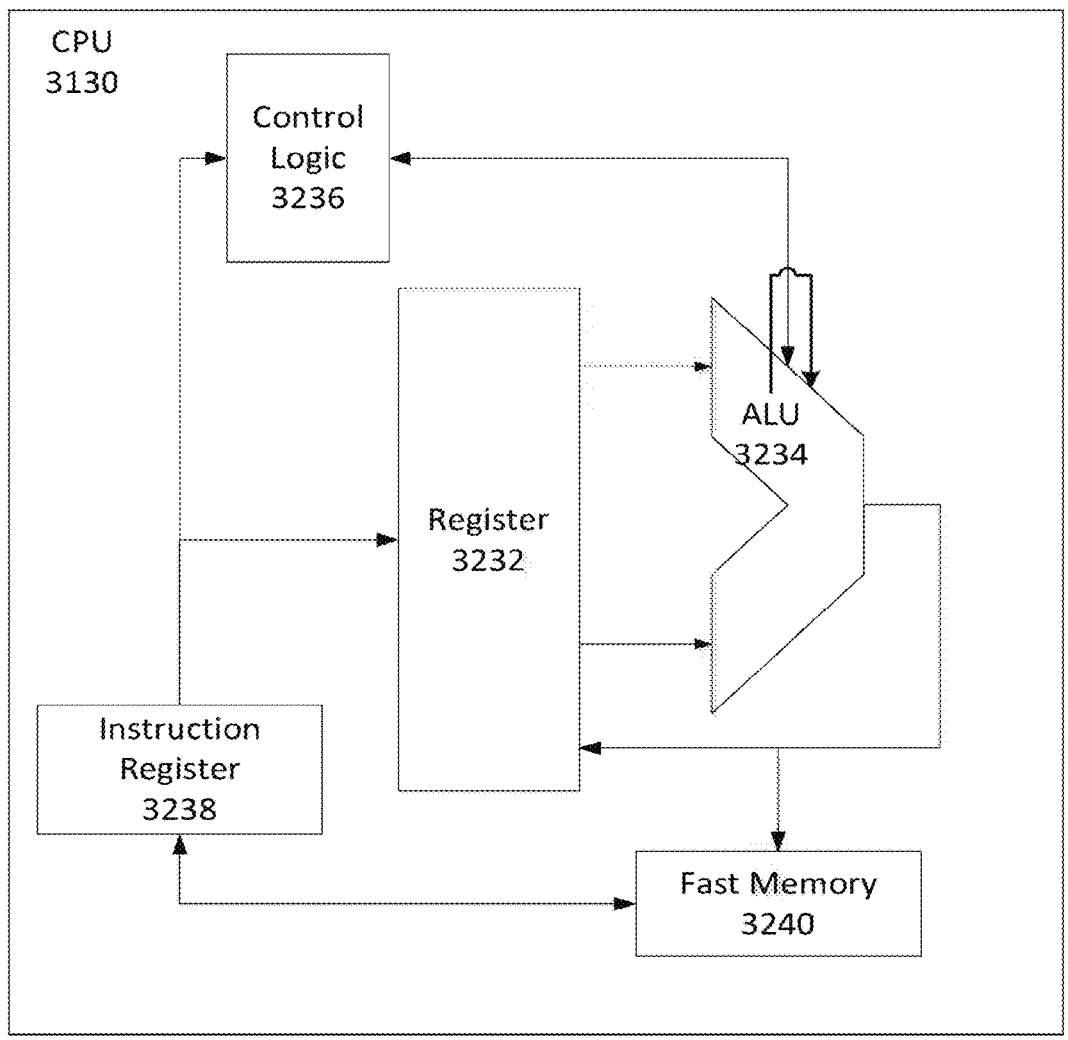
FIG. 32 is an exemplary implementation of a. CPU that may execute the processes for the method for determining a software product maturity level of one or more software products.

For example, FIG. 32 shows one implementation of CPU 3130. In one implementation, the instruction register 3238 retrieves instructions from the fast memory 3240. At least part of these instructions are fetched from the instruction register 3238 by the control logic 3236 and interpreted according to the instruction set architecture of the CPU 3130. Part of the instructions can also be directed to the register 3232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 3234 that loads values from the register 3232 and performs logical and mathematical operations on the loaded values according to the instructions. The results from these operations can be feedback into the register and/or stored in the fast memory 3240. According to certain implementations, the instruction set architecture of the CPU 3130 can use a reduced instruction set architecture, a complex instruction set architecture, a vector processor architecture, a very large instruction word architecture. Furthermore, the CPU 3130 can be based on the Von Neuman model or the Harvard model. The CPU 3130 can be a digital signal processor, an FPGA, an ASIC, a PLA, a PLD, or a CPLD. Further, the CPU 3130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 31, the data processing system 3100 can include that the SB/ICH 3120 is coupled through a system bus to an I/O Bus, a read only memory (ROM) 3156, universal serial bus (USB) port 3164, a flash binary input/output system (BIOS) 3168, and a graphics controller 3158. PCI/PCIe devices can also be coupled to SB/ICH through a PCI bus 3162.

The PCI devices may include, for example, Ethernet adapters, add-in cards, and PC cards for notebook computers. The Hard disk drive 3160 and CD-ROM 3166 can use, for example, an integrated drive electronics (IDE) or serial advanced technology attachment (SATA) interface. In one implementation the I/O bus can include a super I/O (SIO) device.

Further, the hard disk drive (HDD) 3160 and optical drive 3166 can also be coupled to the SB/ICH 3120 through a system bus. In one implementation, a keyboard 3170, a mouse 3172, a parallel port 3178, and a serial port 3176 can be connected to the system bust through the I/O bus. Other peripherals and devices that can be connected to the SB/ICH 3120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features of apparatus described herein may also be executed by various distributed components of a system. For example, one or more processors may execute these system functions of the apparatus, wherein the processors are distributed across multiple components communicating in a network as FIG. 22 depicts. In some implementations, the method described herein to determine a maturity level of one or more software products may require at least several hundred thousand calculations to assign a capability level, calculate PQAMV, and assign maturity levels for focus areas. Computing power may require a distributed network to share processing time. The distributed components may include one or more client and server machines 3324, which may share processing, as shown on FIG. 33, in addition to various human interface and communication devices (e.g., display monitors, smart phones, tablets, personal digital assistants (PDAs)). The user 2202 may be a personal computer 3316, smart phone 3314, tablet or PDA 3312 from which data about the software product may be entered or from which commands may be sent to the apparatus 2201 to execute the functions of the method described herein. The network may be a private network, such as a LAN or WAN, or may be a public network, such as the Internet. Input to the system may be received via direct user input at a mobile device terminal 3314 or fixed terminal 3316 and received remotely either in real-time or as a batch process. Additionally, some implementations may be performed on modules or hardware not identical to those described. Accordingly, other implementations are within the scope that may be claimed.

Figure 33:
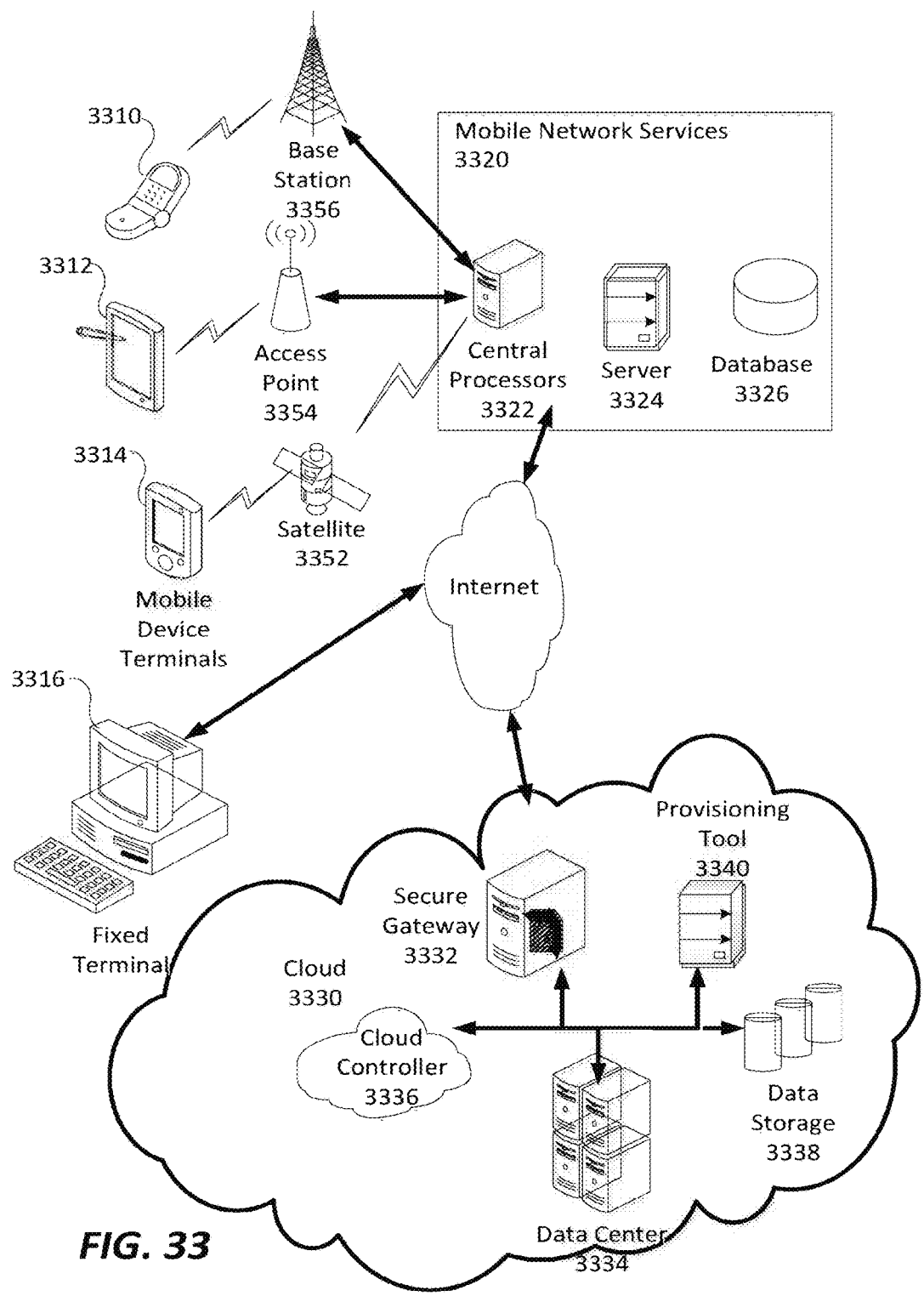
FIG. 33 is an exemplary distributed network with shared computing sources that may be employed to execute the processes for the method for determining a software product maturity level of one or more software products.

The hardware description above, exemplified by any one of the structure examples shown in FIG. 30, 31, or 33, constitutes or includes specialized corresponding structure that is programmed or configured to perform the algorithm shown in FIG. 23. For example, the algorithm shown in FIG. 23 may be completely performed by the circuitry included in the device shown in FIG. 30 or the chipset as shown in FIG. 31, or the algorithm may be completely performed in a shared manner distributed over the circuitry of any plurality of the devices shown in FIG. 33.

The above-described hardware description is a non-limiting example of corresponding structure for determining a maturity level of one or more software products described herein.

The examples below are intended to further illustrate the method to determine the are product maturity level and are not intended to limit the scope of the claims.

EXAMPLE 1

In this example, a customer wants to assess a certain software product to determine if the software product fulfills a maturity level requirement for a set of quality attributes. In the first step the customer selects software product X for assessment for the Release Focus Area from a user interface. The customer decides to select product quality attributes from a list of product quality attributes in the Release Focus Area as shown in Table 14. Table 14 may be displayed to a user as an interface from which the user may select or enter the name of the PQA listed by mouse or by a finger tap on a touch-sensitive device,

TABLE 14

Product Quality Attributes List

| Quality Attribute | Selected | Focus Area |
|---|---|---|
| Consistency | | |
| Efficiency | | |
| Maintainability | ✓ | REL |
| Reliability | ✓ | REL |
| Testability | | |
| Understandability | | |
| Usability | ✓ | REL |
| Security | | |
| Extensibility | | |
| Safety | | |
| Completeness | | |
| Conciseness | | |
| Legibility | | |
| Reusability | | |
| Modularity | | |
| Complexity | | |

The customer can choose the weights and desired capability level of each quality attribute which are shown in Table 15. Table 15 is an example of summation of quality attributes' weights to be 100 percent. Table 15 may be a user interface in which the user may enter the data requested. The customer employs 4 maturity levels, which may be an option that can be selected in a user interface.

TABLE 15

REL Quality attributes with their weights

| Quality Attribute | Weight | Desired Capability Level |
|---|---|---|
| Maintainability | 60% | 3 (PC) |
| Usability | 80% | 4 (FC) |
| Reliability | 20% | 3 (LC) |

The assessors select the product quality attribute metrics from the list of metrics to measure the selected product quality attributes and identify a threshold value for each one of them. The selected metrics are shown in Table 16 for Release focus area.

TABLE 16

Product Quality Attributes Metrics checklist for the Product Quality Attribute

MAINTAINABILITY

| | |
|---|---|
| Maintainability metric | |
| Number of 3rd Party Components (No3C) | |
| Number of Components (NoC) | ✓ |

TABLE 16-continued

Product Quality Attributes Metrics checklist for the Product Quality Attribute Total Number of External Interfaces (TNEI)
Total Number of Internal Interfaces (TNII)
Number of Functionally Critical Components (NFCC)
Number of Versions (NoV)
Number of Subsystems (NoSS)
Number of Services (NOS)
Number of Concurrent Components (NCC)
Class stability metric (CSM) ✓
Number of children (NOC)

RELIABILITY

Mean Time Between Failure (MTBF) ✓
Software Reliability

USABILITY

Usability Metric for User Experience (UMUX) ✓
Essential Efficiency
System Usability Scale (SUS) ✓

The customer also identifies the threshold value (Test threshold) for each metric as shown in Table 17.

TABLE 17

Metrics and thresholds values

| Metrics Name | Test Threshold |
|---|---|
| Class Stability Metric (CSM) | 0.97 |
| Number of Components | 842 |
| System Usability Scale (SUS) | 8 |

TABLE 17-continued

Metrics and thresholds values

| Metrics Name | Test Threshold |
|---|---|
| Usability Metric for User Experience (UMUX) | 4 |
| Mean Time Between Failure (MTBF) | 450 |

After the input is ready, the metrics in the software product maturity determination use the input to measure the selected quality attributes. The selected metrics for each quality attribute on the Focus Area are shown in Table 18.

TABLE 18

List of metrics of each quality attribute on each PMMI stage

| Focus Area | Quality Attribute | Metrics |
|---|---|---|
| REL-Stage | Maintainability | Class Stability Metric (CSM) |
| | | Number of Components |
| | Usability | System Usability Scale (SUS) |
| | | Usability Metric for User Experience (UMUX) |
| | Reliability | Mean Time Between Failure (MTBF) |

Metrics for Release focus area are shown in Table 19 and metric thresholds that are defined in the software product maturity level determination input and the results of measurement of each metric in the focus area with the mapping of each metric value to a certain capability level are shown in Table 19. The average weighted capability level for each quality attribute in the REL-focus area and the maturity level of the product are shown in Table 20.

TABLE 19

Each metric value that associated with the capability level

| Quality Attribute | Metric Number | Metric Name | Test Threshold | Test Value | Test Result Compliance | Capability Level |
|---|---|---|---|---|---|---|
| Maintainability | Metric1 | Class Stability Metric (CSM) | 0.97 | 0.88 | 90% | 3 |
| | Metric2 | Number of Components | 842 | 690 | 82% | 3 |
| Usability | Metric1 | System Usability Scale (SUS) | 8 | 8 | 100% | 4 |
| | Metric2 | Usability Metric for User Experience (UMUX) | 4 | 4 | 100% | 4 |
| Reliability | Metric1 | Mean Time Between Failure (MTBF) | 450 | 378 hours | 84% | 3 |

TABLE 20

Assessment Results of REL-Focus Area

| Quality Attribute | Metric1 Capability Level | Metric2 Capability Level | Average Quality Attribute Capability Level | Quality Attribute Capability Level | Quality Attribute Weight | Average capability level |
|---|---|---|---|---|---|---|
| Maintainability | 3 | 3 | 3 | 3 | 30% | 0.9 |
| Usability | 4 | 4 | 4 | 4 | 50% | 2 |
| Reliability | 3 | NA | 3 | 3 | 20% | 0.6 |
| TOTAL | | | | | | 3.5 |
| Focus Area Maturity Level | | | | | | 3 |
| Software Product Maturity Level | | | | | | 3 |

The results show that each quality attribute identified in the Release focus area match the desired capability level in the product maturity assessment input. In addition, the actual maturity level of the software product in the release focus area meets the desired maturity level that is defined in software product maturity input.

A consumer can use this score across many software products to objectively compare the quality of the software products to one another.

EXAMPLE 2

In some implementations of the method described herein, two representations of maturity models may represent PMMI which are a fixed-level maturity models and focus-area maturity models. In fixed-level maturity models specify a fixed number of maturity levels, where a number of processes associated with each maturity level should be implemented to satisfy that level of maturity, CMMI is considered an example of a Fixed-level maturity model. The focus-area maturity model representation for PMMI is employed in the present example. The Focus-Area Maturity Models consist of the following parts:

1. Functional Domain: is the all activities and actors that are involved in a defined function (area addressed by maturity assessment).

In PMMI may evaluate are two functional domains or focus areas which are:

A. Dev Functional Domain: consists of all the activities, responsibilities and actors involved in the software development and testing (prior to Integration and pre-release checks).

B. Rel Functional Domain: comprises all the activities, responsibilities and actors involved in the Software Integration, User Acceptance Testing (UAT) and pre-release testing (verification & validation).

2. Focus Area: should be developed to achieve maturity in the functional domain. There are two focus areas in PMMI which are DEV-Stage and REL-Stage which will be described later in this section.

3. Capability: defined as "an ability to achieve a pre-defined goal that is associated with a certain maturity level". In our PMMI model, the product capabilities are defined by the level of the product's compliance with the quality requirements. The results of tests (PQAM) are the indicators of the level of compliance.

Figure 34:
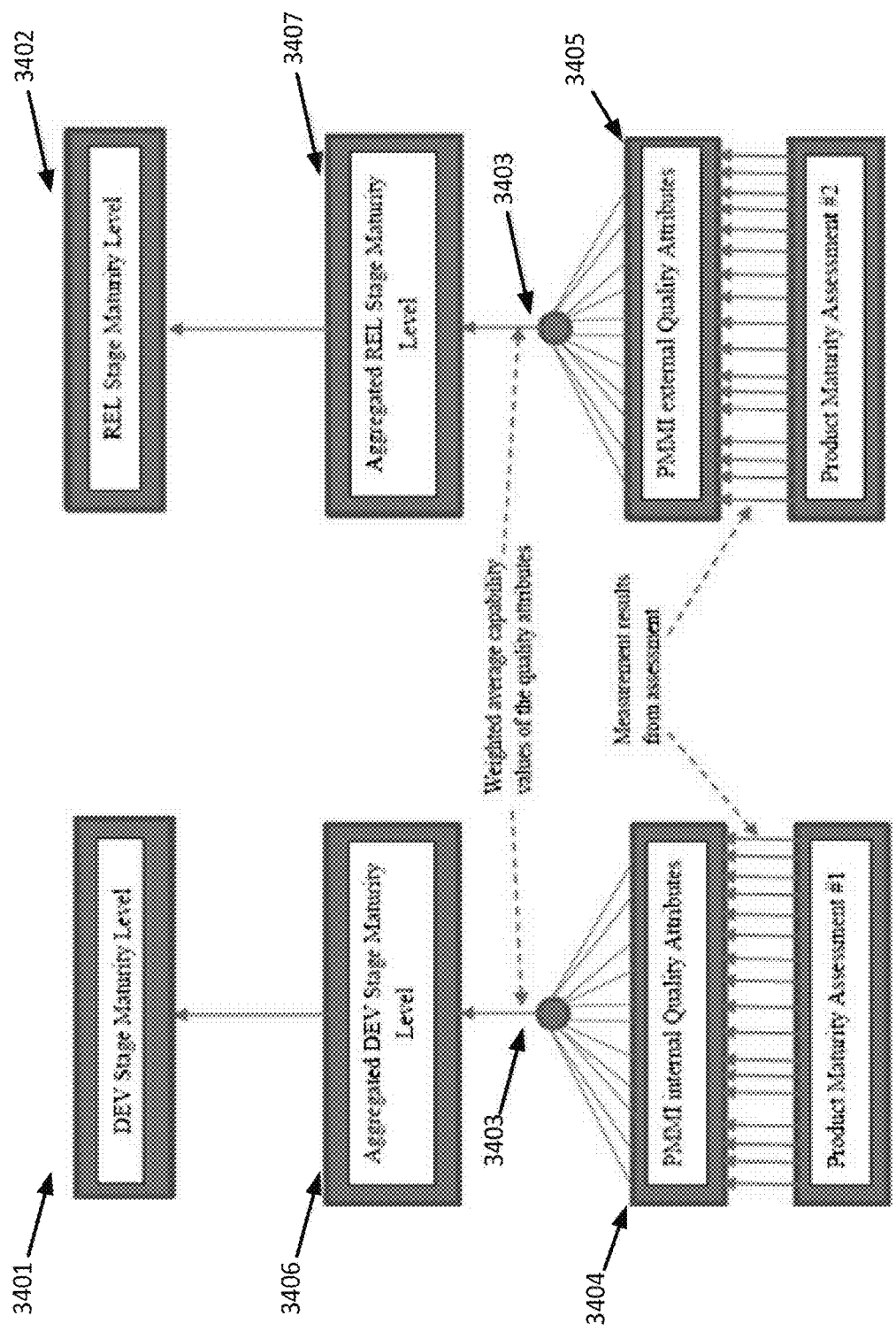
FIG. 34 is the Components of the Product Maturity Model Integration (PMMI)

PMMI may be comprised of several components as shown in FIG. 34. The figure shows an implementation of the components for each PMMI stage. On the left hand side is DEV-Stage 3401 components were they focus on measuring internal quality attributes. While on the right hand side is REL-Stage 3402 components were their focus on external quality attributes. Product maturity assessment component where the metrics for each quality attribute are executed and the results were collected to calculate the capability level 3403 for each quality attribute. Then, the capability level of all quality attributes will be fetched into PMMI internal 3404/external 3405 quality attributes component. In PMMI internal/external quality attributes component, the weighted average capability values of all quality attributes will be calculated to measure the stage maturity level. Finally, the calculated maturity level will be the input to Aggregated DEV 3406/REL Stage 3407 Maturity Level component where the rounded down of the maturity level value will be done to find the stage maturity level. The integer value is mapped to the aggregated maturity level because the value that is located between 2 levels does not belong to the higher level.

EXAMPLE 3

Figure 35:
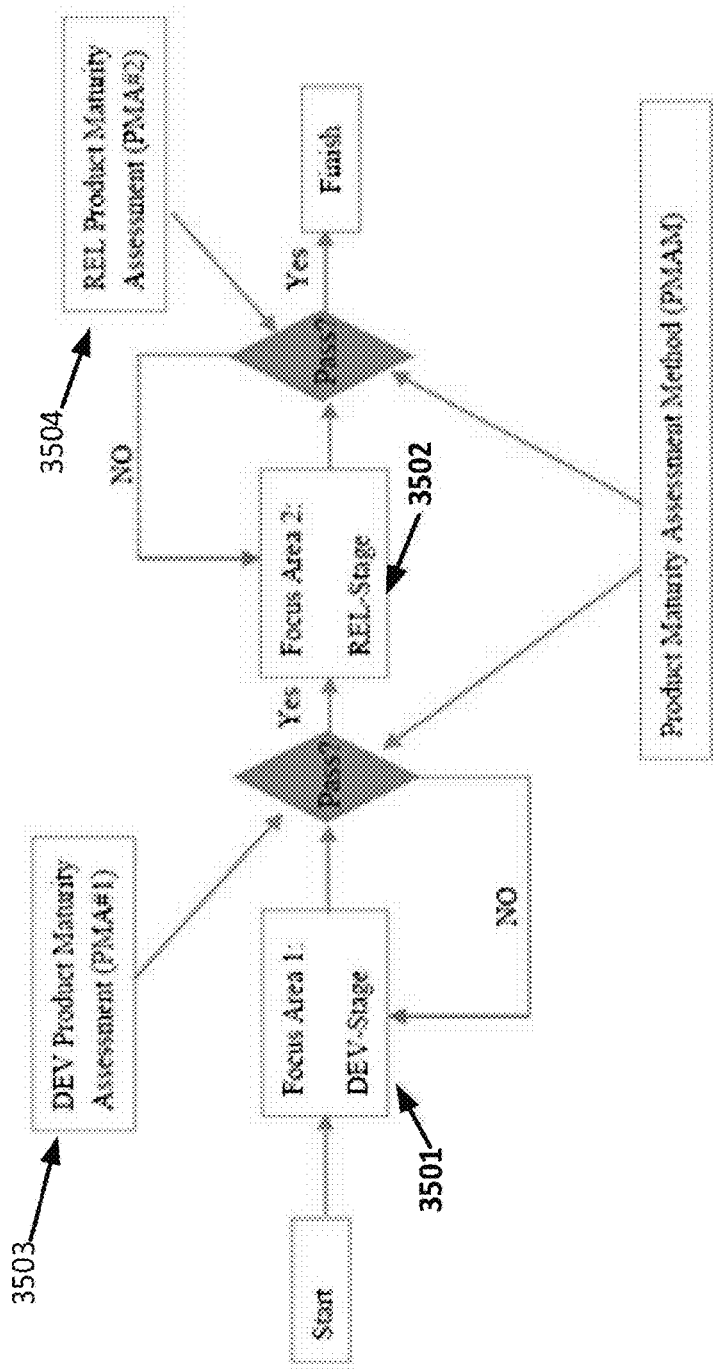
FIG. 35 is the PMMI Structure.

FIG. 35 shows the PMMI structure which contains two focus areas (DEV-Stage 3501 and REL-Stage 3502) and two quality gates (PMA#1 3503 and PMA#2 3504) which are presented as diamonds. The first focus area is the Development stage (DEV-Stage 3501) that covers all the processes and activities of software development and testing (unit testing) of the software product. The output of the DEV-stage 3501 is the tested code which is assessed against internal quality attributes at the first quality gate or PMA#1 3503 when the code is ready to be moved to the next phase of system/product integration testing and release. The main goal of the first quality gate 3503 is to ensure that the software product (source code) satisfies the desired capability levels of the selected internal quality attributes and the product maturity level that are determined by the assessment sponsors for the DEV-Stage 3501. Each focus area has its own stakeholders and quality attributes. The quality gates have a suggested list of metrics that will be executed to measure the quality attributes of the output product from the focus area and to measure the maturity of the software product. PMA#1 quality gate 3503 tests the output of the DEV-Stage 3501 and PMA#2 3504 quality gate tests the output of the REL-Stage 3502.

FIG. 35 shows that the output of the DEV-Stage 3501 which is the developed and tested (unit testing) software will be tested against internal quality attributes at the first quality gate (PMA#1 3503) to check if the output satisfies the desired capability and maturity level of DEV-Stage 3501. If the output meets the quality requirements that are defined by the assessment sponsor, it will go the next stage (REL-Stage 3502) otherwise the software will go back to DEV-Stage 3501 to be improved in order to match the expectations. In REL-Stage the output is the product after making integration testing and pre-release testing will be tested against external quality attributes at the second quality gate (PMA#2 3504) to ensure that the output meets the sponsor quality expectations of REL-Stage 3502 by meeting the desired capability and maturity levels. If the output product does not meet the expectation it will go back to the REL-Stage 3502 for improvement otherwise the product will be ready for release.

Figure 36:
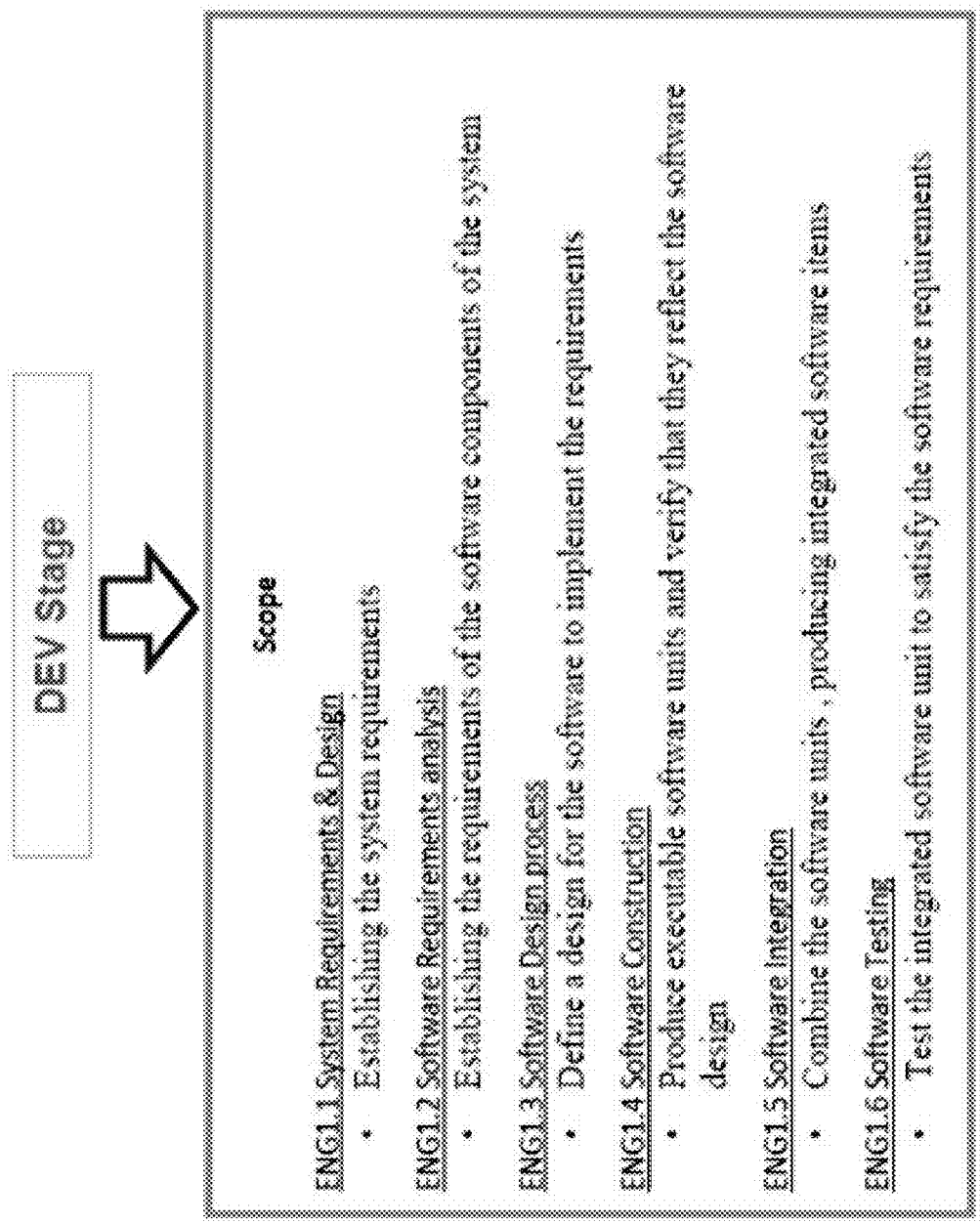
FIG. 36 is the DEV-Stage scope.

Each focus area has its scope which contains the processes that are performed to produce the output of the software product where it is the same output of the focus area. FIG. 36 shows the processes and their definitions which is the scope of the DEV-Stage (recommended scope).

Figure 37:
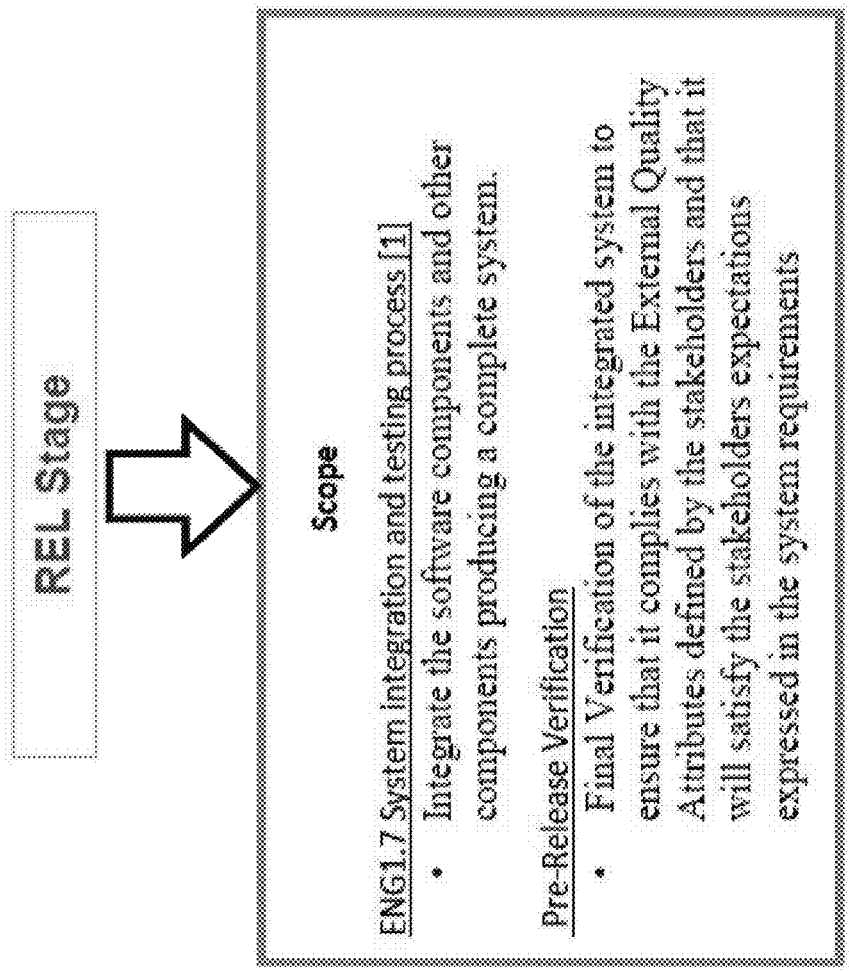
FIG. 37 is the REL-Stage scope.

The second focus area is the product integration & release stage (REL-Stage) that covers system integration and pre-release product testing. The output of the second focus area is the user acceptance tested product which is tested using external quality attributes thereby establishing the maturity level of the product. This assessment is carried out at the second quality gate when the software product is ready to be shipped to the external stakeholders (e.g. customers, users, resellers, etc.). FIG. 37 shows the scope of the REL-Stage (recommended scope) which are the processes and their definitions, the first process is from and the "Pre-Release Verification" process is added to ensure that the final software product (after integration) meets the stakeholders expectations.

The scope of the PMMI model covers an integrated view of the end-to-end lifecycle starting with a product and ending with product integration, testing & release (hence the word integration). We treat the whole software development lifecycle as a black-box, because this will give the model the flexibility to be suitable for any type of development lifecycle which is used in software development. In other words the focus is on the final software product (code) without looking into how it is developed.

We did not include the product-in-use phase due to the fact that the product—in-use environment could be vastly different and variable depending on external factors that are mostly not-predictable. So our concentration is on the internal and external quality attributes which are relevant in the DEV-Stage and REL-Stage respectively.

EXAMPLE 4

As we discussed in the previous section, there are two focus areas in the structure of PMMI. DEV and REL stages that are concerned with internal and external quality attributes respectively. Also, they have their own stakeholders for each focus area. PMMI suggests a list of stakeholders for each focus area. We identified the following stakeholders that might be of interest in DEV-Stage and REL-Stage. Here is the list of the stakeholders for the DEV-Stage:
1. Project Managers & Team Leaders
2. Requirements Engineers
3. Solution Designers/Architects
4. Developers (Coders & Unite Testers)
5. Maintenance Teams
6. IT Security Teams List of stakeholders for the REL stage:
1. Product Users (who use the product)
2. Product Customers (Who purchase the product)
3. Sales & Marketing Teams
4. Product Sellers (Who sell the product)
5. IT Security Teams
6. Maintenance Teams
7. Product Resellers (Who integrate the product within their "final" product which they sell)
8. User Acceptance Teams
9. Release Teams The assessment sponsor and the competent assessor can select from the PMMI stakeholders' list to help the assessors in describing the missing points in output of the stage or resolve the inconsistency in the documents. These are done by interviewing the stakeholders of each stage by the assessor team before executing the metrics.

PMMI Quality Attributes

Based on the software quality literature review, we selected the quality attributes from well-known quality models. The selection of the quality attributes was based on the following selection criteria:
1. Is not a duplicated quality attribute (on name).
2. Quality attribute definitions in one quality model are not covered by a wider definition of another quality attribute in other quality the same quality model. However some quality attributes may overlap in their definitions.
3. The quality attribute relates to the quality of the code.
4. The quality attribute can be measured in the code.

Table 21 shows the selected quality attributes with their definitions, the name of the quality model that was selected from, and the name of the PMMI stage that the quality attribute belongs to whether it be to the DEV-Stage, REL-Stage, or both stages based on the stakeholders. One of the important stakeholders for the release stage is the user. Therefore, quality attributes that relate to users are considered as REL-Stage quality attributes. The definitions of the quality attributes are directly quoted from their references except for "maintainability" wherein we added to McCall's definition to make the "Maintainability" quality attribute include preventive, corrective, and adaptive maintenance. We also added the "Complexity" quality attribute based on expert suggestion.

TABLE 21

PMMI Quality Attribute with their definitions

| Quality Attribute | Definition | Name | Area |
|---|---|---|---|
| Consistency | "Code" possesses characteristic internal consistency to the extent that it contains uniform notation, tenninology and symbology within itself, and external consistency to the extent that the content is traceable to the requirements. Internal consistency implies that coding standards are homogeneously adhered to; e.g., comments should not be unnecessarily extensive or wordy in one place or insufficiently informative in another. The number of arguments in subroutine calls match with subroutine header, etc. External consistency implies that variable names and definitions, including physical units, are consistent with a glossary; or there is a one-to-one relationship between functional flow chart entities and coded routines or modules, etc." | Bohem | DEV |
| Efficiency | "The capability of the software product to provide appropriate performance, relative to the amount of resources used, under stated conditions." | ISO9126 | REL |
| Maintainability | "Effort required to locate and fix an error in an operational program" Maintainability contains correction, prevention, and adaptive maintenance (text in red was added by me). | McCall | Both |
| Reliability | "Code possesses the characteristic reliability to the extent that it can be expected to perform its intended functions satisfactorily, This implies that the program will compile, load. and execute, producing answers of the requisite accuracy; and that the program will continue to operate correctly, except for a tolerably small number of instances, while in operational use. It also implies that it is complete and externally consistent, etc." | Bohem | Both |
| Testability | "The capability of the software product to enable modified software to be validated." | ISO9126 | DEV |
| Understandability | "Code possesses the characteristic understandability to the extent that its purpose is clear to the inspector. This implies that variable names or symbols are used consistently, modules of code are self-descriptive, and the control structure is simple or in accordance with a prescribed standard, etc." | Bohem | DEV |
| Usability | "The capability of the software product to be understood, learned, used and found to be attractive by the user, when used under specified conditions." | ISO9126 | REL |

TABLE 21-continued

PMMI Quality Attribute with their definitions

| Quality Attribute | Definition | Name | Area |
|---|---|---|---|
| Security | "The capability of the software product to protect information and data so that unauthorized persons or systems cannot read or modify them and authorized persons or systems are not denied access to them." | ISO9126 | Both |
| Extensibility | "Is related to flexibility and describes the ease with which a system can be extended. This includes functional as well as non-functional extensions. A functional extension would be to extend an iPhone App so that it makes use of Google Maps API and thus brings new functions to the user. A non-functional extension is, e.g., to add shadows around buttons (no new functionality to the user)". | Frank | DEV |
| Safety | "The capability of the software product to achieve acceptable levels of risk of harm to people, business, software, property or the environment in a specified context of use". | ISO9126 | REL |
| Completeness | "Code possesses the characteristic completeness to the extent that all its parts are present and each part is fully developed. This implies that external references are available and required functions are coded and present as designed, etc". | Bohem | Both |
| Conciseness | "Code possesses the characteristic conciseness to the extent that excessive information is not present. This implies that programs are not excessively fragmented into modules, overlays, functions and subroutines, nor that the same sequence of code is repeated in numerous places, rather than defining a subroutine or macro; etc". | Bohem | DEV |
| Legibility | "Code possesses the characteristic legibility to the extent that its function is easily discerned by reading the code. (Example: complex expressions have mnemonic variable names and parentheses even if unnecessary.) Legibility is necessary for understandability". | Bohem | DEV |
| Reusability | "Extent to which a program can be used in other applications-related to the packaging and scope of the functions that programs perfolin". | McCall | DEV |
| Modularity | "Those attributes of the software that provide a structure of highly independent modifles". | McCall | DEV |
| Complexity | "This attribute indicates the effort necessary to develop software in a specified environment". | Expert | DEV |

The sponsors and the competent assessors can select from the list of quality attributes of the DEV and REL stages that they are interested in measuring in each focus area from Table 21. Once the sponsors and the competent assessor selected the quality attributes then the assessor will select the list of metrics to measure the selected quality attributes in the software product. PMMI provides a recommended list of metrics for each quality attribute that will be described in the next section.

PMMI Quality Metrics

Based on our survey we identified a set of recommended metrics that will be provided by PMMI for each quality attribute (presented in Table 21) in the model. Table 22 represents the quality attributes (header) that are targeted by the metrics, and under each quality attribute the name of the metrics with the metric reference and the description of usage of that metric are presented. Also we specify the measurement scale of each metric whether its nominal, ordinal, interval, ratio, or absolute. The measurement scale will help the assessors to identify the thresholds of these metrics.

Each quality attribute has its own set of metrics. The selection of these sets of metrics are based on covering different aspects of measurement of that quality attribute and the ease of calculating of those sets of metrics. The assessors can select the list of metrics from the recommended list of metrics that is provided by PMMI in order to measure the quality attributes that are identified by the sponsors and the competent assessor. The assessors can select any number of metrics they need to measure a certain quality attribute

TABLE 22

Recommended list of metrics for PMMI quality attributes

| Metric Name with Paper ID | Description of the Use | Measurement Type |
|---|---|---|
| Consistency ||| 
| coherence coefficient (c coeff) | "Extract words contained in the comment and compare it to the words contained in the method name." | Ratio |
| Distinct Argument Ratio (DAR) | $DAR = \dfrac{DAC}{n_a}$ "where na is the Argument Count of the interface" | Ratio |

TABLE 22-continued

Recommended list of metrics for PMMI quality attributes

| Metric Name with Paper ID | Description of the Use | Measurement Type |
|---|---|---|
| EFFICIENCY | | |
| Efficiency | Efficiency = (Code Area/Execution Time) * Qr where "Qr = Quality Quotient (on a scale of 1 to 10 given by user)." | Ratio |
| Response Time | Ri = Wi + Si<br>Si: Average server time of resource i, when one transaction process access resource i every time.<br>Wi: Average wait time of queue i, when one transaction process access queue i every time.<br>Ri: Average response time of queue i, when one transaction process in queue i. | Absolute |
| the number of transactions | Ni = Niw + Nis, it measures (throughput) | Absolute |
| resource utilizations | Ui = Xi × Si<br>"Example: In 120s, one resource executes 45 transaction processes. Each transaction process cost 19.0 ms. During this time, what is this resource utilization? Ui = Xi × Si = 45 × 019 = 855 = 85.5%" | Ratio |
| Function call efficiency | "The ratio between FUNCTION CALLS and STATEMENTS" | Ratio |
| MAINTAINABILITY | | |
| Maintainability metric | Summation of maintainabilities of individual changes, that bases on the size of classes $$\text{Maintainability}_{ch} = 1 - \frac{\sum_{SSj \in \text{affected subsystems}} |SSj| - r}{|S| - r}$$ | Ratio |
| Number of 3rd Party Components (No3C) | "This is the count of the number of components that have been acquired from outside vendors." | Absolute |
| Number of Components (NoC) | "total number of architectural units that can be found in the system of interest" | Absolute |
| Total Number of External Interfaces (TNEI) | "number of connectors that allow the component to interact with other components outside the subsystem" | Absolute |
| Total Number of Internal Interfaces (TNII) | "number of connectors that allow components to interact with other components within a subsystem or layer" | Absolute |
| Number of Functionally Critical Components (NFCC) | "counts the number of components whose failure would affect the system's functionality drastically" | Absolute |
| Number of Versions (NoV) | "number of releases the product has undergone." | Absolute |
| Number of Subsystems (NoSS) | "number of units that are logical or physical clusters of components" | Absolute |
| Number of Services (NOS) | "number of different services that are offered by a system" | Absolute |
| Number of Concurrent Components (NCC) | "number of components that operate concurrently" | Absolute |
| Class stability metric (CSM) | "Measure the stability of the class based on a set of factors" | Ratio |
| Number of children (NOC) | "number of immediate subclasses subordinated to a class in the class hierarchy." | Absolute |
| RELIABILITY | | |
| Mean Time Between Failure (MTBF) | "MTBF(T) = This Def from Ref_117 MTTF provides the mean time it takes for the system to reach one of the designated failure states, given that the system starts in a good or working state. The failed states are made absorbing states." | Absolute |

TABLE 22-continued

Recommended list of metrics for PMMI quality attributes

| Metric Name with Paper ID | Description of the Use | Measurement Type |
|---|---|---|
| software reliability | the formula depends on defining: 1 - total expected number of faults latent in a system prior to operation 2 - detection rate per fault not leading to an unsafe state 3 - detection rate per fault leading to an unsafe state 4 - content proportion of faults not leading to an unsafe state 5 - content proportion of faults leading to an unsafe state 6 - expected number of faults not leading to an unsafe state that are detected during n executions of input data 7 - expected number of faults leading to an unsafe state that are detected during n executions of input data (The probability that a software will operate without causing a software failure) $$R \equiv \sum_{j=1}^{k} P(I_j^1) = 1 - \sum_{j=1}^{k} \{P(I_j^2) + P(I_j^3)\}|$$ | Ratio |

TESTABILITY

| testability measurement TM | "Combine the statement coverage and branch coverage" $$TM = W_4 PM_4 + W_5 PM_5 \sum_{i=4}^{5} w_i = 1$$ | Ratio |

UNDERSTANDABILITY

| Rate of Component Observability (RCO) | "percentage of readable properties in all fields implemented within the Facade class of a component" $$RCO(c) = \begin{cases} \dfrac{P_r(c)}{A(c)} & (A(c) > 0) \\ 0 & \text{(otherwise)} \end{cases}$$ | Ratio |
| Code spatial complexity (CSC) | "compute code-spatial complexity of a module (MCSC): sum of Distance over n . . . where n represents count of calls/uses of that module and Distance i is equal to the absolute difference in number of lines between the module definition and the corresponding call/use . . . for the system equal: sum of all MCSC over number of modules in the system" | Ratio |

USABILITY

| Usability Metric for User Experience (UMUX) | This metric include a questionnaire (4 questions) based on the answer the usability will be calculated | Ratio |
| Essential efficiency | "Measure how near is the user interface design from the ideal use case for making a particular task. That is, it is a ratio between the number of essential steps that are needed for a user to get an objective and the number of steps actually needed to get it." $$EE = 100 \cdot \dfrac{S_{essential}}{S_{enacted}}$$ | Ratio |
| System Usability Scale (SUS) | It consist from 10 questions | Ratio |

Security

| Critical Element Ratio (CER) | "Critical Elements Ratio = Critical Data Elements in an Object/ Total Number of Elements in the Object" | Ratio |
| Security Resource Indicator (SRI) | "The security resource indicator is based on four items: documentation of the security implications of configuring and installing the application, a dedicated e-mail alias to report security problems, a list or database of security vulnerabilities specific to the application, and documentation of secure development practices." | Ratio |
| Critical Classes Coupling (CCC) | $$CCC(D) = \dfrac{\sum_{j=1}^{ca} \alpha(CA_j)}{(|C|-1) \times |CA|}$$ | Ratio |
| Critical Classes Extensibility (CCE) | "The ratio of the number of the non-finalised critical classes in a design to the total number of critical classes in that design." | Ratio |
| Critical Design Proportion (CDP) | "The ratio of number of critical classes to the total number of classes in a design." | Ratio |

TABLE 22-continued

Recommended list of metrics for PMMI quality attributes

| Metric Name with Paper ID | Description of the Use | Measurement Type |
|---|---|---|
| *Extensibility* | | |
| Class extensibility Metric | "number of abstract methods divided by the total number of methods (concrete plus abstract) of a class" | Ratio |
| Plugin Pollution Index | "Formula Depending on: set of methods that module calls, transitive closure of the method calls, set of methods that are in the module that are in transitive closure of method calls" | Ratio |
| *Safety* | | |
| software safety | "The probability that a software system will not cause an unsafe condition can be measured using the following equation:" $$S = \sum_{j=1}^{k} \{P(I_j^1) + P(I_j^2)\} = 1 - \sum_{j=1}^{k} P(I_j^3)$$ "P(i) is the probability that Ii (subset of input that cause a software failure that lead to unsafe state) is selected when a system is executed" | Ratio |
| *COMPLETENESS* | | |
| Requirement Fulfillment | "M5 = #requirements associated with artifacts in the model/#requirements in RS" | Ratio |
| Completeness metric | $$M6 = 1 - \sum_{cs \in CS} \frac{(n * P(cs) * \#modules\ affected)}{\#modules}$$ | Ratio |
| *CONCISENESS* | | |
| LEN(S) | "the average length of sequences (size of fragments) in clone set S" | Ratio |
| POP(S) | "the number of S fragments" | Absolute |
| NIF(S) | "The number of source files that include any S fragments" | Absolute |
| *LEGIBILITY* | | |
| Design legibility | "Percentage of functional elements (interfaces, methods, configurable parameters (e.g., public attributes) ) with long names (>20 chars) - Average length of FE names" | Ratio |
| Design legibility | "Average length of functional elements names" | Ratio |
| Imported Software Parts (ISP) | "ISP = number of software parts imported and used by a software part" | Absolute |
| *REUSABILITY* | | |
| Number of 3rd Party Components (No3C) | "This is the count of the number of components that have been acquired from outside vendors." | Absolute |
| Number of Components (NoC) | "total number of architectural units that can be found in the system of interest" | Absolute |
| Number of Versions (NoV) : | "number of releases the product has undergone" | Absolute |
| Number of Redundant Components (NoRC): | "counts the number of redundant components" | Absolute |
| Number of Subsystems (NoSS) | "number of units that are logical or physical clusters of components" | Absolute |
| Reusability Metric | "Number of reused classes/Number of total classes" | Ratio |
| Degree of Inheritance of a Class (DIC) for method | "Number of inherited Methods × (4 − level) if level <=3, Number of Inherited Methods × (level − 3) if level >= 4" | Absolute |
| Degree of Inheritance of a Class (DIC) for attribute | "Number of inherited Attributes × (4 − level) if level <=3, Number of inherited Attributes × (level − 3) if level >=4" | Absolute |
| *Modularity* | | |
| Modularity ratio | $$ModularityRatio(A) = \frac{Cohesion(A)}{Coupling(A)}$$ | Absolute |
| Module Interaction Index | "The ratio of the number of calls made to function from other functions external to module to the summation of calls made to a function from other functions internal or external to module" | Ratio |

TABLE 22-continued

Recommended list of metrics for PMMI quality attributes

| Metric Name with Paper ID | Description of the Use | Measurement Type |
|---|---|---|
| *Complexity* | | |
| Weighted Operation in Module (WOM) | "Counts the number of operations in a given module" | Absolute |
| MAXIMUM DIT (MaxDIT) | "It is the maximum of the DIT (Depth of Inheritance Tree) values obtained for each class of the class diagram. The DIT value for a class within a generalization hierarchy is the longest path from the class to the root of the hierarchy." | Absolute |
| FE | "count the number of file operations including open, read, write and close" | Absolute |
| EL | "count the number of external functions, libraries and files linked" | Absolute |
| VE | "count the number of variables declaration" | Absolute |
| Edited Function CC (CC) | "the summation of the CC for functions edited during code change" | Absolute |
| Fan-in + Fan-out (F − (J + O)) | "obtained from fan-in + fan-out" | Absolute |
| ZIP-coefficient of compression (ZCC) | "The ratio of size of ZIP archive to size of project" | Ratio |
| Number of Children (NOC) | "number of immediate subclasses subordinated to a class in the class hierarchy" | Absolute |
| Response For a Class (RFC) | "set of methods that can potentially be executed in response to a message received by an object of that class" | Absolute |
| Mean Method Complexity | $MMC = \dfrac{\sum c_i}{n}$ | Ratio |
| Number of Trivial Methods | "counting the number of methods in a class with complexity equal to one" | Absolute |
| Number of lines of code | "counts all lines, including comments, with the exception that multiple-line comments are counted as a single line" | Absolute |
| Number of blocks | "The number of block constructs in a method" | Absolute |
| Number of temporary variables and method arguments | "number of temporary variables and arguments." | Absolute |
| Number of external assignments | "Number of external assignments in a method (that is assignments to variables other than temporary variables)." | Absolute |
| API complexity (methods) | "Percentage of methods without arguments" | Ratio |
| API complexity (Constructor) | "Ratio of constructors per class" | Ratio |
| Number of classes | "the number of classes in a class diagram" | Absolute |
| Number of methods | "the number of methods defined in a class diagram, including those defined at class and instance level, but not including inherited methods" | Absolute |
| Number of attributes | "the total number of attributes defined in a class diagram, including those defined at class and instance level, but not including inherited attributes or attributes defined within methods" | Absolute |
| Number of associations | "the number of association relationships in a class diagram" | Absolute |
| Number of dependencies | "the number of dependency relationships in a class diagram" | Absolute |

PMMI Software Product Maturity Levels and Capability Levels

In this section the PMMI maturity levels of the product and the capability levels of the quality attributes will be described. Maturity is full development (perfected condition), while capability is the measure of the ability of an entity (person or system) to achieve its objective. Higher levels of product capability indicate higher product maturity (the more a product has a capability the higher its level of maturity). PMMI defines four recommended maturity levels with their recommended thresholds as shown in FIG. 28.

FIG. 28 shows the four PMMI software product maturity levels going in ascending order from the lowest level (NC) 2804 to the highest level (FC) 2801. We come up with four maturity levels because we have four threshold levels which are used by experts group in IBM. Full compliance will render the product maturity level at the highest maturity Level 4, while deviation from full compliance will render the product maturity level at a lower level (with a decreasing scale as the deviation increases). NC maturity level 2804 is the lowest level and the default level for any software product. Software products that are located in the NC maturity level 2804 are of poor quality. On the other hand software products located in the FC maturity level 2801 are of excellent quality. Also each quality attribute has four recommended capability levels 2703 with their thresholds 2705 that are shown in FIG. 27A which are sorted in ascending order where "NC" is the lowest and "FC" is the highest level. The quality attribute that is assigned "NC" is at poor level in this product, but those that are assigned "FC" are at an excellent level in the product.

Calculating the overall capability level for each quality attribute will is discussed in detail in the next chapter. In general product quality leads to product capability & maturity because software products that are fully compliant with the stakeholders quality attributes possess more capability and maturity than those which are partially compliant with those quality attributes. Also the degree of product compliance with the quality attributes is defined by the capability levels of those quality attributes.

Note that the provided capability levels and product maturity levels that are provided with PMMI are recommended not mandatory.

EXAMPLE 5

Product Maturity Assessment Method (PMAM)

The PMAM covers all of the activities necessary to determine the extent of a product capability to perform in a full compliance with stakeholders' quality requirements. The scope of the assessment is to assess a software product's degree of compliance with the quality attributes defined by the stakeholders (agreed with the assessment sponsor) that covers an integrated view of the end-to-end lifecycle starting with the product and ending with product integration, testing & release. The purpose of the PMAM is to provide a standard method for assessing the level of the product maturity/capability by assessing the degree of the product's conformance with the stakeholders required quality attributes. The PMAM method is compliant with "Guidance on Performing an Assessment" ISO model (ISO 15504-3) framework for software assessment in specifying and defining:
1. Assessment Input.
2. Assessment Process.
3. Assessment Output.
4. Identity of assessment sponsors
5. Identity of Assessors.
6. Responsibilities of each PMAM team member.
7. Expected assessment output and minimum data that should be included in the final assessment report.

Following "Guidance on Performing an Assessment" ISO model will ensure that the assessment results are reliable, repeatable, and representative. To be in line with "Guidance on Performing an Assessment" ISO model, the PMAM is divided into three phases, depicted in FIG. 38:
1. Product Maturity Assessment Input phase 3801.
2. Product Maturity Assessment Processes phase 3802.
3. Product Maturity Assessment Output phase 3803.

Figure 38:
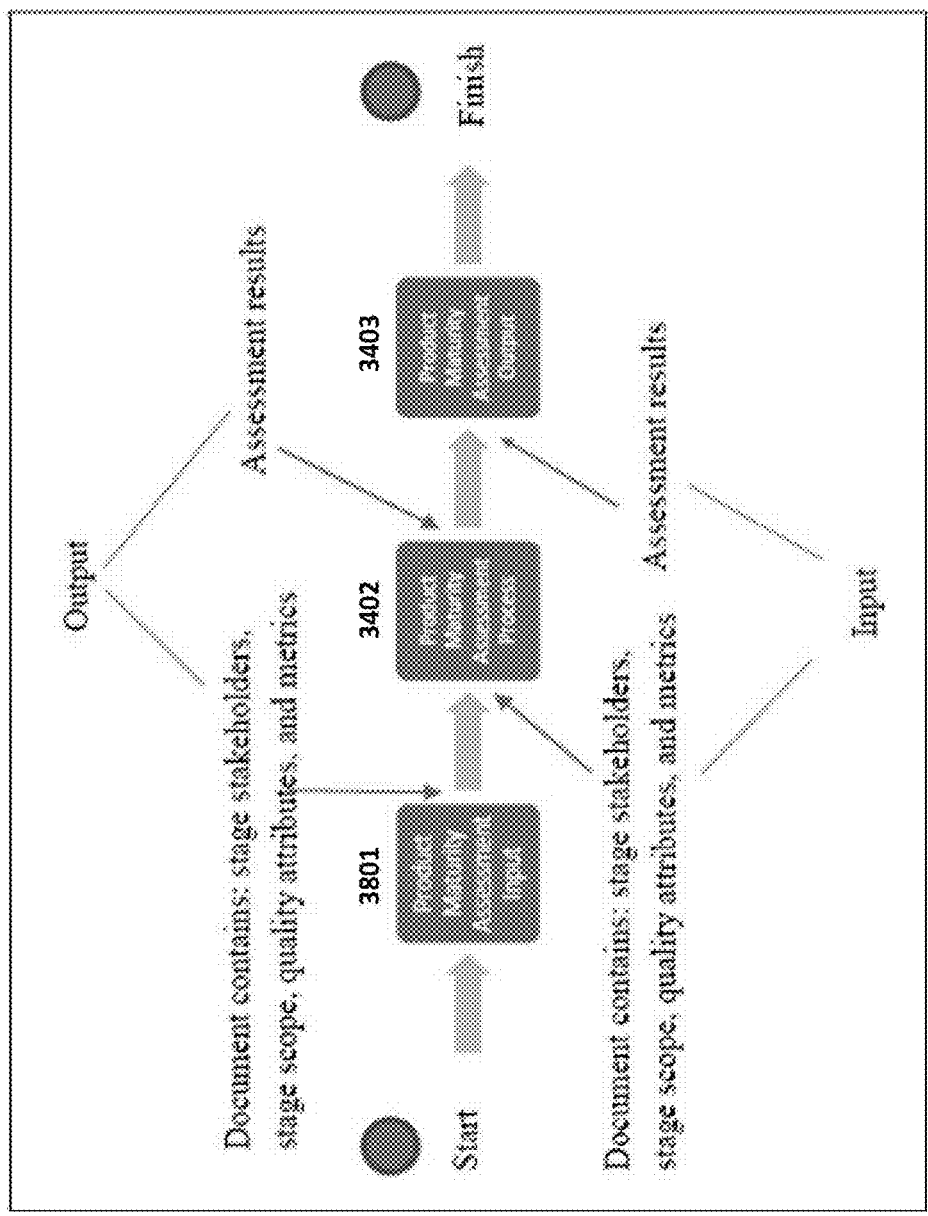
FIG. 38 is the PMAM Phases.

In Product Maturity Assessment Input phase 3801, the sponsor and assessors identify stakeholders for each PMMI stage, PMMI stage scope, quality attributes to be measured, and select metrics to measure the identified quality attributes. These are the output of Product Maturity Assessment Input phase 3801 which will be fetched in the next phase. In Product Maturity Assessment Processes phase 3802, the assessors perform the assessments according to the document from the previous phase. The assessment results are the output of the Product Maturity Assessment Processes phase 3802 and will be input for the last phase. In Product Maturity Assessment Output phase 3803 the results will be documented and reported to the assessment sponsors. This process is represented in FIG. 38. Each phase will be discussed in details on following sections.

The assessment purpose is aligned with business goals for the organization that developed the software and for the software customers. The organization perspective will enable the development organization to ensure that the produced software product is of high quality and can reach the targeted maturity level. This will enable the organization to market their final software product as a high quality product. From the customer perspective, the customer can assess the software product even when the processes of developing the software are not documented (black-box) to ensure that the software product which is being considered for purchase is a high quality product.

The Product Maturity Assessment Method (PMAM) is performed for one or more of the following purposes:
1. Before the acceptance of the software product by one or more stakeholders (for example, the customer, the users, Sales & Marketing, Maintenance & upgrade teams, customization/tailoring teams, etc.
2. Before the sales & distribution of the product (for example if the product is a commercial package) to verify that the product satisfies the original functional and non-functional requirements and conforms with the Internal Quality Attributes (PMA#1 3502 after DEV 3501) and External Quality Attributes (PMA#2 3504 after REL 3502)
3. By standards organization and/or regulatory organizations to ensure that the product is compliant with the relevant standards.
4. By any other stakeholders who may need to check/ensure that the product will achieve their expected level of performance in its target environments, and identify any gaps between the expected and actual performance.

PMAM Team

In this section, the PMAM main team members' roles and responsibilities. The main PMAM team members are assessment sponsors and assessors.

The sponsor of the assessment could be the organization of the developed product itself, the client who wants to purchase the software product, or anyone interested in assessing the product quality. Each focus area could have its own assessment sponsor, but it could be the same sponsor for both focus areas.

The assessors that assess the software product can be an external assessors (outside the organization), they could be from the organizations itself which develops the software product (internal assessment), or a combination of both. In all cases the assessors must have the following skills to perform the assessment:
1. Experience in software development.
2. Knowledge of the PMMI.
3. Aware of the PMAM.
4. Knowledge of different software metrics and how to apply them.

All assessors must satisfy these requirements before they start the process of assessing the software product. The assessors responsibilities are to help the sponsors identify the set of suitable metrics for these quality attributes, perform the assessment, and provide a detailed report to the sponsors to let them know where the weakness of the product lie in order to improve it.

Figure 39:
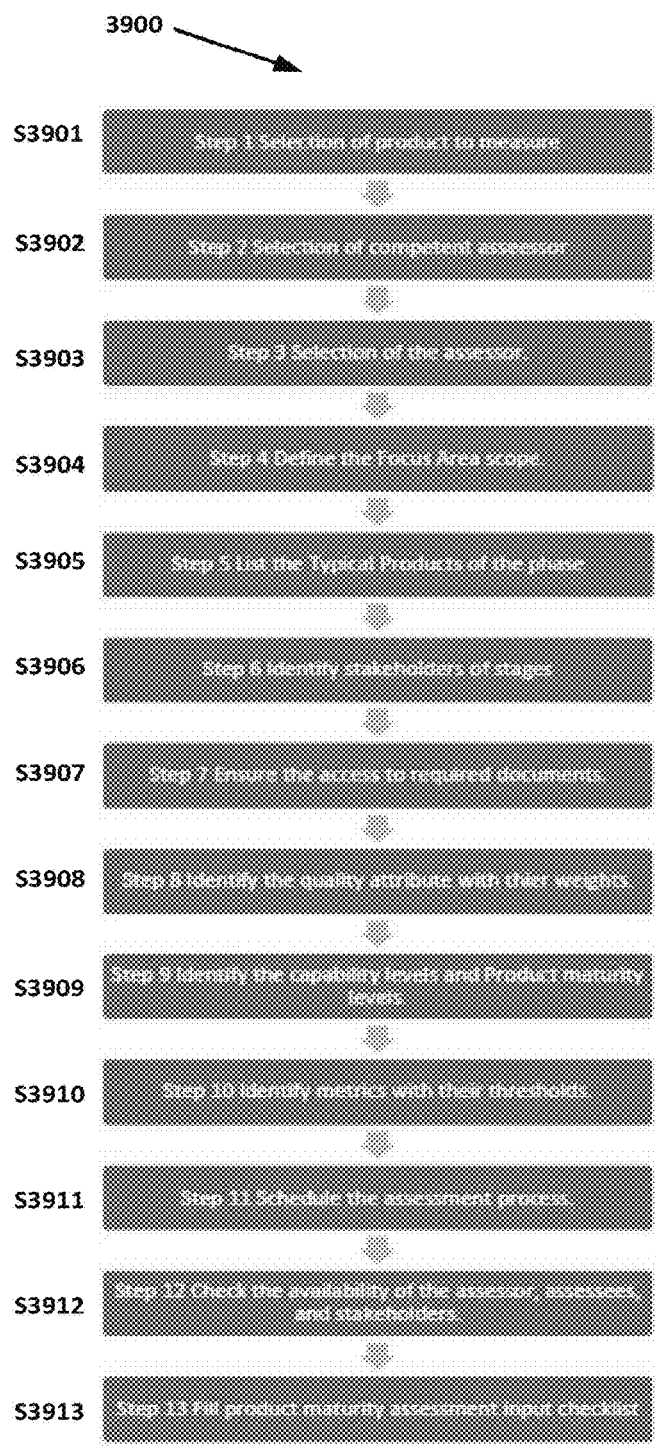
FIG. 39 is the product maturity assessment input Assessment Steps.

In this section we will describe the first phase of PMAM 3900, depicted in FIG. 39. Product maturity assessment input will be conducted during the data collection phase before the assessment starts using the following steps:

S3901 Step 1: The sponsors of the focus area select the product to be measured.

S3902 Step 2: The sponsors select the competent assessor who will be responsible for the assessment process of the software product.

S3903 Step 3: The sponsors and competent assessor select the qualified assessors that will be included in the assessment steps.

S3904 Step 4: The sponsors and the competent assessors should define the Focus Area scope and its objectives.

S3905 Step 5: The sponsors and the competent assessors should list the Typical Products (Code deliverables and testing results) of the phase.

S3906 Step 6: The sponsors and the competent assessors should identify the stakeholders for DEV and REL stage. They can choose the stakeholders from the PMMI stakeholders recommended list or they can identify other stakeholders for each phase. If they decided to use the PMMI stakeholders recommended list the competent assessor should fill the PMMI stakeholders' checklist.

S3907 Step 7: The sponsors should ensure that the assessors can access to all the required documents.

S3908 Step 8: The sponsors in consultation with the assessors identify the set of quality attributes to be measured for each PMMI stage (DEV and REL) with the weight of each quality attribute (The summations of all weights for each PMMI stage may be out of 100.) The sponsors and the assessors can select from the lists that are provided by PMMI or they can identify a different set of quality attributes they are interested in.

S3909 Step 9: The sponsors and the competent assessor should identify the capability level and the desired capability level for each quality attribute in DEV and REL stages and the maturity level and the desired maturity level of the software product in both stages. Also they should define the quality attribute thresholds which meet the sponsors' expectations.

S3910 Step 10: The assessors identify suitable metrics in order to measure the selected quality attributes that were identified in the previous steps. The assessors can select the metrics from the recommended list of metrics that are provided by PMMI or they can identify other suitable metrics to measure the selected quality attributes. The selection of these metrics is based on the selected quality attributes and type of the software to be assessed. The assessors should identify thresholds that should be associated with each capability levels for each metric. Also the sponsors should identify the required threshold of each metric (Test Threshold).

S3911 Step 11: The sponsors and the competent assessors schedule the assessment process.

S3912 Step 12: The competent assessor ensures the availability of all assessors, and stakeholders during the assessment period.

S3913 Step 13: The competent assessors fill the product maturity assessment input checklist.

Any change in the product maturity assessment input should be approved by the sponsors and the assessors. All the changes must also be documented. The Product maturity assessment input steps are summarized in FIG. 39.

Product Maturity Assessment Processes 4000

Figure 40:
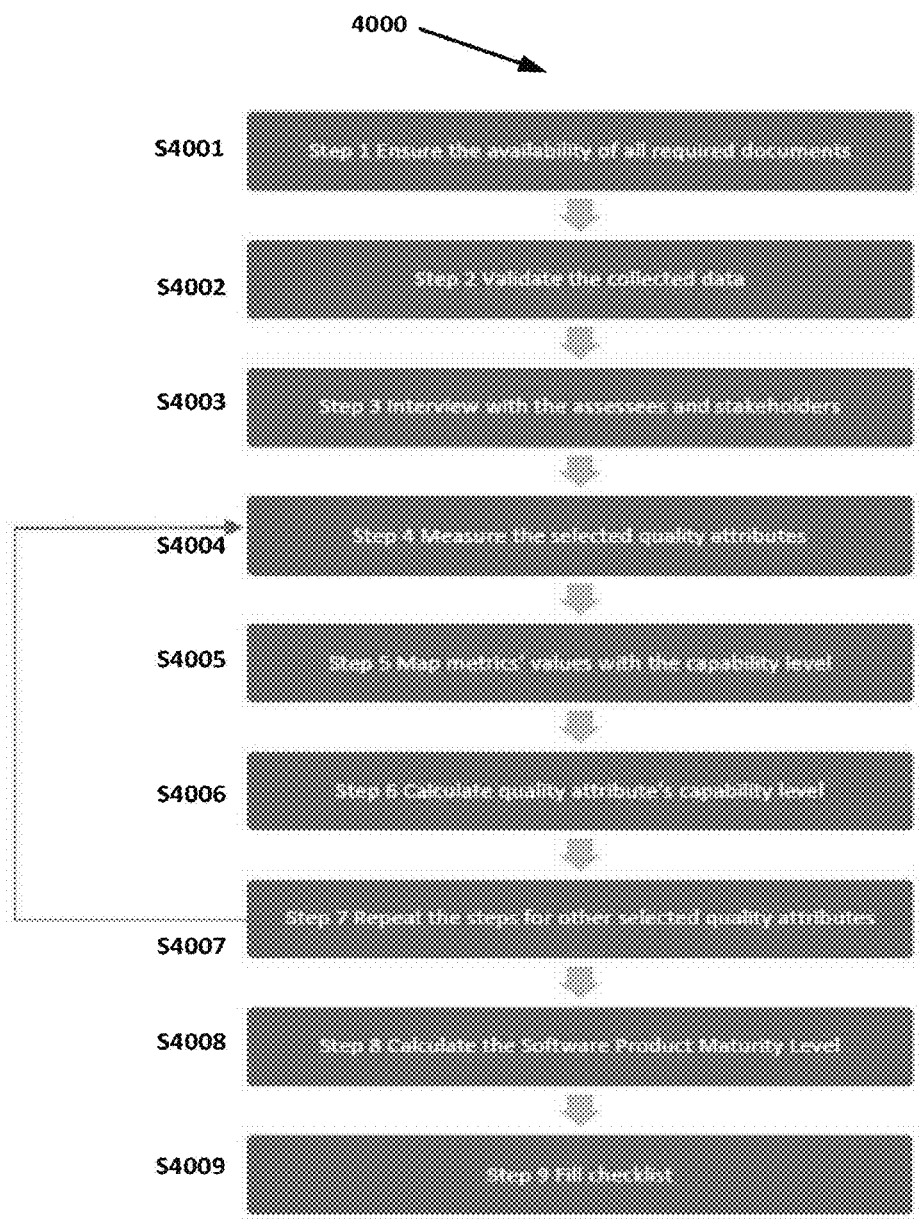
FIG. 40 is the product maturity assessment process Assessment Steps.

Once the sponsors have confirmed the assessment input that comes from the previous phase, the assessment process 4000 enters the next phase according to the schedule defined in product maturity assessment input using the following steps (summarized in FIG. 40):

S4001 Step 1: The competent assessor ensures that all required documents that are needed for the assessment are available.

S4002 Step 2: The competent assessor validates the collected data to ensure the data are valid and consistent.

S4003 Step 3: The assessors conduct an interview with the stage's stakeholders if needed.

The competent assessor in our example finds that all required documents to assess the project X are available and complete. There is no need to conduct an interview with this stage's stakeholders since everything is complete, clear, and consistence.

S4004 Step 4: The assessors measure each selected quality attribute independently using the selected list of metrics for that quality attribute. Where the quality attributes, metrics, and the associated thresholds that will be used in this step should be defined in the product maturity assessment input.

S4005 Step 5: A map is created with each metric that is used to measure a certain quality attribute with the capability levels based on the compliance of the test value of the metric with the test threshold that should be defined in the product maturity assessment input.

S4006 Step 6: Calculate the average value of the capability levels from the metrics that are used to measure the quality attribute; this will be the capability level of that quality attribute.

S4007 Step 7: Repeat steps 4 to 6 for all selected quality attributes in product maturity assessment input.

S4008 Step 8: Calculate the maturity of the product by doing the following:

a. Calculate the average weighted capability level by multiplying the average of capability levels of each quality attribute with its weight (defined in product maturity assessment input).

b. Summing the results of 'a' of all quality attributes

The result of 'b' will be the maturity of software product where the product compliance with quality requirements will be revealed. These steps are applied on the DEV quality gate. Moving the software product to the next phase (REL) requires the sponsors' approval on the results which should be documented and reported as in product maturity assessment output that will be discussed on the next section. After the sponsors approve the results of the first quality gate, then the same steps in the product maturity assessment process will be applied to the REL quality gate. The assessment inputs for REL stage are already defined in product maturity assessment input.

S4009 Step 9: The competent assessors fill the product maturity assessment process checklist for each PMMI stage assessment (DEV 3501 and REL 3502).

Product Maturity Assessment Output

In this section the documentation of the output result from the product maturity assessment process is described. Product maturity assessment output phase is the result documenting and reporting after each phase. The competent assessor is responsible to report the assessment results in a document to the assessment sponsor that include the following:

1. The assessment input including the set of quality attributes that are used in the measurement and the focus areas and its scope and objectives. Also the set of metrics with their thresholds (with the associated capability levels) that are used to measure the selected quality attributes should be included in product maturity assessment input as well. The identified product maturity levels with their thresholds should be included in the report.
2. The actual assessment schedule.
3. The results of product maturity assessment process including the capability levels for all selected quality attributes and the maturity level of the software product for each PMMI phase.

The assessment results should be documented and reported to the sponsors of the assessment after the assessment process finishes for each PMMI stage.

Figure 41:
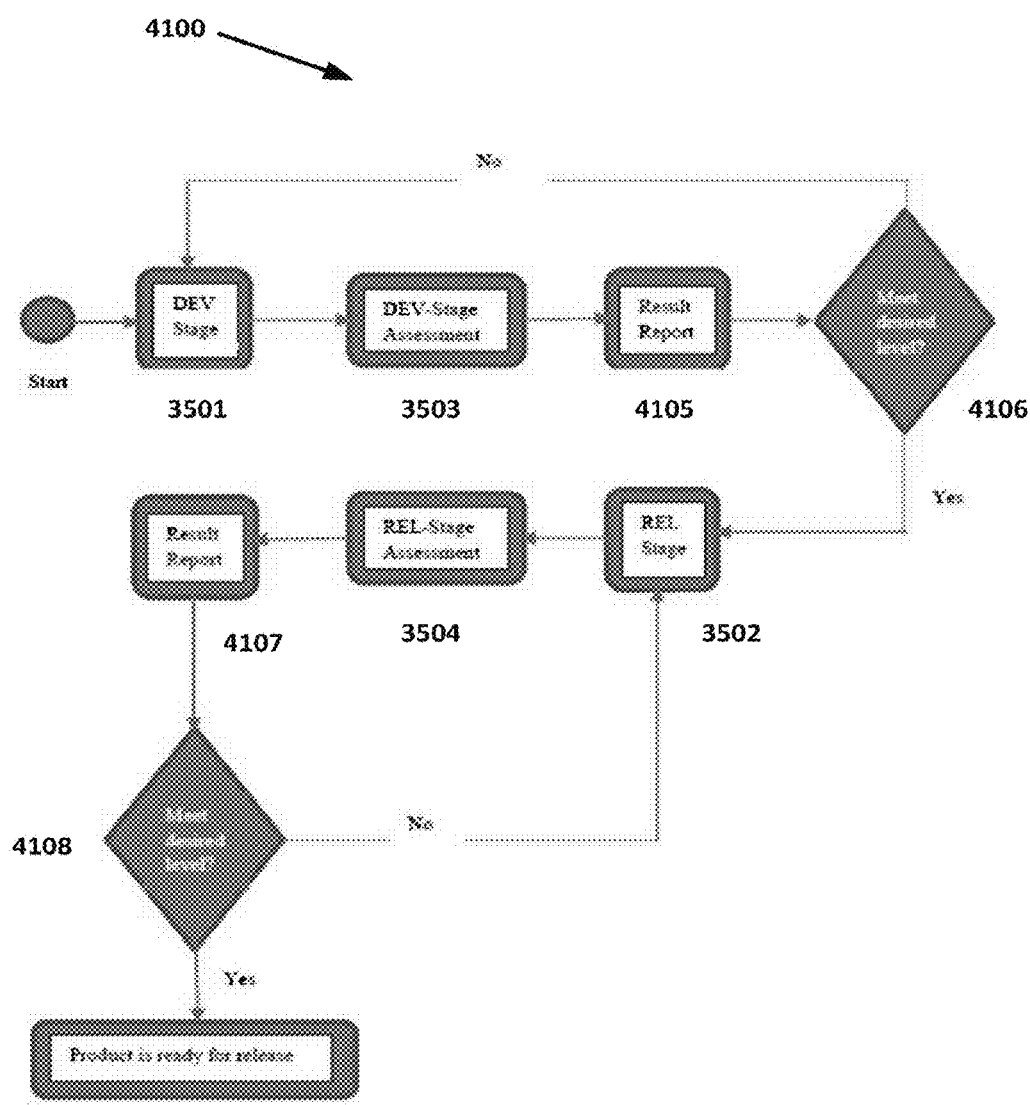
FIG. 41 is the PMAM Steps.

FIG. 41 describes the PMAM steps 4100. The figure shows that the output of the DEV-Stage 3501 will be tested against internal quality attributes at DEV-Stage Assessment phase 3503 where the metrics are executed. Then, the results from the metrics execution will be documented and reported in the result report phase 4105 to the assessment sponsors in order to ensure that the actual quality test results meet the desired quality results. The sponsors should review and confirm the final results 4106 and take a management decision in order to proceed into the REL stage 3502. Otherwise, the sponsors should discuss their notes with the competent assessor to decide the required changes (return it to development team to fix defects which found while testing specific quality attributes if necessary) and to manage these changes. The management decision to be taken depends on the degree of the product's compliance with the quality requirements and maturity level. Again, the same steps will be repeated for the output of REL-Stage 3502 except that the software product will be tested against external quality attributes in REL-Stage Assessment phase 3504 and a results report will be produced 4107. If the software product meets the sponsors' expectations, the product will be ready for release 4108. Otherwise, it will go back to the REL-Stage 3502 for improvement.

PMAM Flexibility

PMAM is flexible where it can be applied to:

All software domains

Different software sizes and complexity such as enterprise applications, embedded-software systems, and web-services.

Organizations of any size because its focus on the final product (source code) not on the process, development methodology or techniques that the organization used to develop the software product (e.g. waterfall, iterative, agile).

The invention claimed is:

1. A method of determining a product maturity level of one or more software products comprising:

acquiring, using circuitry, one or more parameters associated with one or more software products, the one or more parameters including one or more product quality attributes;

acquiring one or more metric parameters associated with each product quality attribute, wherein the one or more metric parameters include a test methodology;

evaluating, using the circuitry, one or more metric parameters to determine a metric value for each metric parameter, wherein the metric value is a numerical result;

mapping, using the circuitry, a capability level to each metric parameter based on the metric values, wherein the capability level is a rating associated with a capability scale;

mapping, using the circuitry, a capability level to each product quality attribute based on associated metric values, wherein the capability level is a rating associated with the capability scale, and wherein the mapping of the capability level to each product quality attribute includes calculating an integer value of an average of the capability level of each metric parameter;

mapping, using the circuitry, a product maturity level to the one or more software products based on the capability level of one or more product quality attributes, wherein the product maturity level is a rating associated with a maturity scale; and transmitting the product maturity level of the one or more software products to an external device;

wherein the one or more metric parameters associated with each product quality attribute includes a weight value associated with each metric; and wherein the mapping of the capability level to each product quality attribute based on associated metric values incorporates the weight value associated with each metric.

2. The method of claim 1, wherein the capability scale has at least four capability levels and each level is defined by a threshold.

3. The method of claim 1, wherein the maturity scale has at least four maturity levels and each level is defined by a threshold.

4. The method of claim 1, wherein the test methodology is a mathematical function or a logical assessment of the product quality attribute.

5. The method of claim 1, wherein the one or more parameters include a weight value associated with the product quality attribute.

6. The method of claim 5, wherein the mapping of the product maturity level to one or more software products includes calculating an integer value of an average of the capability level of each parameter.

7. An apparatus for determining a product quality assessment of one or more software products, the apparatus comprising:

circuitry configured to acquire, using a data source, one or more parameters associated with one or more software products, the one or more parameters including one or more product quality attributes;

acquire one or more metric parameters associated with each product quality attribute, wherein the one or more metric parameters include a test methodology;

evaluate one or more metric parameters to determine a metric value for each metric parameter, wherein the metric value is a numerical result;

map, using the data source a capability level to each metric parameter based on the metric values, wherein the capability level is a rating associated with a capability scale;

map, using the data source, a capability level to each product quality attribute based on associated metric values, wherein the capability level is a rating associated with the capability scale, and wherein the mapping of the capability level to each product quality attribute includes calculating an integer value of an average of the capability level of each metric parameter;

map, using the data source, a product maturity level to the one or more software products based on the capability level of one or more product quality attributes, wherein the product maturity level is a rating associated with a maturity scale;

compare the product maturity level of one or more software products with a threshold to determine the product quality assessment; and generate a recommendation whether to purchase the software product based on the product quality assessment;

wherein the one or more metric parameters associated with each product quality attribute includes a weight value associated with each metric; and wherein the mapping of the capability level to each product quality attribute based on associated metric values incorporates the weight value associated with each metric.

8. The method of claim 7, wherein the capability scale has at least four capability levels and each level is defined by a threshold.

9. The method of claim 7, wherein the maturity scale has at least four maturity levels and each level is defined by a threshold.

10. The method of claim 7, wherein the test methodology is a mathematical function or a logical assessment of the product quality attribute.

11. The method of claim 7, wherein the one or more parameters include a weight value associated with the product quality attribute.

12. The method of claim 11, wherein the mapping of the product maturity level to one or more software products includes calculating an integer value of an average of the capability level of each parameter.

13. A non-transitory computer-readable storage medium including computer executable instructions, wherein the instructions, when executed by a computer, cause the computer to perform a method for determining a software product maturity level of one or more software products, the method comprising:
   acquiring, using circuitry, one or more parameters associated with one or more software products, the one or more parameters including one or more product quality attributes;
   acquiring one or more metric parameters associated with each product quality attribute, wherein the one or more metric parameters include a test methodology;
   evaluating, using the circuitry, one or more metric parameters to determine a metric value for each metric parameter, wherein the metric value is a numerical result;
   mapping, using the circuitry, a capability level to each metric parameter based on the metric values, wherein the capability level is a rating associated with a capability scale;
   mapping, using the circuitry, a capability level to each product quality attribute based on associated metric values,
   wherein the capability level is a rating associated with the capability scale, and wherein the mapping of the capability level to each product quality attribute includes calculating an integer value of an average of the capability level of each metric parameter;
   mapping, using the circuitry, a product maturity level to the one or more software products based on the capability level of one or more product quality attributes, wherein the product maturity level is a rating associated with a maturity scale; and
   wherein the one or more metric parameters associated with each product quality attribute includes a weight value associated with each metric;
   wherein the mapping of the capability level to each product quality attribute based on associated metric values incorporates the weight value associated with each metric; and
   wherein the one or more parameters associated with the software products includes a weight value associated with each metric parameter and/or the one or more metric parameters associated with the product quality attributes includes a weight value associated with the product quality attribute.

* * * * *